US010720642B2

(12) United States Patent
Chan et al.

(10) Patent No.: US 10,720,642 B2
(45) Date of Patent: Jul. 21, 2020

(54) OXIDATION-REDUCTION ASSISTED EXFOLIATION AND REASSEMBLY OF TRANSITION METAL OXIDE LITHIUM INTERCALATION COMPOUNDS

(71) Applicants: Candace Chan, Phoenix, AZ (US); Qian Cheng, Mesa, AZ (US)

(72) Inventors: Candace Chan, Phoenix, AZ (US); Qian Cheng, Mesa, AZ (US)

(73) Assignee: Arizona Board of Regents on behalf of Arizona State University, Scottsdale, AZ (US)

( * ) Notice: Subject to any disclaimer, the term of this patent is extended or adjusted under 35 U.S.C. 154(b) by 246 days.

(21) Appl. No.: 15/661,080

(22) Filed: Jul. 27, 2017

(65) Prior Publication Data

US 2018/0034054 A1 Feb. 1, 2018

Related U.S. Application Data

(60) Provisional application No. 62/367,942, filed on Jul. 28, 2016.

(51) Int. Cl.
*H01M 4/525* (2010.01)
*H01M 4/505* (2010.01)
(Continued)

(52) U.S. Cl.
CPC .............. *H01M 4/525* (2013.01); *B01J 2/18* (2013.01); *C25B 1/14* (2013.01); *H01M 4/505* (2013.01);
(Continued)

(58) Field of Classification Search
CPC ....................................................... C25B 1/14
(Continued)

(56) References Cited

U.S. PATENT DOCUMENTS 8,906,551 B2 12/2014 Chan et al.
9,590,247 B2 3/2017 Chan
(Continued)

FOREIGN PATENT DOCUMENTS

WO 2013158307 A1 10/2013
WO 2013192417 A1 12/2013
(Continued)

OTHER PUBLICATIONS

Ohzuku, T. et al., "Electrochemistry and Structural Chemistry of LiNiO2 (R3m) for 4 Volt Secondary Lithium Cells", Journal of The Electrochemical Society, Mar. 1993, vol. 140, No. 7, pp. 1862-1870 <DOI:10.1149/1.2220730>.
(Continued)

*Primary Examiner* — Brian W Cohen
(74) *Attorney, Agent, or Firm* — Fish & Richardson P.C.

(57) ABSTRACT

Exfoliating transition metal oxide lithium intercalation particles having lithium ions intercalated between transition metal oxide nanosheets includes electrochemically oxidizing a transition metal in first transition metal oxide lithium intercalation particles from a first oxidation state to a second oxidation state, inserting first cations having a radius exceeding the radius of a lithium ion into the vacancies, reducing the transition metal from the second oxidation state to the first oxidation state, and exfoliating the transition metal oxide nanosheets from the second transition metal oxide lithium intercalation particles to yield dispersed transition metal oxide nanosheets comprising the transition metal in the first oxidation state and oxygen. The dispersed transition metal oxide nanosheets can be reassembled to yield a material suitable for a lithium-ion battery cathode. Metal oxide sodium intercalation particles can be similarly exfoliated and reassembled to yield a material suitable for a sodium-ion battery cathode.

17 Claims, 28 Drawing Sheets

(51) Int. Cl.
  *H01M 10/0525* (2010.01)
  *C25B 1/14* (2006.01)
  *B01J 2/18* (2006.01)
  *H01M 4/02* (2006.01)
(52) U.S. Cl.
  CPC .. *H01M 10/0525* (2013.01); *H01M 2004/028* (2013.01)
(58) Field of Classification Search
  USPC ..................................................... 205/57–66
  See application file for complete search history.

(56) References Cited

U.S. PATENT DOCUMENTS

| | | | |
|---|---|---|---|
| 9,853,324 | B2 | 12/2017 | Chan et al. |
| 10,128,488 | B2 | 11/2018 | Chan |
| 10,170,759 | B2 | 1/2019 | Seo et al. |
| 2016/0141605 | A1 | 5/2016 | Chan et al. |
| 2018/0362360 | A1 | 12/2018 | Weller et al. |
| 2019/0062176 | A1 | 2/2019 | Weller et al. |

FOREIGN PATENT DOCUMENTS

| | | |
|---|---|---|
| WO | 2014134350 A1 | 9/2014 |
| WO | 2014205381 A1 | 12/2014 |
| WO | 2015006010 A2 | 1/2015 |
| WO | 2015038735 A1 | 3/2015 |

OTHER PUBLICATIONS

Ohzuku, T. et al., "Layered Lithium Insertion Material of LiCo1/3Ni1/3Mn1/3O2 for Lithium-Ion Batteries", Chemistry Letters, 2001, vol. 30, No. 7, pp. 642-643 <DOI:10.1246/cl.2001.642>.
Okubo, M. et al., "Nanosize Effect on High-Rate Li-Ion Intercalation in LiCoO2 Electrode", Journal of the American Chemical Society, May 2007, vol. 129, No. 23, pp. 7444-7452 <DOI:10.1021/ja0681927>.
Osada, M. et al., "Two-Dimensional Dielectric Nanosheets: Novel Nanoelectronics From Nanocrystal Building Blocks", Advanced Materials, Jan. 2012, vol. 24, No. 2, pp. 210-228 <DOI:10.1002/adma.201103241>.
Patridge, C. et al., "In-situ X-ray absorption spectroscopy analysis of capacity fade in nanoscale-LiCoO2", Journal of Solid State Chemistry, Jul. 2013, vol. 203, pp. 134-144 <DOI:10.1016/j.jssc.2013.04.008>.
Paulsen, J. et al., "Layered LiCoO2 with a Different Oxygen Stacking (O2 Structure) as a Cathode Material for Rechargeable Lithium Batteries", Journal of the Electrochemical Society, 2000, vol. 147, No. 2, pp. 508-516 <DOI:10.1149/1.1393225>.
Peng, L. et al., "Chemically Integrated Inorganic-Graphene Two-Dimensional Hybrid Materials for Flexible Energy Storage Devices", Small, Dec. 2016, vol. 12, No. 45, pp. 6183-6199 <DOI:10.1002/smll.201602109>.
Peng, L. et al., "Self-assembled LiNi1/3Co1/3Mn1/3O2 nanosheet cathodes with tunable rate capability", Nano Energy, Oct. 2015, vol. 17, pp. 36-42 <DOI:10.1016/j.nanoen.2015.07.031>.
Reimers, J. et al., "Electrochemical and In Situ X-Ray Diffraction Studies of Lithium Intercalation in LixCoO2", Journal of the Electrochemical Society, 1992, vol. 139, No. 8, pp. 2091-2097 <DOI:10.1149/1.2221184>.
Rougier, A. et al., "Optimization of the composition of the Li1-zNi1+zO2 Electrodematerials: Structural, Magnetic, and electrochemical studies", Journal of the Electrochemical Society, Apr. 1996, vol. 143, pp. 1168-1175 <DOI:10.1149/1.1836614>.
Ruffo, R. et al., "Electrochemical behavior of LiCoO2 as aqueous lithium-ion battery electrodes", Electrochemistry Communications, Feb. 2009, vol. 11, No. 2, pp. 247-249 <DOI:10.1016/j.elecom.2008.11.015>.

Sakai, N. et al., "Electronic Band Structure of Titania Semiconductor Nanosheets Revealed by Electrochemical and Photoelectrochemical Studies", Journal of the American Chemical Society, Apr. 2004, vol. 126, No. 18, pp. 5851-5858 <DOI:10.1021/ja0394582>.
Sasaki, T. et al., "Macromolecule-like Aspects for a Colloidal Suspension of an Exfoliated Titanate. Pairwise Association of Nanosheets and Dynamic Reassembling Process Initiated from It", Journal of the American Chemical Society, Sep. 1996, vol. 118, No. 35, pp. 8329-8335 <DOI:10.1021/ja960073b>.
Sasaki, T. et al., "Osmotic Swelling to Exfoliation. Exceptionally High Degrees of Hydration of a Layered Titanate", Journal of the American Chemical Society, Apr. 1998, vol. 120, No. 19, pp. 4682-4689 <DOI:10.1021/ja974262l>.
Schaak, R. et al., "Prying Apart Ruddlesden-Popper Phases: Exfoliation into Sheets and Nanotubes for Assembly of Perovskite Thin Films", Chemistry of Materials, Oct. 2000, vol. 12, No. 11, pp. 3427-3434 <DOI:10.1021/cm000495r>.
Seo, J-W. et al., "Two-Dimensional Nanosheet Crystals", Angewandte Chemie, Nov. 2007, vol. 46, No. 46, pp. 8828-8831 <DOI:10.1002/anie.200703175>.
Shaju, K. et al., "Performance of layered Li(Ni1/3Co1/3Mn1/3)O2 as cathode for Li-ion batteries", Electrochimica Acta, Nov. 2002, vol. 48, No. 2, pp. 145-151 <DOI:10.1016/S0013-4686(02)00593-5>.
Song, B. et al., "Structural evolution and the capacity fade mechanism upon long-term cycling in Li-rich cathode material", Physical Chemsitry Chemical Physics, Jul. 2012, vol. 14, No. 37, pp. 12875-12883 <DOI:10.1039/C2CP42068F>.
Song, M-S. et al., "Porously Assembled 2D Nanosheets of Alkali Metal Manganese Oxides with Highly Reversible Pseudocapacitance Behaviors", The Journal of Physical Chemistry C, Nov. 2010, vol. 114, No. 50, pp. 22134-22140 <DOI:10.1021/jp108969s>.
Sugimoto, W. et al., "Electrophoretic deposition of negatively charged tetratitanate nanosheets and transformation into preferentially oriented TiO2(B) film", Journal of Materials Chemistry, Sep. 2002, vol. 12, No. 12, pp. 3814-3818 <DOI:10.1039/B204185E>.
Sugimoto, W. et al., "Fabrication of Thin-Film, Flexible, and Transparent Electrodes Composed of Ruthenic Acid Nanosheets by Electrophoretic Deposition and Application to Electrochemical Capacitors", Journal of the Electrochemical Society, 2006, vol. 153, No. 2, pp. A255-A260 <DOI:10.1149/1.2138570>.
Takahashi, Y. et al., "Single-crystal synthesis, structure refinement and electrical properties of Li0.5CoO2", Journal of Physics: Condensed Matter, Sep. 2007, vol. 19, No. 43, 12 pages <DOI:10.1088/0953-8984/19/43/436202>.
Takahashi, Y. et al., "Structure and electron density analysis of electrochemically and chemically delithiated LiCoO2 single crystals", Journal of Solid State Chemistry, Jan. 2007, vol. 180, No. 1, pp. 313-321 <DOI:10.1016/j.jssc.2006.10.018>.
Tan, C. et al., "Wet-chemical synthesis and applications of non-layer structured two-dimensional nanomaterials", Nature Communications, Aug. 2015, vol. 6, article 7873, 13 pages <DOI:10.1038/ncomms8873>.
Tintignac, S. et al., "High performance sputtered LiCoO2 thin films obtained at a moderate annealing treatment combined to a bias effect", Electrochimica Acta, Jan. 2012, vol. 60, pp. 121-129 <DOI:10.1016/j.electacta.2011.11.033>.
Wang, H. et al., "TEM Study of Electrochemical Cycling-Induced Damage and Disorder in LiCoO2 Cathodes for Rechargeable Lithium Batteries", Journal of the Electrochemical Society, 1999, vol. 146, No. 2, pp. 473-480 <DOI:10.1149/1.1391631>.
Wang, L. "Fabrication and Characterization of Multilayer Ultrathin Films of Exfoliated MnO2 Nanosheets and Polycations", Chemistry of Materials, Jun. 2003, vol. 15, No. 15, pp. 2873-2878 <DOI:10.1021/cm034191r>.
Wang, L. et al., "Recent advances in layered LiNixCoyMn1-x-yO2 cathode materials for lithium ion batteries", Journal of Solid State Electrochemistry, Aug. 2009 (available online Sep. 2008), vol. 13, No. 8, pp. 1157-1164 <DOI:10.1007/s10008-008-0671-7>.
Wang, L. et al., "Synthesis of a Li—Mn-oxide with Disordered Layer Stacking through Flocculation of Exfoliated MnO2 Nanosheets, and Its Electrochemical Properties", Chemistry of Materials, Oct. 2003, vol. 15, No. 23, pp. 4508-4514 <DOI:10.1021/cm0217809>.

(56) References Cited

OTHER PUBLICATIONS

Yabuuchi, N. et al., "Solid-State Chemistry and Electrochemistry of LiCo1/3Ni1/3Mn1/3O2 for Advanced Lithium-Ion Batteries", Journal of the Electrochemical Society, 2007, vol. 154, No. 4, pp. A314-A321 DOI:10.1149/1.2455585>.
Yabuuchi, N. et al., "Solid-State Chemistry and Electrochemistry of LiCo1/3Ni1/3Mn1/3O2 for Advanced Lithium-Ion Batteries", Journal of the Electrochemical Society, 2005, vol. 152, No. 7, pp. A1434-A1440 <DOI:10.1149/1.1924227>.
Yang, W. et al., "Synthesis and electrochemical characterization of pillared layered Li1-2xCaxCoO2", Journal of Physics and Chemistry of Solids, May-Jun. 2006, vol. 67, No. 5-6, pp. 1343-1346 <DOI:10.1016/j.jpcs.2006.01.067>.
Zeng, Z. et al., "An Effective Method for the Fabrication of Few-Layer-Thick Inorganic Nanosheets", Angewandte Chemie, Sep. 2012, vol. 51, No. 36, pp. 9052-9056 <DOI:10.1002/anie.201204208>.
Zeng, Z. et al., "Single-Layer Semiconducting Nanosheets: High-Yield Preparation and Device Fabrication", Angewandte Chemie, Nov. 2011, vol. 50, No. 47, pp. 11093-11097 <DOI:10.1002/anie.201106004>.
Zhang, S., "Characterization of high tap density Li[Ni1/3Co1/3Mn1/3]O2 cathode material synthesized via hydroxide co-precipitation", Electrochimica Acta, Sep. 2007, vol. 52, No. 25, pp. 7337-7342 <DOI:10.1016/j.electacta.2007.06.015>.
Zhang, X. et al., "2D Materials Beyond Graphene for High-Performance Energy Storage Applications", Advanced Energy Materials, Dec. 2016, vol. 6, No. 23, article 1600671, 21 pages <DOI:10.1002/aenm.201600671>.
Zheng, H. et al., "Correlation between dissolution behavior and electrochemical cycling performance for LiNi1/3Co1/3Mn1/3O2-based cells", Journal of Power Sources, Jun. 2012, vol. 207, pp. 134-140 <DOI:10.1016/j.ipowsour.2012.01.122>.
Zou, M. et al., "Synthesis of High-Voltage (4.5 V) Cycling Doped LiCoO2 for Use in Lithium Rechargeable Cells", Chemistry of Materials, Nov. 2003, vol. 15, No. 25, pp. 4699-4702 <DOI:10.1021/cm0347032>.
Akatsuka, K. et al., "Electronic Band Structure of Exfoliated Titanium- and/or Niobium-Based Oxide Nanosheets Probed by Electrochemical and Photoelectrochemical Measurements", The Journal of Physical Chemistry C, May 2012, vol. 116, No. 23, pp. 12426-12433 <DOI:10.1021/jp302417a>.
Amatucci, G. et al., "Cobalt dissolution in LiCoO2-based non-aqueous rechargeable batteries", Solid State Ionics, Jan. 1996 (available online Aug. 2001), vol. 83, No. 1-2, pp. 167-173 <DOI:10.1016/0167-2738(95)00231-6>.
Amatucci, G. et al., "CoO2, The End Member of the LixCoo2 Solid Solution", Journal of the Electrochemical Society, Mar. 1996, vol. 143, No. 3, pp. 1114-1123 <DOI:10.1149/1.1836594>.
Augustyn, V. et al., "Effects of Chemical versus Electrochemical Delithiation on the Oxygen Evolution Reaction Activity of Nickel-Rich Layered LiMO2", The Journal of Physical Chemistry Letters, Sep. 2015, vol. 6, No. 19, pp. 3787-3791 <DOI:10.1021/acs.jpclett.5b01538>.
Belharouak, I. et al., "Li(Ni1/3Co1/3Mn1/3)O2 as a suitable cathode for high power applications", Journal of Power Sources, Sep. 2003, vol. 123, No. 2, pp. 247-252 <DOI:10.1016/S0378-7753(03)00529-9>.
Bourgeat-Lami, E. et al., "Mechanism of the Thermal Decomposition of Tetraethylammonium in Zeolite ß", Journal of Physical Chemistry, Apr. 1992, vol. 96, No. 9, pp. 3807-3811 <DOI:10.1021/j100188a044>.
Buchberger, I. et al., "Aging Analysis of Graphite/LiNi1/3Mn1/3Co1/3O2 Cells Using XRD, PGAA, and AC Impedance", Journal of the Electrochemical Society, Oct. 2015, vol. 162, No. 14, pp. A2737-A2746 <DOI:10.1149/2.0721514jes>.
Butler, S. et al., "Progress, Challenges, and Opportunities in Two-Dimensional Materials Beyond Graphene", ACS Nano, Mar. 2013, vol. 7, No. 4, pp. 2898-2926 <DOI:10.1021/nn400280c>.

Carlier, D. et al., "Structural Study of the T#2-LixCoO2 (0.52 < x ≤ 0.72) Phase", Inorganic Chemistry, Jan. 2004, vol. 43, No. 3, pp. 914-922 <DOI:10.1021/ic026285t>.
Cheng, Q. et al., "Exfoliation of LiNi1/3Mn1/3Co1/3O2 into Nanosheets Using Electrochemical Oxidation and Reassembly with Dialysis or Flocculation", Langmuir, Apr. 2017, vol. 33, No. 37, pp. 9271-9279 <DOI:10.1021/acs.langmuir.7b00621>.
Cheng, Q. et al., "Oxidation-reduction assisted exfoliation of LiCoO2 into nanosheets and reassembly into functional Li-ion battery cathodes", Journal of Materials Chemistry A, Jan. 2016, vol. 4, No. 18, pp. 6902-6910 <DOI:10.1039/C5TA09069E>.
Choi, S. et al., "Comparison of Metal Ion Dissolutions from Lithium Ion Battery Cathodes", Journal of the Electrochemical Society, Jul. 2006, vol. 153, No. 9, pp. A1760-A1764 <DOI:10.1149/1.2219710>.
Choi, S. et al., "Factors Influencing the Layered to Spinel-like Phase Transition in Layered Oxide Cathodes", Journal of the Electrochemical Society, Jul. 2002, vol. 149, No. 9, pp. A1157-A1163 <DOI:10.1149/1.1497171>.
Compton, O. et al., "Exfoliation and Reassembly of Cobalt Oxide Nanosheets into a Reversible Lithium-Ion Battery Cathode", Small, Apr. 2012, vol. 8, No. 7, pp. 1110-1116 <DOI:10.1002/smll.201101131>.
Delmas, C. et al., "A new variety of LiCoO2 with an unusual oxygen packing obtained by exchange reaction", Materials Research Bulletin, Jan. 1982, vol. 17, No. 1, pp. 117-123 <DOI:10.1016/0025-5408(82)90192-1>.
Ebner, W. et al., "The LiNiO2/carbon lithium-ion battery", Solid State Ionics, Aug. 1994, vol. 69, No. 3-4, pp. 238-256 <DOI:10.1016/0167-2738(94)90413-8>.
Fu, F. et al., "Synthesis of single crystalline hexagonal nanobricks of LiNi1/3Co1/3Mn1/3O2 with high percentage of exposed {010} active facets as high rate performance cathode material for lithium-ion battery", Journal of Materials Chemistry A, Feb. 2013, vol. 1, No. 12, pp. 3860-3864 <DOI:10.1039/C3TA01618H>.
Geim, A. et al., "Van der Waals heterostructures", Nature, Jul. 2013, vol. 499, pp. 419-425 <DOI:10.1038/nature12385>.
Gunjakar, J. et al., "Exploration of Nanostructured Functional Materials Based on Hybridization of Inorganic 2D Nanosheets", The Journal of Physical Chemistry C, Jan. 2014, vol. 118, No. 8, pp. 3847-3863 <DOI:10.1021/jp410626y>.
Hang, M. et al., "Impact of Nanoscale Lithium Nickel Manganese Cobalt Oxide (NMC) on the Bacterium Shewanella oneidensis MR-1", Chemistry of Materials, Jan. 2016, vol. 28, No. 4, pp. 1092-1100 <DOI:10.1021/acs.chemmater.5b04505>.
He, P. et al., "Layered lithium transition metal oxide cathodes towards high energy lithium-ion batteries", Journal of Materials Chemistry, Jan. 2012, vol. 22, No. 9, pp. 3680-3695 <DOI:10.1039/C2JM14305D>.
Huang, Z-D. et al., "Microscopically porous, interconnected single crystal LiNi1/3Co1/3Mn1/3O2 cathode material for Lithium ion batteries", Journal of Materials Chemistry, May 2011, vol. 21, pp. 10777-10784 <DOI:10.1039/c1jm00059d>.
Hwang, B. et al., "A Combined Computational/Experimental Study on LiNi1/3Co1/3Mn1/3O2", Chemistry of Materials, Aug. 2003, vol. 15, No. 19, pp. 3676-3682 <DOI:10.1021/cm030299v>.
Inaba, M. et al., "Raman Study of Layered Rock-Salt LiCoO2 and Its Electrochemical Lithium Deintercalation", Journal of Raman Spectroscopy, Dec. 1997, vol. 28, pp. 613-617 <DOI:10.1002/(SICI)1097-4555(199708)28:8%3C613::AID-JRS138%3E3.0.CO;2-T>.
Jang, D. et al., "Dissolution of Spinel Oxides and Capacity Losses in 4 V Li/ LixMn2 O 4 Cells", Journal of the Electrochemical Society, 1996, vol. 143, No. 7, pp. 2204-2211 <DOI:10.1149/1.1836981>.
Jung, Y. et al., "Enhanced Stability of LiCoO2 Cathodes in Lithium-Ion Batteries Using Surface Modification by Atomic Layer Deposition", Journal of the Electrochemical Society, 2010 (available online Nov. 2009), vol. 157, No. 1, pp. A75-A81 <DOI:10.1149/1.3258274>.
Kim, I. et al., "Unique Advantages of Exfoliated 2D Nanosheets for Tailoring the Functionalities of Nanocomposites", The Journal of

(56) References Cited

OTHER PUBLICATIONS

Physical Chemistry Letters, Nov. 2014, vol. 5, No. 23, pp. 4149-4161 <DOI:10.1021/jz502038g>.
Kim, J-M. et al., "Role of transition metals in layered Li[Ni,Co,Mn]$O_2$ under electrochemical operation", Electrochimica Acta, Sep. 2004, vol. 49, No. 21, pp. 3573-3580 <DOI:10.1016/j.electacta.2004.03.025>.
Kim, J-Y. et al., "Exfoliation Route to Nanostructured Cobalt Oxide with Enhanced Thermoelectric Performance", Applied Physics Express, May 2011, vol. 4, No. 6, article 065201, 3 pages <DOI:10.1143/APEX.4.065201>.
Kim, J-Y. et al., "Nanostructured thermoelectric cobalt oxide by exfoliation/restacking route", Journal of Applied Physics, Dec. 2012, vol. 112, article 113705, 9 pages <DOI:10.1063/1.4768258>.
Kim, K. et al., "Electrochemical properties of mixed cathode consisting of μm-sized $LiCoO_2$ and nm-sized Li [$Co_{0.1}Ni_{0.15}Li_{0.2}Mn_{0.55}$]$O_2$ in lithium rechargeable batteries", Journal of Applied Electrochemistry, Sep. 2009, vol. 39, pp. 1487-1495 <DOI:10.1007/s10800-009-9828-z>.
Kim, T. et al., "Mesoporous assembly of 2D manganate nanosheets intercalated with cobalt ions", Materials Letters, Mar. 2010, vol. 64, No. 5, pp. 565-568 <DOI:10.1016/j.matlet.2009.11.071>.
Kim, T. et al., "Soft-Chemical Exfoliation Route to Layered Cobalt Oxide Monolayers and Its Application for Film Deposition and Nanoparticle Synthesis", Chemistry A European Journal, Oct. 2009, vol. 15, No. 41, pp. 10752-10761 <DOI:10.1002/chem.200901590>.
Kim. J-M. et al., "The first cycle characteristics of Li[$Ni_{1/3}Co_{1/3}Mn_{1/3}$]$O_2$ charged up to 4.7 V", Electrochemical Acta, Mar. 2004, vol. 49, No. 6, pp. 937-944 <DOI:10.1016/j.electacta.2003.10.005>.
Larcher, D. et al., "Electrochemically Active $LiCoO_2$ and $LiNiO_2$ Made by Cationic Exchange under Hydrothermal Conditions", Journal of the Electrochemical Society, Feb. 1997, vol. 144, No. 2, pp. 408-417 <DOI:10.1149/1.1837424>.
Lee, K. et al., "Heterolayered Li+–$MnO_2$–[$Mn_{1/3}Co_{1/3}Ni_{1/3}$]$O_2$ Nanocomposites with Improved Electrode Functionality: Effects of Heat Treatment and Layer Doping on the Electrode Performance of Reassembled Lithium Manganate", The Journal of Physical Chemistry C, Jan. 2012, vol. 116, No. 5, pp. 3311-3319 <DOI:10.1021/jp210063c>.
Lee, K-S. et al., "Structural and Electrochemical Properties of Layered Li†$Ni_{1-2x}Co_xMn_x$‡$O_2$ „x=0.1-0.3 . . . Positive Electrode Materials for Li-Ion Batteries", Journal of the Electrochemical Society, Aug. 2007, vol. 154, No. 10, pp. A971-A977 <DOI:10.1149/1.2769831>.
Lee, S. et al., "The Nature of Lithium Battery Materials under Oxygen Evolution Reaction Conditions", Journal of the American Chemical Society, Oct. 2012, vol. 134, No. 41, pp. 16959-16962 <DOI:10.1021/ja307814j>.
Li, J. et al., "$LiNi_{1/3}Co_{1/3}Mn_{1/3}O_2$ Nanoplates with {010} Active Planes Exposing Prepared in Polyol Medium as a High-Performance Cathode for Li-Ion Battery", ACS Applied Materials & Interfaces, Mar. 2014, vol. 6, No. 7, pp. 5075-5082 <DOI:10.1021/am500215b>.
Li, W. et al., "In situ x-ray diffraction and electrochemical studies of $Li_{1-x}NiO_2$", Solid State Ionics, Dec. 1993, vol. 67, No. 1-2, pp. 123-130 <DOI:10.1016/0167-2738(93)90317-V>.
Liu, X. et al., "A mixture of $LiNi_{1/3}Co_{1/3}Mn_{1/3}O_2$ and $LiCoO_2$ as positive active material of LIB for power application", Journal of Power Sources, Dec. 2007, vol. 174, No. 2, pp. 1126-1130 <DOI:10.1016/j.jpowsour.2007.06.184>.
Lu, Z. et al., "Electrochemical tuning of layered lithium transition metal oxides for improvement of oxygen evolution reaction", Nature Communications, Jul. 2014, vol. 5, article 4345, 7 pages <DOI:10.1038/ncomms5345>.
Luo, J. et al., "Bulk Nanostructured Materials Based on Two-Dimensional Building Blocks: A Roadmap", ACS Nano, Sep. 2015, vol. 9, No. 10, pp. 9432-9436 <DOI:10.1021/acsnano.5b05259>.
Madsen, F. et al., "The Swelling Behaviour of Clays", Applied Clay Science, Jun. 1989, vol. 4, No. 2, pp. 143-156 <DOI:10.1016/0169-1317(89)90005-7>.
Mas-Ballesté, R. et al., "2D materials: to graphene and beyond", Nanoscale, 2011 (available online Sep. 2010), vol. 3, No. 1, pp. 20-30 <DOI:10.1039/C0NR00323A>.
Mashtalir, O. et al., "Amine-Assisted Delamination of $Nb_2C$ MXene for Li-Ion Energy Storage Devices", Advanced Materials, Jun. 2015, vol. 27, No. 23, pp. 3501-3506 <DOI:10.1002/adma.201500604>.
Mendoza-Sánchez, B. et al., "Synthesis of Two-Dimensional Materials for Capacitive Energy Storage", Advanced Materials, Aug. 2016, vol. 28, No. 29, pp. 6104-6135 <DOI:10.1002/adma.201506133>.
Nicolosi, V. et al., "Liquid Exfoliation of Layered Materials", Science, Jun. 2013, vol. 340, No. 6139, article 1226419, 20 pages <DOI:10.1126/science.1226419>.
Oh, E-J. et al., "Unilamellar Nanosheet of Layered Manganese Cobalt Nickel Oxide and Its Heterolayered Film with Polycations", ACS Nano, Jul. 2010, vol. 4, No. 8, pp. 4437-4444 <DOI:10.1021/nn100286u>.
Oh, S. et al., "Structural and electrochemical properties of layered Li[$Ni_{0.5}Mn_{0.5}$]$_{1-x}Co_xO_2$ positive materials synthesized by ultrasonic spray pyrolysis method", Solid State Ionics, Jul. 2004, vol. 171, No. 3-4, pp. 167-172 <DOI:10.1016/j.ssi.2004.04.012>.
Qian Cheng et al., Oxidation-Reduction Assisted Exfoliation of $LiCoO_2$ into Nanosheets and Reassembly into Functional Li-ion Battery Cathodes. J. Mater. Chem. A, 2016, 9 pages.
Qian Cheng et al., Electronic Supplementary Information (ESI) for: Oxidation-Reduction Assisted Exfoliation of $LiCoO_2$ into Nanosheets and Reassembly into Functional Li-ion Battery Cathodes. J. Mater. Chem. A, 2016, 10 pages.
Qian Cheng et al., Exfoliation of $LiNi_{1/3}Mn_{1/3}Co_{1/3}O_2$ into Nanosheets Using Electrochemical Oxidation and Reassembly with Dialysis or Flocculation. Langmuir, Article ASAP, American Chemical Society, Apr. 26, 2017, 9 pages.

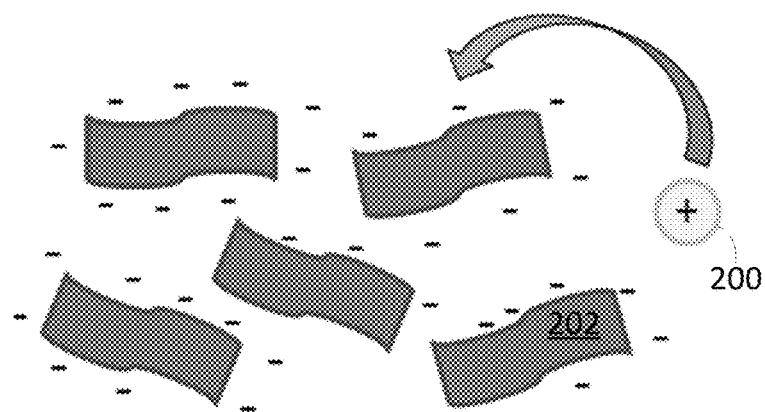
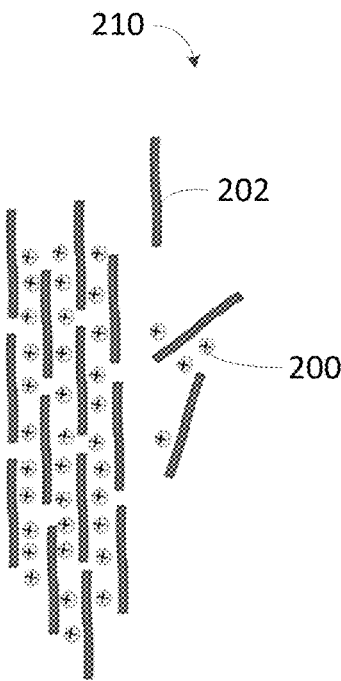
FIG. 2A
FIG. 2B
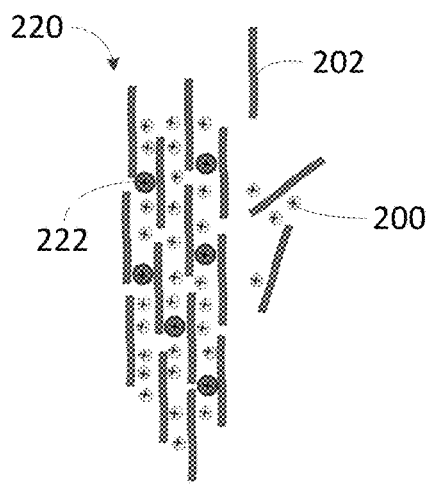
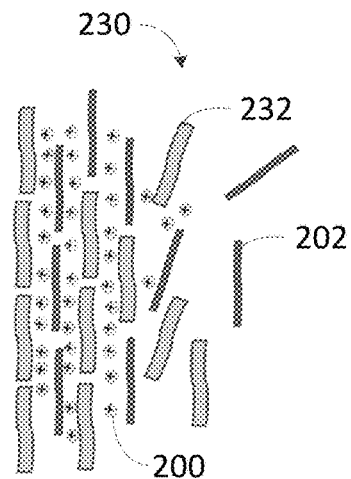
FIG. 2C
FIG. 2D

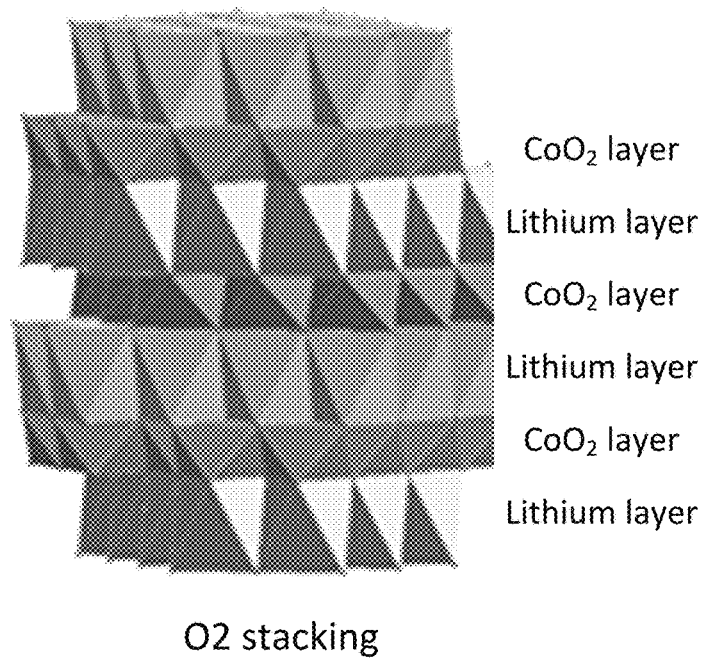
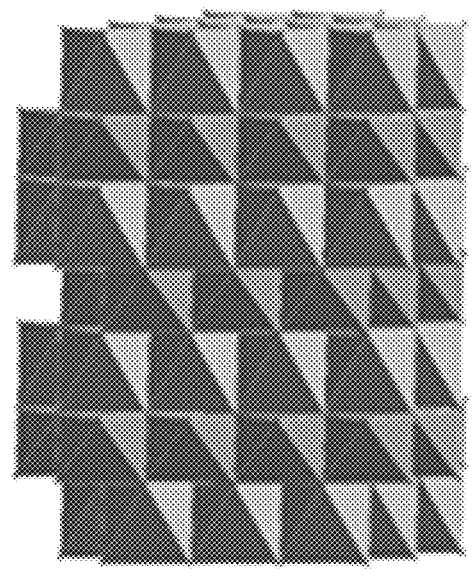
O2 stacking
FIG. 14A
O3 stacking
FIG. 14B

OXIDATION-REDUCTION ASSISTED EXFOLIATION AND REASSEMBLY OF TRANSITION METAL OXIDE LITHIUM INTERCALATION COMPOUNDS

CROSS-REFERENCE TO RELATED APPLICATION

This application claims the benefit of U.S. Provisional Application Ser. No. 62/367,942 entitled "OXIDATION-REDUCTION ASSISTED EXFOLIATION AND REASSEMBLY OF TRANSITION METAL OXIDE LITHIUM INTERCALATION COMPOUNDS" and filed on Jul. 28, 2016, the content of which is incorporated by reference herein in its entirety.

BACKGROUND

Although intercalation compounds have dominated commercial energy storage devices such as Li-ion batteries, it is still a major challenge to discover higher capacity materials with suitable cation sites, good redox potentials, and structural stability. Recently, two-dimensional (2D) materials (e.g., graphene, $MoS_2$) have attracted attention due to their structural and electronic characteristics, with hybrid structures having interstratified structures of particular interest. The synthesis of these hybrid structures from nanosheet building blocks that can be reassembled, restacked, or deposited layer-by-layer, is an active field of research. Since conventional intercalation compounds are layered structures, they can in theory also be exfoliated into 2D nanosheets. Analogous hybrid structures can also be realized through the reassembly of these nanosheet components.

The strong interlayer bonding found in layered transition metal oxides makes the exfoliation process for these materials more difficult than in graphene and $MoS_2$, which have weak interlayer van der Waals bonding. In order to exfoliate these materials, protonated forms of the metal oxide are typically prepared and then ion-exchanged in solutions containing tetraalkylammonium cations, which leads to exfoliation through the insertion of the bulky cations and osmotic swelling. For compounds relevant to electrochemical energy storage applications, however, this proton-exchange method is ineffective since it can lead to irreversible binding of protons or the formation of hydrated phases, which can have detrimental effects on electrochemical properties.

SUMMARY

A modified exfoliation approach to synthesize nanosheets that utilizes electrochemical oxidation to circumvent the proton exchange requirement is described herein. The exfoliation mechanism is not driven by an acid/base neutralization reaction as for the protonated metal oxides. Rather, the intercalation of tetraethylammonium cations inside the metal oxide layers is assisted by the oxidation of hydroxide, reduction of the metal, and driving force towards electroneutrality. As a result, the exfoliation process is much faster and yields nanosheet materials that are free from adsorbed protons. The nanosheets may be reassembled back into bulk metal oxide and electrochemically characterized. The restacked nanosheets demonstrate the expected discharge capacity under galvanostatic cycling.

As described herein, restacking techniques including flocculation and slow diffusion to allow the formation of well-ordered structures. Since the purified transition metal oxide nanosheets have negative surface charges as colloidal solutions, introduction of a cation salt results in restacking of the layered structure via flocculation. The flocculation is typically fast and results in porous materials that may contain stacking faults. For certain materials that display a diversity of polytypes originating from different layer stacking sequences, this flocculation-based restacking may allow access to non-equilibrium phases not easily obtained using other methods. A reassembly method based on slow diffusion of the cation through a semi-permeable membrane allows for slow, well-controlled reassembly of the sheets into larger, micron-sized particles. This approach minimizes defects, forms more stable structures, and yields bulk-like materials and two-dimensional (2D) nanosheets.

In a first general aspect, exfoliating transition metal oxide particles with lithium ions intercalated between transition metal oxide layers includes i) electrochemically oxidizing a transition metal in first transition metal oxide lithium intercalation particles from a first oxidation state to a second oxidation state, thereby liberating lithium ions from the first transition metal oxide lithium intercalation particles and forming lithium vacancies between the transition metal oxide nanosheets; ii) inserting first cations having a radius exceeding the radius of a lithium ion into the vacancies; iii) reducing the transition metal from the second oxidation state to the first oxidation state, thereby yielding second transition metal oxide lithium intercalation particles comprising lithium ions and the first cations intercalated between the transition metal oxide nanosheets, wherein the transition metal is in the second oxidation state; and iv) exfoliating the transition metal oxide nanosheets from the second transition metal oxide lithium intercalation particles to yield dispersed transition metal oxide nanosheets comprising the transition metal in the first oxidation state and oxygen.

Implementations of the first general aspect may include one or more of the following features.

The transition metal oxide can include one or more transition metals. The transition metal oxide may include one or more of nickel, manganese, and cobalt. The first cations may include a quaternary amine, such as triethylammonium. The second transition metal oxide lithium intercalation particles may be substantially free from protons.

Reducing the transition metal from the second oxidation state to the first oxidation state includes oxidizing hydroxide ions to yield oxygen. Exfoliating the transition metal oxide nanosheets from the second transition metal lithium intercalation particles may include agitating a liquid mixture including the second transition metal oxide lithium intercalation particles.

In some implementations, the first general aspect further includes purifying the dispersed transition metal oxide nanosheets by removing first cations coupled to the dispersed transition metal oxide nanosheets. Purifying the dispersed transition metal oxide nanosheets may include dialysis or electrophoresis. The dispersed transition metal oxide nanosheets can include single and double layer nanosheets.

In some implementations, the first general aspect further includes reassembling the dispersed transition metal oxide nanosheets to yield a material. Reassembling the dispersed transition metal oxide nanosheets may include contacting second cations with the dispersed transition metal oxide nanosheets. The material can be a nanosheet homostructure including the transition metal oxide nanosheets and the second cations, wherein the second cations include a single type of cation. The material may be a nanosheet homostructure including the transition metal oxide nanosheets and the second cations, wherein the second cations include two or more types of cations. In some cases, the transition metal oxide nanosheets are first transition metal oxide nanosheets, and the material is a nanosheet heterostructure including the first transition metal oxide nanosheets, second transition metal oxide nanosheets, and the second cations, wherein the second transition metal oxide nanosheets differ from the first transition metal oxide nanosheets. The second cations can include alkali and alkaline earth metal ions such as lithium ions, sodium ions, calcium ions, potassium ions, barium ions, magnesium ions, or a combination thereof.

A second general aspect includes the dispersed transition metal oxide nanosheets formed by the method of the first general aspect.

A third general aspect includes a material formed by reassembling the dispersed transition metal oxide nanosheets of the second general aspect to yield a material.

A fourth general aspect includes a lithium ion battery cathode including the material of the third general aspect.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 2A depicts the introduction of cations to a colloidal solution of nanosheets. FIG. 2B depicts a nanosheet homostructure prepared by reassembling one type of nanosheets using one type of cation. FIG. 2C depicts a nanosheet homostructure reassembled with two different cations. FIG. 2D depicts a heterostructure prepared from two different types of nanosheets.

FIG. 13A shows the XRD pattern of the LCO particles, with the inset showing fitting results to the O2 and O3-LCO reflections (# indicates $Co_3O_4$). FIG. 13B shows the differential capacity vs. potential plot obtained from the galvanostatic measurement showing delithiation from O2 and O3-LCO domains in the LCO particles.

FIGS. 14A and 14B show LCO polytypes O2-LCO and O3-LCO, respectively, with different $CoO_2$ slab arrangements in the layer stacking direction along the c-axis.

FIG. 15A shows an XRD pattern matching O3-LCO; * indicate peaks from Al foil substrate. FIG. 15B shows galvanostatic cycling data between 3.0-4.3 V vs. $Li/Li^+$. FIG. 15C shows Coulombic efficiency and charge/discharge capacity for each cycle.

DETAILED DESCRIPTION

Oxidation-reduction assisted exfoliation and reassembly of transition metal oxide lithium intercalation compounds via electrochemical oxidation are described, in which nanosheet building blocks are formed from layered transition metal oxide materials with strong ionic interlayer bonding, and metastable phases, pillared materials, and heterostructures are formed through the controlled restacking of these nanosheets.

Figure 1:
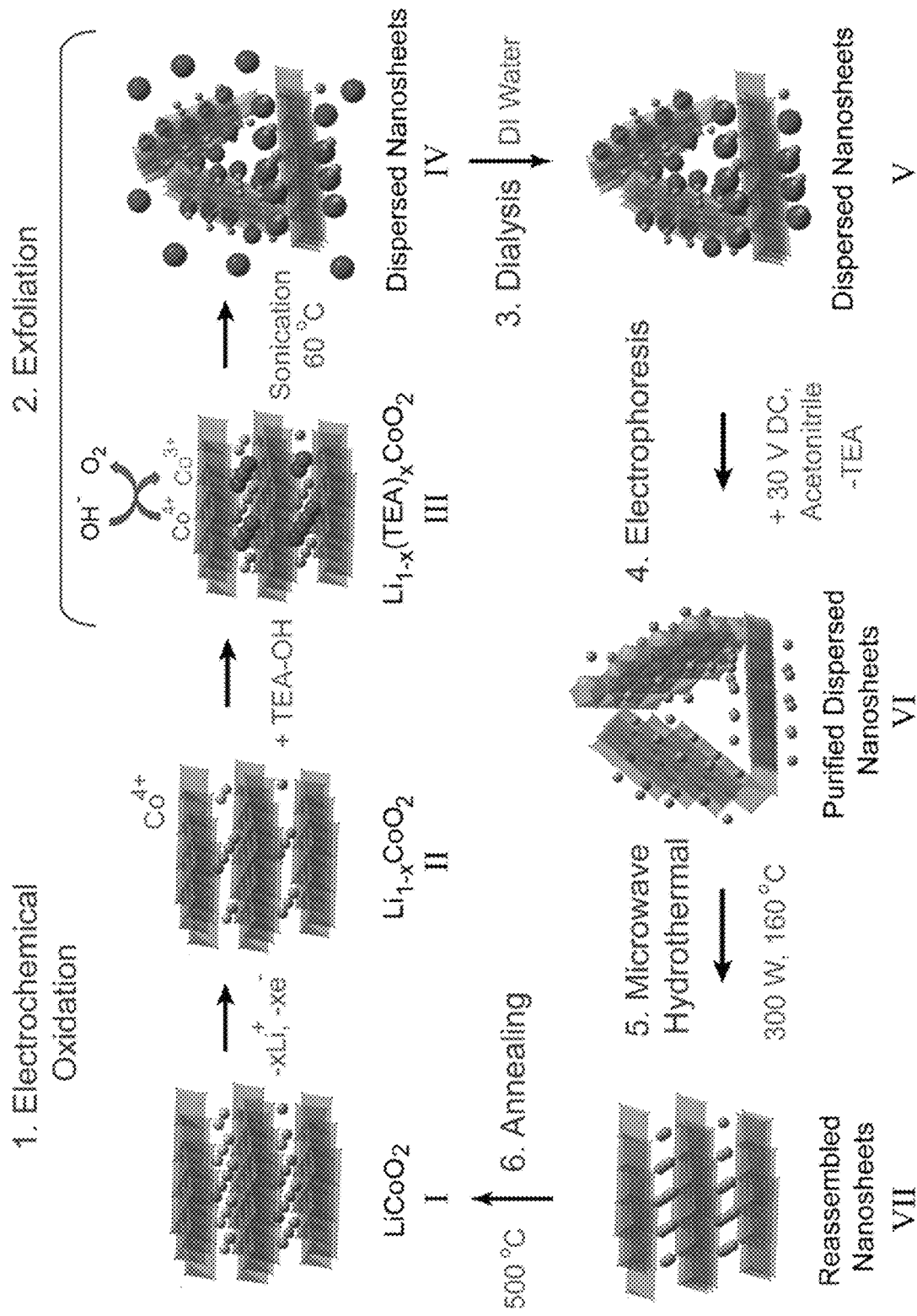
FIG. 1 depicts a process for exfoliation of $LiCoO_2$ (LCO) into nanosheets, followed by purification and reassembly.

In one example, as depicted in FIG. 1 and described in more detail below, $LiCoO_2$ (LCO) is exfoliated into two-dimensional (2D) nanosheets after intercalation with tetraethylammonium cations ($TEA^+$). The nanosheets may be purified and reassembled. This synthetic methodology enables the synthesis of 2D nanosheets from layered Li cathode materials. These nanosheets can then be restacked into new materials, providing the groundwork for the design and fabrication of high performance hybrid materials for energy storage applications.

Nanosheets may be reassembled by flocculation to obtain metastable phases. Since the purified transition metal oxide nanosheets have negative surface charges as colloidal solutions, introduction of a cation salt can result in restacking of the layered structure via flocculation. The flocculation is typically fast and results in porous materials (through "house-of-cards" type stacking) that also contain many stacking faults. For certain materials that display a diversity of polytypes originating from different layer stacking sequences, this flocculation-based restacking may enable access to non-equilibrium phases not easily obtained using other methods.

Controlled reassembly of nanosheets may be achieved by dialysis, or the slow diffusion of cations through a semi-permeable membrane, such that the reassembly of the sheets into larger, micron-sized particles is slow and well controlled. This approach minimizes defects, forms more stable structures, and yields bulk-like materials. This controlled reassembly method can also enable the synthesis of new materials. For example, a mixture of typical cations (e.g., $Li^+$, $Na^+$) and larger, atypical cations (e.g., $Ca^{2+}$, $K^+$) can be used in the restacking solution to promote the formation of "pillared" structures, whereby atypical cations are used to stabilize structures or prevent unwanted side reactions.

FIG. 2A depicts the introduction of cations 200 to a colloidal suspension of nanosheets 202, resulting in the formation of materials such as nanosheet homostructures 210, nanosheet homostructures 220 with different types of interlayer cations 200 and 222, and composite heterostructures 230 with two different types of nanosheets 202 and 232, depicted in FIGS. 2B-2D, respectively. Nanosheet homostructures with different cations are formed by reassembling the nanosheets in a mixture of two or more different cations, while composite heterostructures are formed by reassembling a mixture of two or more different nanosheet materials.

Examples described herein are of interest for Li-ion and Na-ion battery applications. The reassembled materials may also be applicable to pseudocapacitor applications. Controlled reassembly of nanosheet building blocks may be used to obtain: 1) pillared structures from LCO and NMC with atypical cations such as $Ca^{2+}$ and $K^+$ substituting the $Li^+$ sites, to yield materials that are stable to high degrees of lithiation without phase transformation to spinel structures; 2) and heterostructures containing alternating domains of LCO and NMC layers in order to exploit the synergistic properties of cathode composites but with superior interfaces.

Electrodes of commercial bulk LCO and NMC are electrochemically oxidized in half-cells vs. Li metal to create Li vacancies and increase the interlayer distance. Subsequently, the electrodes were immersed in solutions containing tetraalkylammonium hydroxide and exfoliation of the nanosheets occurred through intercalation of the bulky cations. The colloidal nanosheet suspensions were then purified using electrophoresis to remove adsorbed organic layers. Afterwards, the nanosheet colloids were reassembled through the slow introduction of cations through a dialysis membrane.

The nanosheets may be reassembled to form pillared structures. The relationship between the concentrations and ratios of cations in the exchanging solution (e.g., $Li^+$ vs. $K^+$) and the resulting crystal structure and electrochemical properties (e.g., redox potential, cycling reversibility) of the pillared materials are described, with particular attention to the requirements to suppress unwanted phase transformations, such as the layered to spinel transition at high degrees of delithiation.

The ratio of LCO to NMC nanosheets in the solution may be varied. The distribution of the LCO and NMC domains within each reassembled particle may be studied using high resolution transmission electron microscopy, electron diffraction, and energy dispersive X-ray spectroscopy mapping. Pillaring within the heterostructures may improve the structural stability of the different layers in the heterostructure.

The following examples are provided for illustration. It should be appreciated by those of skill in the art that the techniques disclosed in the following examples are considered to be exemplary. However, those of skill in the art should, in light of the present disclosure, appreciate that many changes can be made in the specific embodiments that are disclosed without departing from the spirit and scope of this disclosure.

EXAMPLES

Example 1: $LiCoO_2$ (LCO) Nanosheets

Materials Characterization of LCO Nanosheets

XRD characterization was performed with monochromatic Cu Kα radiation (λ=1.5405 Å, Panalytical X'pert Pro). Field emission scanning electron microscopy (SEM, XL30) was used to examine the morphology of reassembled LCO particles.

Multiple-collector inductively coupled plasma mass spectrometry (iCaP Q ICP-MS, Thermo Scientific) was used to analyze the composition of the LCO after charging (sample II in FIG. 1, after exfoliation in TEA solution (sample IV), after electrophoresis (sample VI), and after reassembly (sample VII). To obtain sample IV, the solution containing LCO suspended in TEA was centrifuged at 5000 rpm to remove the unexfoliated LCO particles, followed by vacuum-filtration through a 0.22 μm PVDF filter membrane (Sigma-Aldrich, Durapore) to obtain only nanosheets. All of the samples were digested with 70% nitric acid (trace metal grade) at 160° C. and 300 psi using a microwave hydrothermal reactor (Discover-SP, 909150).

For thermal gravimetric analysis, the LCO nanosheets were recovered from the TEA solution using centrifugation and the sample was dried in air at 105° C. overnight. The sample (9.82 mg) was placed in a silicon crucible that was suspended from the arm of a microbalance. The crucible was then heated in a vertical tube furnace (Setaram TG 92) to 1000° C. with a ramp rate of 0.15° C./sec in oxygen and the change in mass was recorded.

For Raman spectroscopy, the nanosheets were recovered from the TEA solution using centrifugation (>14,000 rpm for half an hour) and dried at 50° C. Raman spectra were collected with a 532 nm laser and a triple-grating monochromator (SpectraPro 300i, Action Research). The laser beam was focused onto the sample through a Mitutoyo M Plan Apo 50× objective with 0.42 N.A. Measuring powers at the samples were 230 µW and 47 µW for bulk LCO and LCO nanosheets respectively, and all spectra were collected with an exposure times of 60 s and 20 scans.

To prepare samples for TEM characterization, the nanosheet dispersion was centrifuged at 5000 rpm to remove the unexfoliated particles first. Then, the LCO nanosheets were separated from the aqueous TEA solutions using centrifugation at 14,000 rpm (Microfuge, I8) and collected from the decanted phase. The recovered LCO nanosheets were re-dispersed in isopropanol (LCO IPA dispersion) by sonicating with a tip probe sonicator (CPX 600, 660 W) for 10 min and dropped onto a Cu grid for TEM characterization (JEOL 2010F) under 200 keV.

For AFM characterization, the LCO IPA dispersion was drop cast onto clean silicon substrates using spin coating at 600 rpm. The silicon substrate was sonicated in deionized (DI) water, ethanol, and acetone for 30 minutes separately to clean the surface. AFM measurements were performed using an Asylum Research (MFP 3D, classic) microscope with tapping mode.

Electrochemical Testing of LCO Nanosheets

Cyclic Voltammetry (CV):

The as-prepared TEA-nanosheet dispersion was washed using dialysis in DI water first, then centrifuged at 14000 rpm to separate the nanosheets. This sample was then re-dispersed in N-methyl-2-pyrrolidone (NMP, Sigma Aldrich). Nanosheets collected from the anode after electrophoresis were re-dispersed in NMP directly. Polyvinylidene difluoride (PVDF, Sigma Aldrich) and graphite (C-Nergy, KS-6) were added into the nanosheet/NMP slurries with a ratio of 7:2:1 by weight. The slurry was coated onto Al foil using a doctor blade, then heated at 110° C. for at least 12 hours until completely dry. The acquired electrode was assembled into a pouch cell with Li metal as the counter electrode. 1 M $LiPF_6$ in EC/DMC/DEC (4:2:4) was used as the electrolyte (MTI Corp) and the separator was monoPE from Celgard. The CV measurements were performed using a potentiostat (Biologic MPG2) with a scan rate of 1 mV/s.

Galvanostatic Cycling:

The LCO active material was mixed with graphite and PVDF with a weight ratio of 8:1:1. The electrode and pouch cells were prepared as described before. Galvanostatic cycling was performed using a 0.2 C rate (25 mA/g) from 4.3 to 3 V vs. $Li/Li^+$ (MPG2, Biologic). Differential capacity analysis was performed using the EC-lab software from Biologic.

Exfoliation and Reassembly of LCO 2D Nanosheets

Electrochemical Oxidation $LiCoO_2$ powder (I in FIG. 1) was obtained (Sigma-Aldrich, particle size 2-5 µm) and mixed in de-ionized (DI) water with 5 wt % carboxymethyl cellulose (CMC, $M_w$~250K, Sigma-Aldrich) to serve as binder. In order to avoid complicating the subsequent nanosheet purification and characterization, conducting carbon was not used in preparing the LCO electrodes. The slurry was subsequently coated onto aluminum foil current collectors and the dried electrodes were assembled with lithium metal counter electrodes into pouch cells. The electrolyte was 1 M $LiPF_6$ in EC/DMC/DEC (4:2:4 by vol, MTI Corp) and the separator was monoPE (Celgard).

Figure 3:
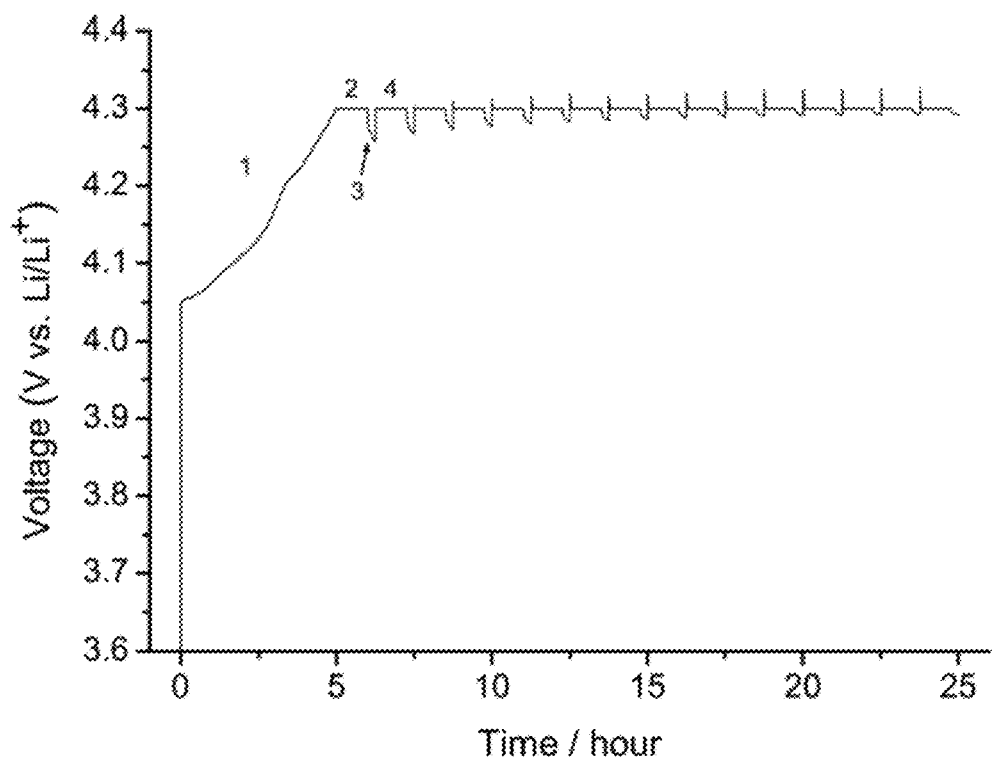
FIG. 3 shows the voltage vs. time plot of the charging process used to oxidize $LiCoO_2$.

Since the slurries did not contain conducting carbon to facilitate electron transport through the electrode, the following charging protocol was used to ensure that the $LiCoO_2$ was oxidized to form $Li_{1-x}CoO_2$ (II in FIG. 1), with a target of x=0.5. FIG. 3 shows the voltage vs. time of the charging process used to oxidize $LiCoO_2$. In region 1, the electrode was charged galvanostatically at a rate of 0.05 C until 4.3 V vs. $Li/Li^+$. Then the electrode was held at 4.3 V for 1 hour (region 2), followed by a 15 minute rest at open circuit (region 3) and another 1 hour hold at 4.3 V (region 4) if the open circuit voltage was less than 4.29 V. This was repeated for approximately 1 day until the open circuit voltage was higher than 4.29 V. First, the electrodes were electrochemically oxidized galvanostatically at a slow rate (0.05 C) to 4.3 V vs. $Li/Li^+$. Then, the electrode was potentiostatically charged at 4.3 V vs. $Li/Li^+$. The voltage bias was applied for 1 hour followed by a 15 min relaxation period at open circuit. This was repeated until the open circuit voltage after the rest period was higher than 4.29 V vs. $Li/Li^+$ (usually after ~1 day).

Exfoliation

After electrochemical oxidation, the $Li_{1-x}CoO_2$ electrode was washed with DI water several times to remove the CMC binder. Previous studies investigating the properties of $LiCoO_2$ as an electrode for aqueous Li-ion batteries showed that it is stable at pH 7 and does not undergo proton intercalation. After removal of CMC, the washed $Li_{1-x}CoO_2$ (0.14 g) was immersed in aqueous solutions (total volume 45 mL) containing different concentrations of tetraethylammonium hydroxide (TEA, ~40% in water, Sigma Aldrich). The ratio of TEA:$V_{Li^+}$ was varied at 0.5, 1, 2, 5, and 10. The concentrations and pH of these solutions are shown in Table 1. Table 1 shows the feasibility of $OH^-$ oxidation by the LCO electrode after it was charged to 4.3 V vs. $Li/Li^+$. After adding the $Li_{1-x}CoO_2$ into the TEA solutions (III in FIG. 1), the mixture was sonicated using a tip probe ultrasonicator (CPX 600, 660 W) for 15 minutes to assist with the intercalation of TEA into the $Li_{1-x}CoO_2$. Afterwards, the mixture was sonicated using a bath sonicator (CPX 1800H, 70 W) at 60° C. for two days. The use of elevated temperature during bath sonication was found to improve the yield of exfoliation. The solution was then centrifuged at 5000 rpm for 15 minutes to remove any unexfoliated particles. The unexfoliated particles in the pellet were used for XRD characterization, while the nanosheet dispersions (IV in FIG. 1) were taken from the decanted phase of the TEA:$V_{Li^+}$=1 solution for all other characterization (e.g., ICP-MS, Raman, TEM, SEM, AFM), as well as further processing (dialysis, electrophoresis) and subsequent electrochemical testing.

TABLE 1

The redox potential for OH⁻/O₂ in the different concentrations of TEA-OH solution

| TEA: $V_{Li^+}$ | Concentration of TEA-OH (mM) | Solution pH | Redox potential of OH⁻/O₂ | |
|---|---|---|---|---|
| | | | V vs. NHE | V vs. Li/Li⁺ |
| 10 | 166.2 | 13.65 | 0.42 | 3.46 |
| 5 | 83.1 | 13.40 | 0.44 | 3.48 |
| 2 | 33.2 | 13.09 | 0.46 | 3.50 |
| 1 | 16.6 | 12.83 | 0.47 | 3.51 |
| 0.5 | 8.3 | 12.55 | 0.49 | 3.53 |

Dialysis (Purification of Nanosheets)

To remove residual TEA from the nanosheet dispersions, dialysis was employed using a Slide-A-Lyzer Dialysis Cassette (30 mL capacity, Thermo Scientific) with pores that could allow molecules with molecular weight 20K or below to pass through. The nanosheet dispersions (IV in FIG. 1) were placed inside the dialysis cassette, which was then placed in 1 L of DI water and allowed to sit with slow stirring. The 1 L beaker was replaced with fresh DI water 4-6 times until the pH of the water decreased to 7 and the purified nanosheet dispersions (V in FIG. 1) were removed.

Dialysis (Reassembly of Nanosheets)

Dialysis was also employed to reassemble the nanosheets through the slow exchange of TEA⁺ with Li⁺. The LCO nanosheet/TEA⁺ dispersions (IV in FIG. 1) obtained from the decanted phase were dialyzed in 1 M LiNO₃ solution for 1 day using the same dialysis cassettes as above. Flocculation was observed due to the insertion of Li⁺ in between the nanosheets.

Electrophoresis

Electrophoresis was performed using a DC regulated power supply (Circuit Specialists, CSI 3003×5) to purify the LCO nanosheets and remove adsorbed TEA⁺. Fluorine-doped tin oxide (FTO) coated glass (TEC) was used as the substrate for both the cathode and anode. The nanosheet dispersion obtained after dialysis in DI water (V in FIG. 1) was collected using centrifugation at 14,000 rpm for half an hour and then re-dispersed in acetonitrile. After applying a 30 V DC bias, the anode was coated with a layer of cobalt oxide sheets and the cathode was covered with an insulating white film consisting of TEA.

Microwave Hydrothermal Treatment

After electrophoresis, the nanosheets (VI in FIG. 1) were collected from the FTO anode and re-dispersed with light sonication into DI water containing 1 M LiOH to reassemble the nanosheets back into LCO powders. Initially, the nanosheets dispersed in the LiOH solution quickly, indicating that there was strong electrical repulsion between the sheets. Within 10 minutes, flocculation was observed, indicating that the Li⁺ ions were re-inserted in between the negatively charged [CoO₂]⁻ layers. The flocculated suspension was then treated in a microwave hydrothermal reactor (Discover-SP, 300 W, 160° C., 300 psi) for 30 minutes (VII in FIG. 1) to improve the crystallinity of the reassembled particles.

Annealing

The LCO reassembled particles obtained after the microwave treatment (VII in FIG. 1) were recovered using vacuum filtration, then annealed at 500° C. for 2 hours in air using an oven (Lindberg M, Thermal Scientific) to remove solvent and any residual organics or carbon as well as improve the crystallinity of the sample.

Atomic Layer Deposition (ALD) Deposition

Al₂O₃ films were deposited on electrodes containing reassembled LCO using ALD (Cambridge Nanotech, Savannah). The weight ratio of LCO active material:graphite:PVDF was 8:1:1. The ALD chamber was heated up to around 180° C. for the Al₂O₃ deposition. 30 cycles were used and the thickness of Al₂O₃ deposited by each 1 cycle was around 1 Å.

Exfoliation of Nanosheets

The exfoliation process can be described by Equations (1)-(5):

$$LiCo^{3+}O_2 \rightarrow xLi^+ + xe^- + Li_{1-x}(V_{Li^+})_x(Co^{3+})_{1-x}(Co^{4+})_xO_2 \quad (1)$$

$$TEA\text{-}OH \rightarrow TEA^+ + OH^- \quad (2)$$

$$4OH^- \rightarrow 2H_2O + O_2 + 4e^- \quad (3)$$

$$Li_{1-x}(V_{Li^+})_x(Co^{3+})_{1-x}(Co^{4+})_xO_2 + xTEA^+ + xe^- \rightarrow Li_{1-x}(TEA^+)_x(Co^{3+})O_2 \quad (4)$$

$$Li_{1-x}CoO_2 + xTEA\text{-}OH \rightarrow Li_{1-x}(TEA^+)_xCoO_2 + (x/2)H_2O + (x/4)O_2 \quad (5)$$

Figure 4:
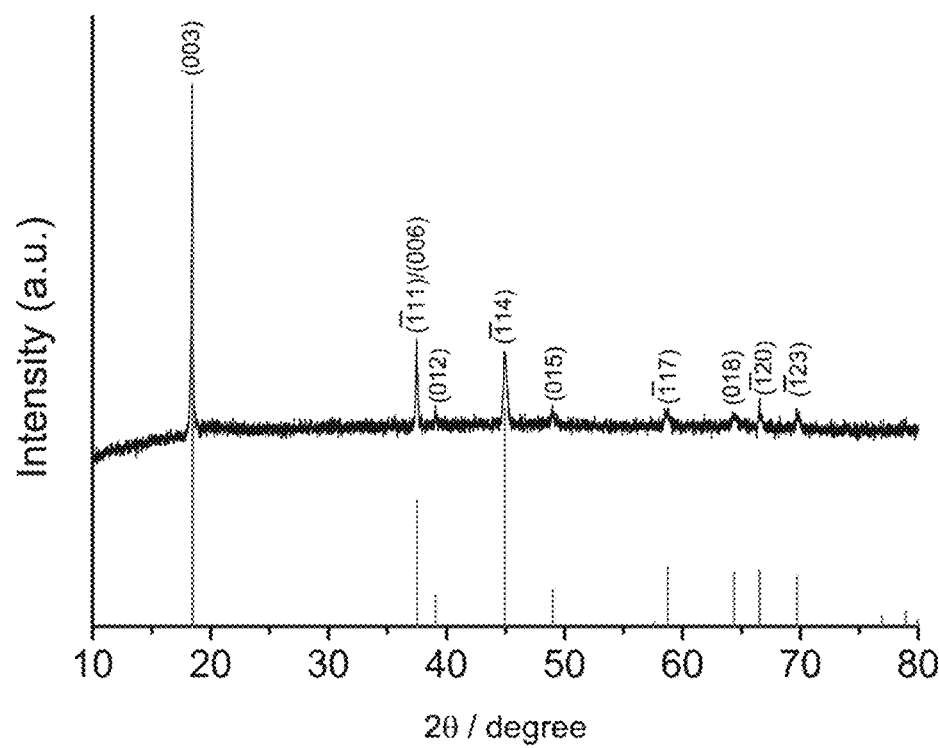
FIG. 4 shows an X-ray diffraction (XRD) pattern of the delithiated $Li_{1-x}CoO_2$ particles, matching the reference pattern for $Li_{0.5}CoO_2$.

Equation 1 describes the oxidation process in LCO during electrochemical charging, whereby Li⁺ extraction results in the formation of Li vacancies, $V_{Li^+}$. Electrodes prepared from commercial LiCoO₂ were charged in Li metal half-cells using a slow C-rate (0.05 C). During charging, the LiCoO₂ c-axis distance, which represents the interlayer spacing, steadily increases due to the larger electrostatic repulsion experienced by the negatively charged [CoO₂]⁻ layers during Li⁺ extraction and reaches a maximum at Li₀.₅CoO₂. Upon reaching 4.3 V vs. Li/Li⁺, approximately half of the Li⁺ can be extracted, with half of the Co³⁺ oxidized to Co⁴⁺. At this composition, the vacancies and Li⁺ have an ordered arrangement along the a-axis, which could potentially facilitate insertion of TEA cations due to the formation of clear diffusion pathways (FIG. 1). FIG. 4 shows an X-ray diffraction (XRD) pattern of the delithiated Li₁₋ₓCoO₂ particles, matching the reference pattern for Li₀.₅CoO₂.

The XRD pattern of the charged LCO particles matched the results previously obtained on single crystal Li₀.₅CoO₂, confirming that the oxidation was successful. Inductively coupled plasma-mass spectroscopy (ICP-MS) analysis on the charged LiₓCoO₂ particles showed that Li:Co was 0.58 (Table 2), slightly higher than expected, indicating that only 0.42 Li⁺ per LiCoO₂ were electrochemically extracted. The expected Li/Co ratio of 0.5 was not obtained most likely due to the low electronic conductivity in the carbon-free electrode, which prevented complete delithiation of the LCO. In Table 2, sample names correspond to the labels in FIG. 1.

TABLE 2

Composition of samples obtained using ICP-MS to determine the Li:Co and TGA to determine that adsorbed TEA.

| Sample | Composition |
|---|---|
| II | Li₀.₅₈CoO₂ |
| IV | Li₀.₂₂(TEA)₀.₀₉CoO₂ |
| VI | [CoO₂]⁻ |
| VII | Li₀.₉₉CoO₂ |

After obtaining the charged LiₓCoO₂ (II in FIG. 1), the electrode was rinsed with DI water, suspended in TEA-OH solution, and sonicated at 60° C. The TEA-OH solutions are highly alkaline and contain free hydroxide ions, as shown in Equation 2. Since the LCO was charged to 4.3 V vs. Li/Li⁺, it has sufficient oxidation potential (Table 1) to oxidize OH⁻ to O2 (Equation 3) and reduce $Co^{4+}$ back to $Co^{3+}$. Indeed, when using $LiCoO_2$ as an electrocatalyst for the oxygen evolution reaction (OER), the onset potential for $OH^-$ oxidation is around 0.8 V vs. NHE in pH 13 electrolyte, which is 3.84 V vs. $Li/Li^+$. With the formation of $Co^{3+}$, cations in the electrolyte, $TEA^+$ in this case, can then be intercalated into the LCO to maintain electroneutrality. This reaction is depicted in Equation 4 and represents the analogous discharge process in a Li-ion battery except with the insertion of $TEA^+$ instead of $Li^+$ and the use of $OH^-$ as an electron donor to reduce the $Co^{4+}$ back to $Co^{3+}$. The presence of $Li^+$ vacancies, the increased interlayer spacing, and the driving force to maintain electroneutrality after charging all promote the insertion of $TEA^+$ into the LCO structure. Hence, the overall reaction can be written as shown in Equation 5. Once the $Li_{1-x}(TEA^+)_xCoO_2$ organic intercalate phase is formed, the expanded interlayer distance can facilitate the exfoliation of the material into nanosheets with the assistance of mechanical agitation.

The amount of TEA in the exfoliation solution was varied with respect to the molar ratio of $Li^+$ vacancies in the $Li_{0.5}CoO_2$, with $TEA:V_{Li^+}$ of 0.5, 1, 2, 5 and 10 used. Ultrasonication with a tip probe sonicator for 15 minutes followed by bath sonication for 2 days at 60° C. was used to promote the exfoliation of LCO. After centrifugation to remove any unexfoliated particles, clear dispersions dark brown in color that displayed the Tyndall effect were observed for $TEA:V_{Li^+}$ of 0.5-2. The lightly colored solutions for $TEA:V_{Li^+}>2$ suggested that little exfoliation occurred at these concentrations. ICP-MS analysis of the nanosheets recovered from the $TEA:V_{Li^+}=1$ solution using centrifugation (IV in Scheme 1) showed that Li:Co was 0.22, confirming that some $Li^+$ was still adsorbed onto the nanosheets after exfoliation.

Figure 5:
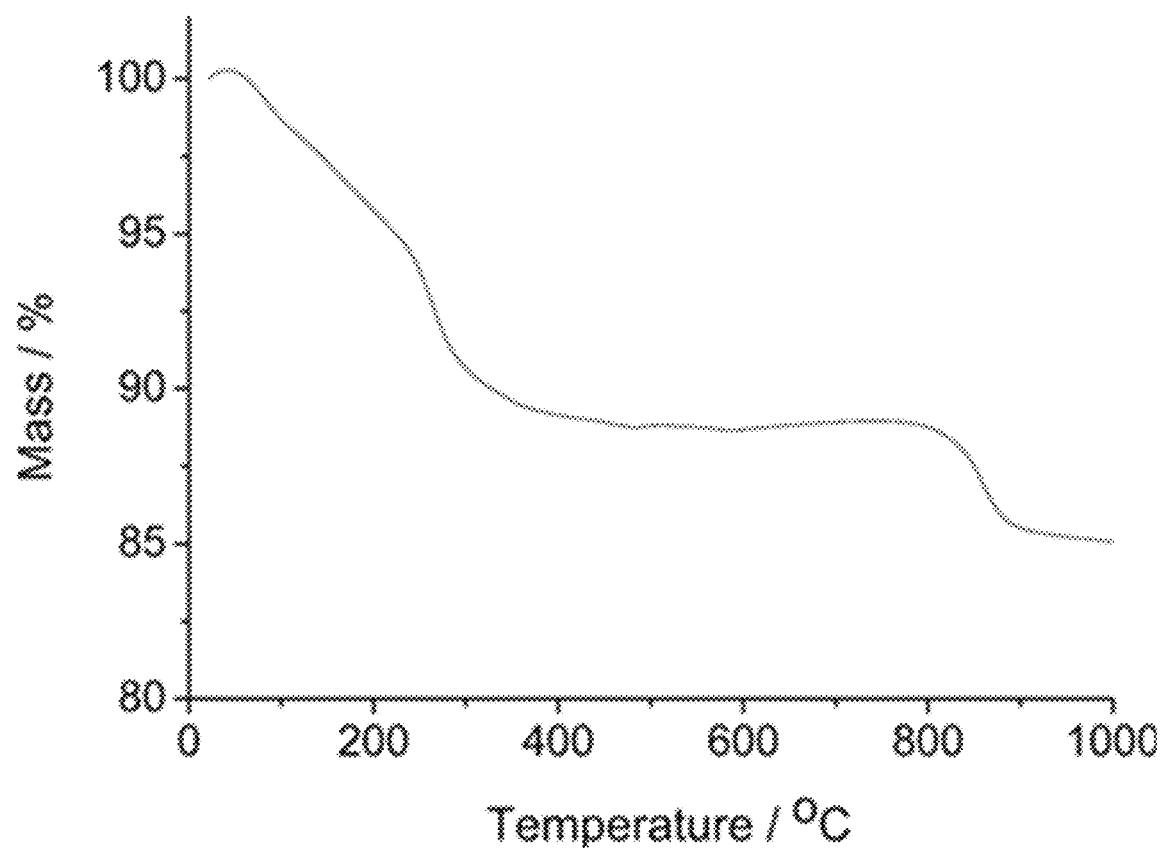
FIG. 5 shows the thermal gravimetric analysis of the LCO nanosheets that were recovered from the TEA solution ($TEA:V_{Li^+}=1$) using centrifugation.

In order to determine the amount of $TEA^+$ adsorbed on the nanosheets in sample IV, thermal gravimetric analysis (TGA) was performed in oxygen up to 1000° C. FIG. 5 shows the thermal gravimetric analysis of the LCO nanosheets that were recovered from the TEA solution ($TEA:V_{Li^+}=1$) using centrifugation. TEA degrades into ethylene and triethylamine between 200-500° C., and is fully combusted to $CO_2$ by 700° C. Hence, the weight loss observed in samples between 200-800° C. was assumed to be due to the removal of the $TEA^+$ from the nanosheets. At 500° C., the weight loss was 11.2% Using this value and the molecular weight of TEA, along with the Li/Co ratio obtained from ICP-MS, a composition of $Li_{0.22}(TEA)_{0.09}CoO_2$ was calculated for sample IV (Table 2). There is a large deviation from the expected composition of $Li_{0.5}(TEA)_{0.5}CoO_2$. This could be due to the large size of $TEA^+$, which caused it to occupy more space on the nanosheet surface. This also suggests that not all of the $Li^+$ vacancies need to be occupied by $TEA^+$ for exfoliation to occur.

Figure 6:
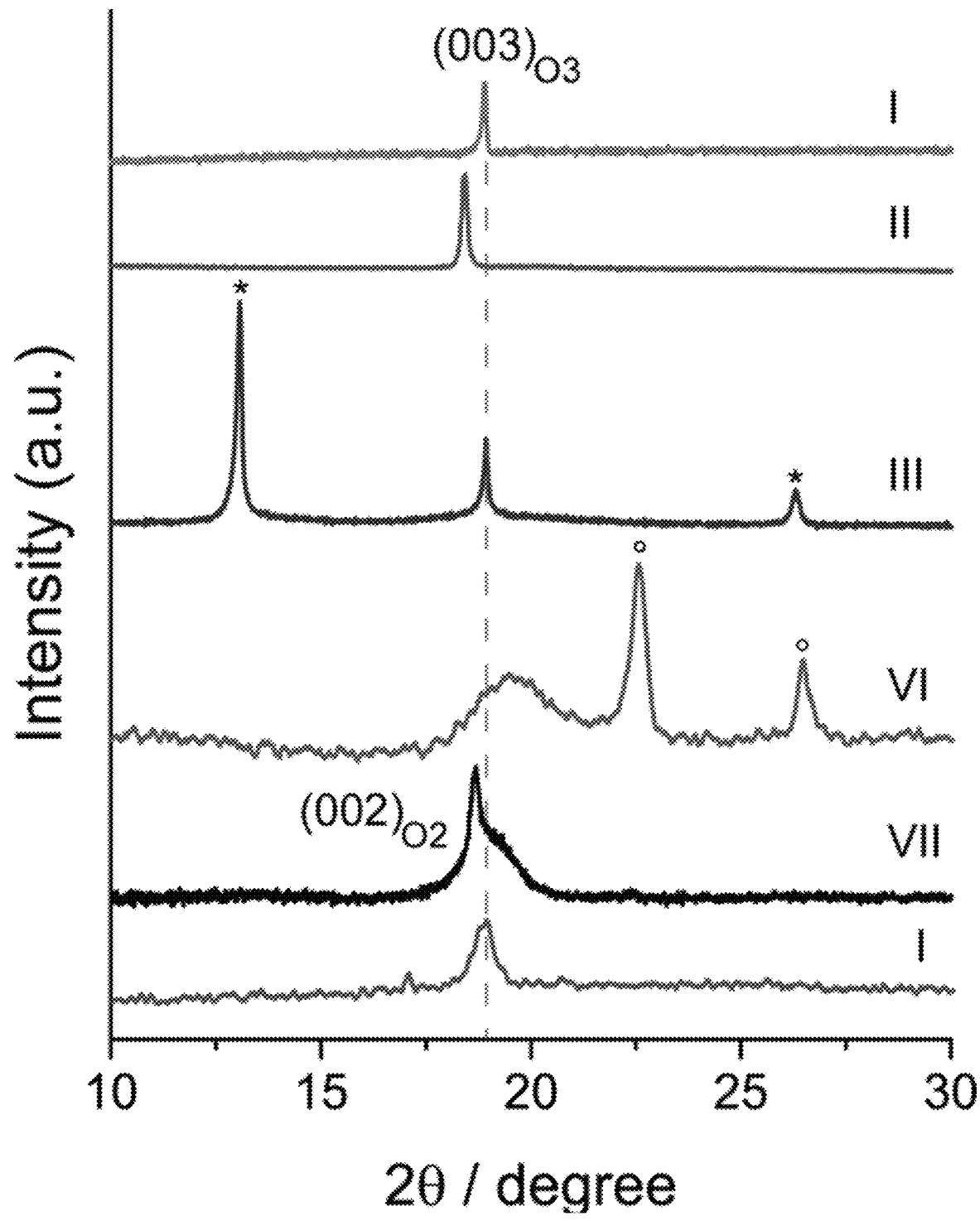
FIG. 6 shows XRD patterns of LCO materials after different steps in the exfoliation and reassembly process between $10°<2\theta<30°$, labeled according to FIG. 1.

X-ray diffraction (XRD) was used to characterize the LCO structure during the oxidation and exfoliation processes. FIG. 6 shows XRD patterns of LCO materials after different steps in the exfoliation and reassembly process between $10°<2\theta<30°$, labeled according to FIG. 1. Plot I (top) corresponds to the pristine, as-obtained powder. Plot II corresponds to the electrode after electrochemical oxidation (i.e., $Li_{1-x}CoO_2$). Plot III corresponds to unexfoliated powder after $TEA^+$ intercalation. Plot VI corresponds to the nanosheets deposited onto the FTO anode after electrophoresis. Plot VII corresponds to nanosheets purified using electrophoresis and reassembled in 1 M LiOH with microwave hydrothermal reaction. Plot I (bottom) corresponds to the reassembled $LiCoO_2$ particles after annealing at 500° C. for 2 hours. The dotted line at 18.9° corresponds to the (003) peak of pristine $LiCoO_2$. Asterisks correspond to LCO intercalated with TEA, and circles are peaks from FTO. Plots VI and I (bottom) are scaled 3 times for easier comparison. The as-obtained powder was in the form of the O3-polytype of LCO. The (003) reflection of the LCO at 18.9° shifted to lower angles after charging (full range in FIG. 4), confirming the expansion of the interlayer distance due to the electrochemical oxidation of LCO and extraction of $Li^+$. Upon treatment with TEA-OH, the XRD pattern of the unexfoliated LCO powders collected after centrifugation showed new reflections at ~13.1° and 26.3°, which can be attributed to the organic intercalate phase consisting of LCO with interlayer $TEA^+$. At the same time, the (003) reflection characteristic of discharged LCO was also observed, associated with particles that were not intercalated with TEA.

Figure 7A:
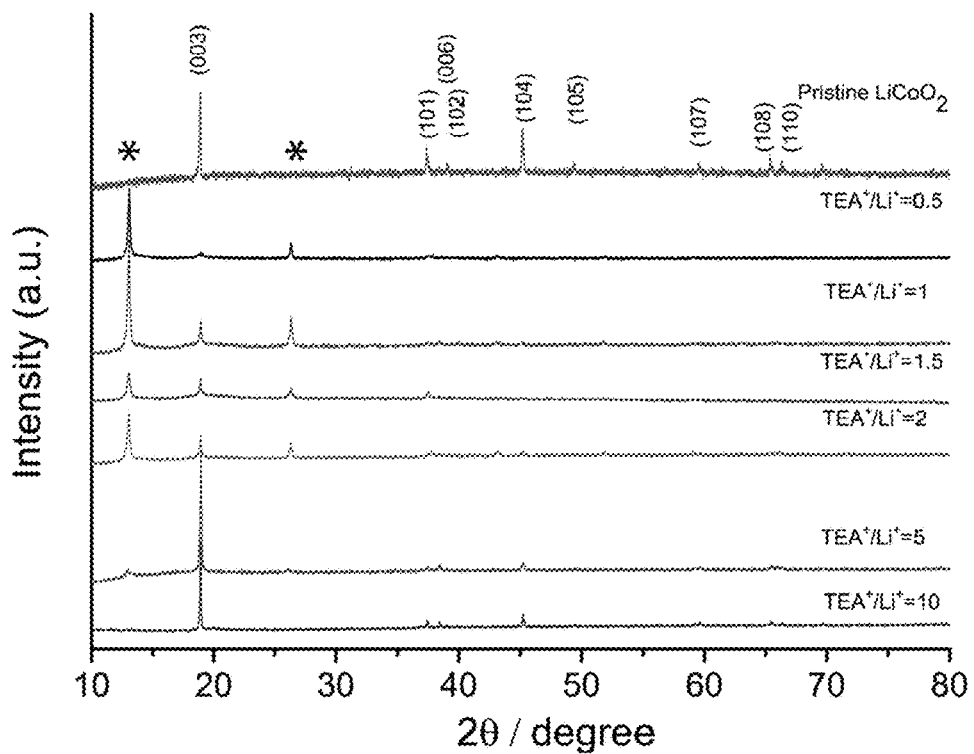
FIG. 7A shows the XRD patterns of pristine LCO (O3-type) and unexfoliated LCO obtained after sonication and centrifugation in solutions containing $TEA^+:V_{Li^+}$ of 0.5, 1, 2, 5, and 10.

FIG. 7A shows the XRD patterns of pristine LCO and LCO unexfoliated particles obtained after exposure to solutions with a $TEA:V_{Li^+}$ concentration of 0.5, 1, 2, 5, and 10, as indicated. Planes from O3-LCO are labelled and asterisks indicate peaks for the LCO intercalated with $TEA^+$. As the $TEA:V_{Li^+}$ concentration increased from 0.5 to 2, the amount of the TEA-intercalated phase decreased. The peaks associated with the TEA-intercalated phase were barely observable when $TEA:V_{Li^+}>5$. This result, along with the lightly colored dispersions, indicated that the insertion of TEA into LCO was not achieved in these solutions.

In the conventional exfoliation approach using proton-exchange, exfoliation is also not observed in solutions containing high concentrations of tetraalkylammonium ions. However, well-ordered swollen phases with large basal spacings are found in the centrifuged powders, consistent with the intercalation of large amounts of ammonium cations. This suggests that the absence of exfoliation is from the enhanced electrostatic interaction between the negatively charged metal oxide layers and ammonium cations inside the interlayer space. Here, however, the lack of organic intercalate phase indicates a different origin for the absence of exfoliation at higher TEA dosages.

As shown in Table 1, the higher pH of the solutions with higher concentrations of TEA decreases the redox potential for the $OH^-$ oxidation reaction. This would in turn decrease the overpotential for $OH^-$ oxidation, and hence, increase the rate of reduction of $Co^{4+}$. However, the intercalation of $TEA^+$, which is controlled by the solid state diffusion of the bulky cation in between the LCO layers, is not affected by the change in pH and is likely much slower than the $Co^{4+}$ reduction rate in the high TEA concentration solutions. Furthermore, it has been shown that large reduction currents (e.g., during high rate cycling) can cause the $Co^{3+}$ to be reduced to $Co^{2+}$, which can migrate to the $Li^+$ sites in the interlayer space.

Figure 7B:
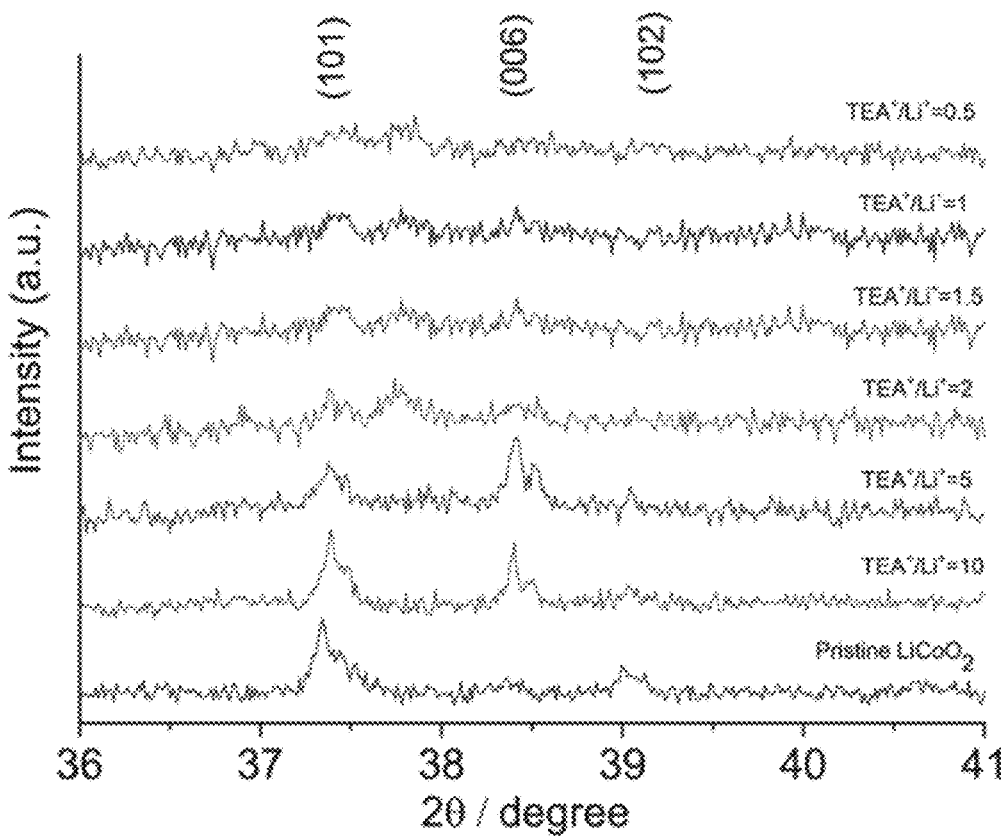
FIG. 7B shows XRD patterns from $36°<2\theta<41°$.

Examination of the XRD patterns between $35°<2\theta<45°$ revealed a large increase in the (006) peaks relative to the (101) reflections as the TEA concentration increased, which is an indication of the aforementioned Li/Co cation site disorder. FIG. 7B shows XRD patterns of pristine LCO and LCO with a $TEA:V_{Li^+}$ concentration of 0.5, 1, 2, 5, and 10 for $36°<2\theta<41°$, as indicated. Hence, the little exfoliation observed for the solutions with $TEA:V_{Li^+}>2$ could be from the formation of $Co^{2+}$, which could not only prevent exfoliation by blocking the $TEA^+$ diffusion pathways, but could also increase the attraction between neighboring $[CoO_2]^-$ sheets and hinder intercalation.

In contrast to protonated metal oxides, where more ammonium cations are intercalated in the higher dose solutions, the results show that very little organic intercalate forms in the high TEA solutions using this method. Hence, the exfoliation mechanism here is not believed to be driven by an acid/base neutralization reaction as for the protonated metal oxides, but rather one based on the stoichiometry of oxidized cobalt species formed during electrochemical oxidation. This exfoliation process is understood to be much faster than that usually obtained with osmotic swelling through the proton-exchange route, which usually requires several weeks. This is at least in part because the intercalation of $TEA^+$ is assisted by the oxidation of hydroxide and driving force towards electroneutrality, whereas the usual proton exchange method only relies on the diffusion of guest ions between layers.

Figure 8:
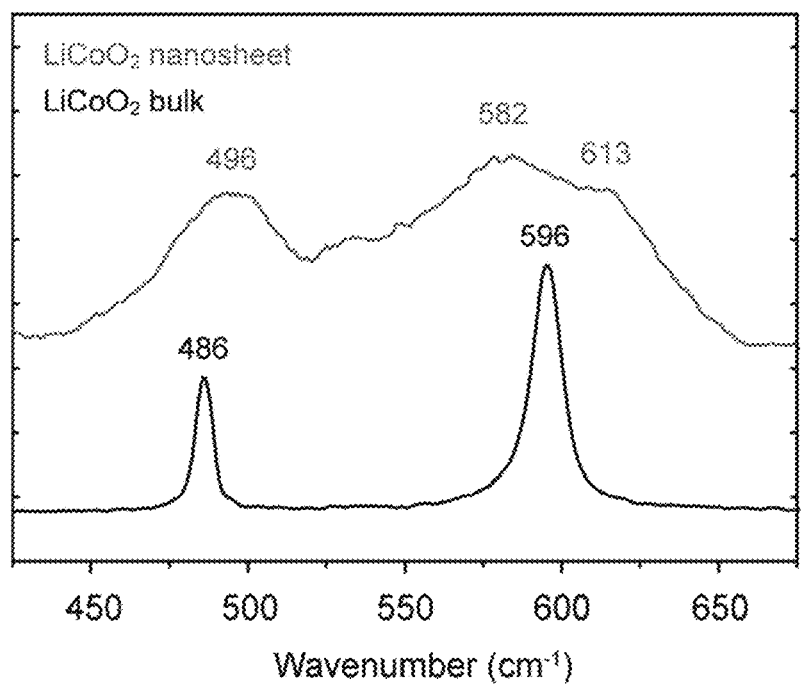
FIG. 8 shows a Raman spectrum of bulk LCO and $LiCoO_2$ nanosheets obtained by centrifuging the nanosheets exfoliated with $TEA^+:V_{Li^+}=1$.

The nanosheets were recovered from solution using centrifugation, and Raman spectroscopy was performed to acquire structural information. Commercial bulk LCO was used as a comparison. FIG. 8 shows Raman spectra of bulk LCO and $LiCoO_2$ nanosheets obtained by centrifuging the nanosheets exfoliated with $TEA^+:V_{Li^+}=1$. As shown in FIG. 8, the bulk LCO Raman spectrum was characterized by the $E_g$ peak at 486 $cm^{-1}$, which represents the O—Co—O bending mode in the a-b basal plane, and the $A_{1g}$ peak at 596 $cm^{-1}$, which corresponds to Co—O stretching modes along the c-axis. In comparison, the Raman spectrum of the nanosheets showed peak broadening and shifted towards higher wavenumbers, the latter which is correlated with an expansion in the c-axis. This is possible if the nanosheets reassembled with $TEA^+$ in between the layers during the centrifugation process. The peak broadening and shift to higher wavenumbers have also been correlated with the presence of nanosized crystals. In the nanosheet spectrum, the $A_{1g}$ peak was found to split into two peaks at 582 and 613 $cm^{-1}$, which could be the influence of adsorbed $TEA^+$ and $Li^+$ on the Co—O stretching mode. Also, no peaks from $LiCoO_2$ spinel or $Co_3O_4$ phases were observed, indicating that the layered hexagonal $[CoO_2]^-$ structure was maintained during exfoliation.

Purification of Nanosheets

Figure 9A:
FIG. 9A shows a high resolution transmission electron microscopy (TEM) image of exfoliated LCO nanosheets.

To purify the nanosheets and remove excess TEA, the nanosheet dispersions were subjected to dialysis in DI water. Transmission electron microscopy (TEM) of the dispersions after dialysis (sample V in FIG. 1) confirmed the nanosheet morphology. FIG. 9A shows a high resolution transmission electron microscopy (TEM) image of exfoliated LCO nanosheets. The high resolution TEM image and electron diffraction pattern revealed a hexagonal structure and a=2.814 Å, which matched that for bulk O3-LCO (a=2.817 Å, R$\bar{3}$m space group). The integrity of the basal plane confirmed that the exfoliation occurred in the layer stacking direction along the c-axis.

Figure 9B:
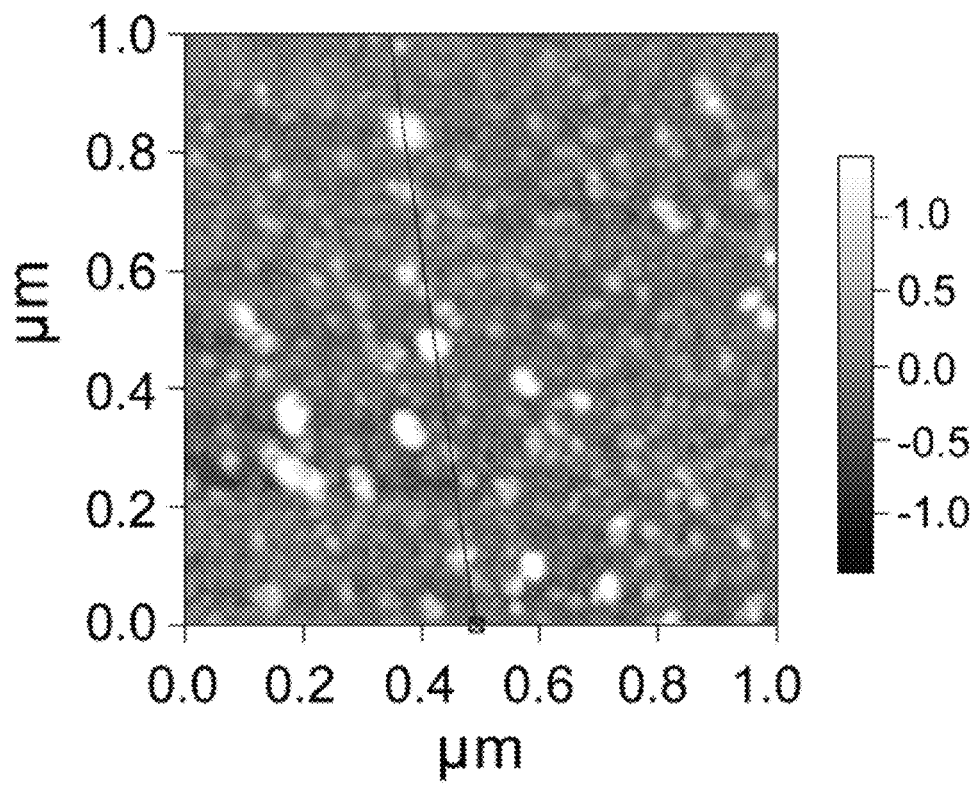
FIG. 9B shows an atomic force microscopy (AFM) image of exfoliated LCO nanosheets.
Figure 9C:
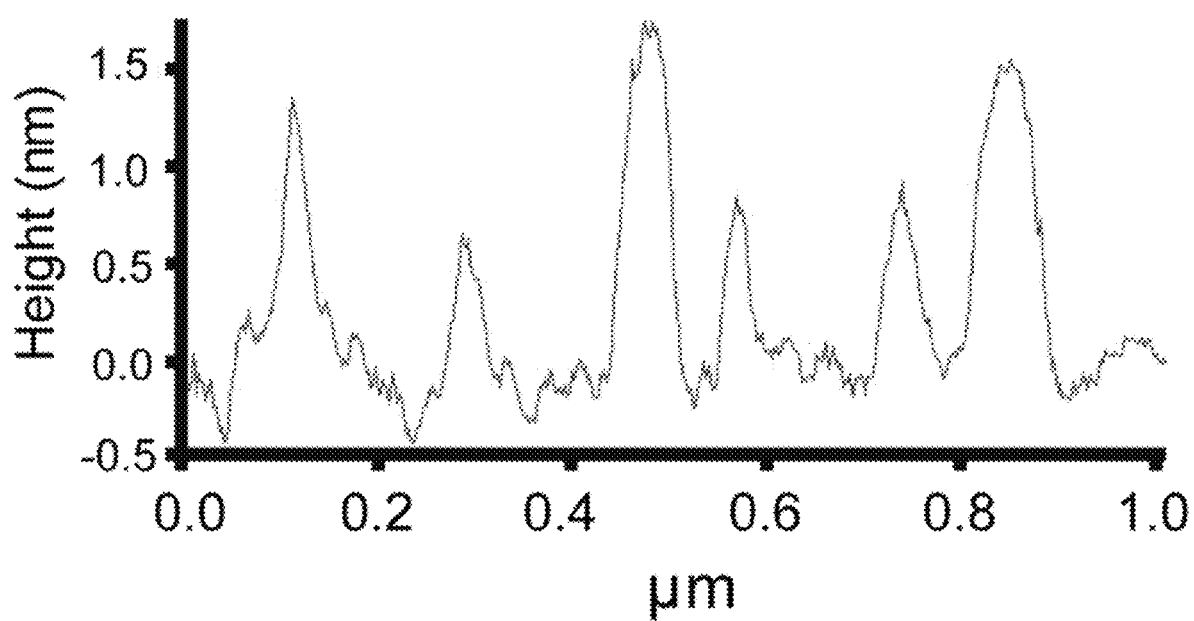
FIG. 9C shows the corresponding AFM height profile showing a thickness of the nanosheets around 1-1.5 nm.

Atomic force microscopy (AFM) showed the thickness of the nanosheets was 1-2 nm, which suggests that the nanosheets were single and double layered sheets. FIG. 9A shows the AFM topology image, FIG. 9B shows an atomic force microscopy (AFM) image of exfoliated LCO nanosheets. and FIG. 9C shows a height profile showing a thickness of the nanosheets around 1-1.5 nm. The lateral dimension of these nanosheets was around 50-200 nm, while the initial LCO particles were 2-5 μm. This difference could indicate that the nanosheet dimensions were restricted by the diffusion of TEA into the bulk LCO and/or that the nanosheets were fragmented during ultrasonication.

Reassembly of Nanosheets

Figure 10A:
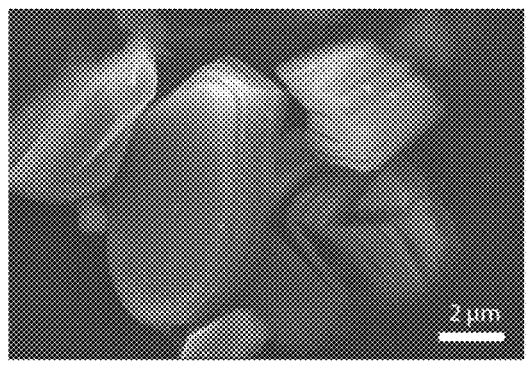
FIGS. 10A and 10B show scanning electron microscopy (SEM) images of LCO nanosheets restacked into particles after using dialysis of the nanosheet/$TEA^+$ dispersion in 1 M $LiNO_3$.
Figure 10B:
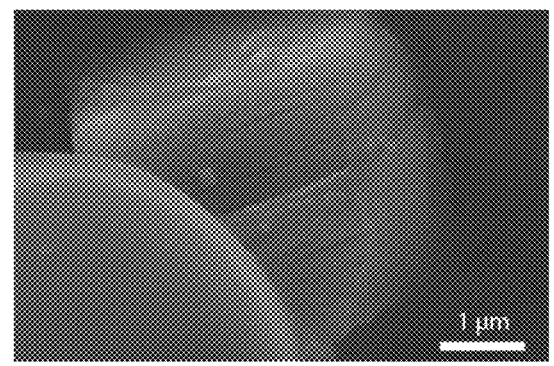

With the Raman spectroscopy, TEM, and AFM results confirming that the LCO was successfully exfoliated, the nanosheets were reassembled back into $LiCoO_2$ to demonstrate that they could serve as functional building blocks for building up cathode materials. The nanosheet dispersions in the TEA solutions (sample IV) were dialyzed in 1 M $LiNO_3$ solution (rather than DI water as for the $TEA^+$ removal) for 1 day. In this dialysis process, the $TEA^+$ ions slowly diffuse out of the nanosheet dispersion while $Li^+$ ions diffuse in. Due to the negatively charged surface of the $[CoO_2]^-$ layers, the presence of $Li^+$ will cause flocculation. As a result of the slow diffusion of ions during dialysis, the nanosheets can restack and grow under a slow and controlled rate. FIGS. 10A and 10B show scanning electron microscopy (SEM) images of LCO nanosheets restacked into particles after using dialysis of the nanosheet/$TEA^+$ dispersion in 1 M $LiNO_3$. The resulting particles were very smooth, with the layer stacking clearly visible on the edges of the particles.

Figure 11A:
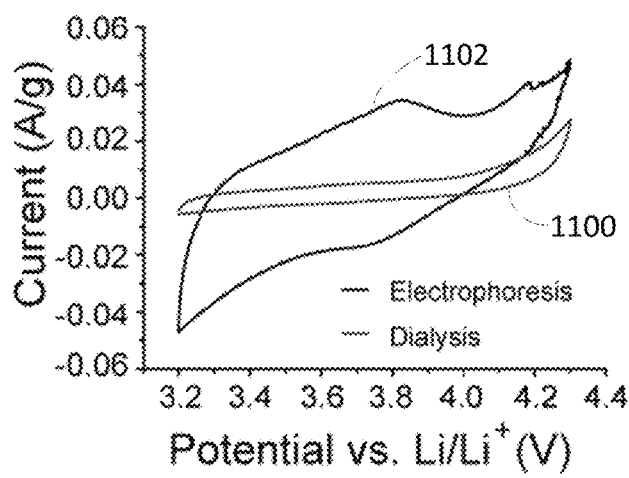
FIG. 11A shows cyclic voltammetry curves (1 mV/s) of LCO nanosheets after dialysis in deionized water compared to LCO nanosheets that were purified using electrophoresis.
Figure 12A:
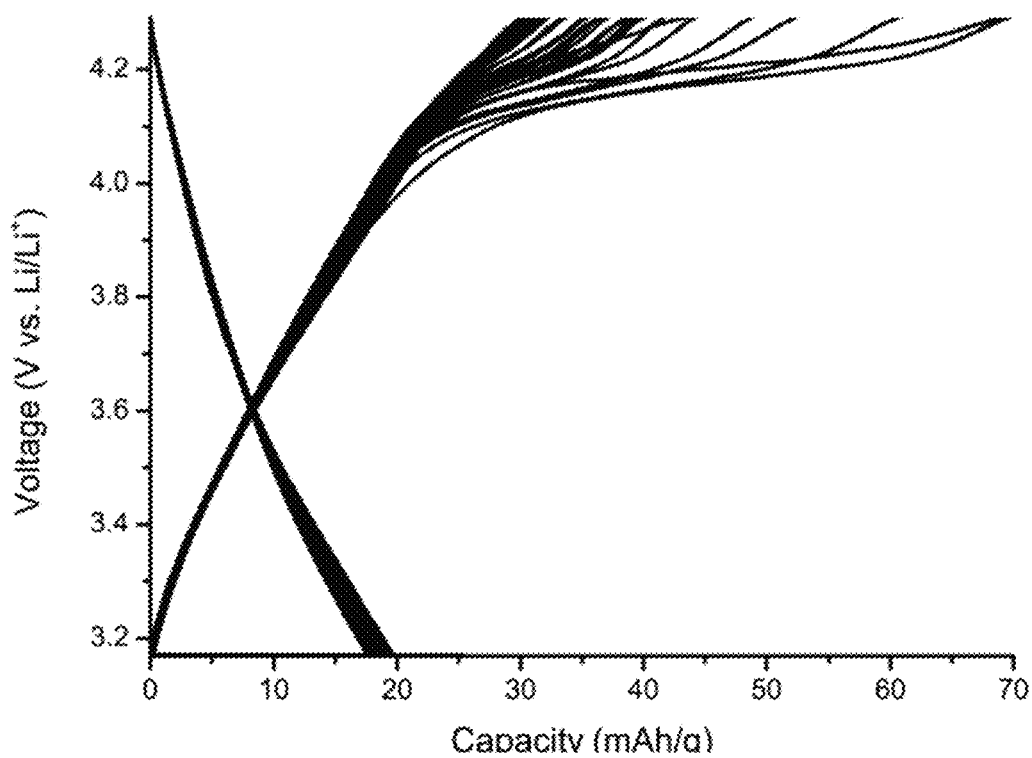
FIGS. 12A and 12B show galvanostatic cycling data of nanosheets after dialysis in DI water and after restacking through dialysis in 1 M $LiNO_3$, respectively. Fifty charge/discharge cycles are shown for both materials.
Figure 12B:
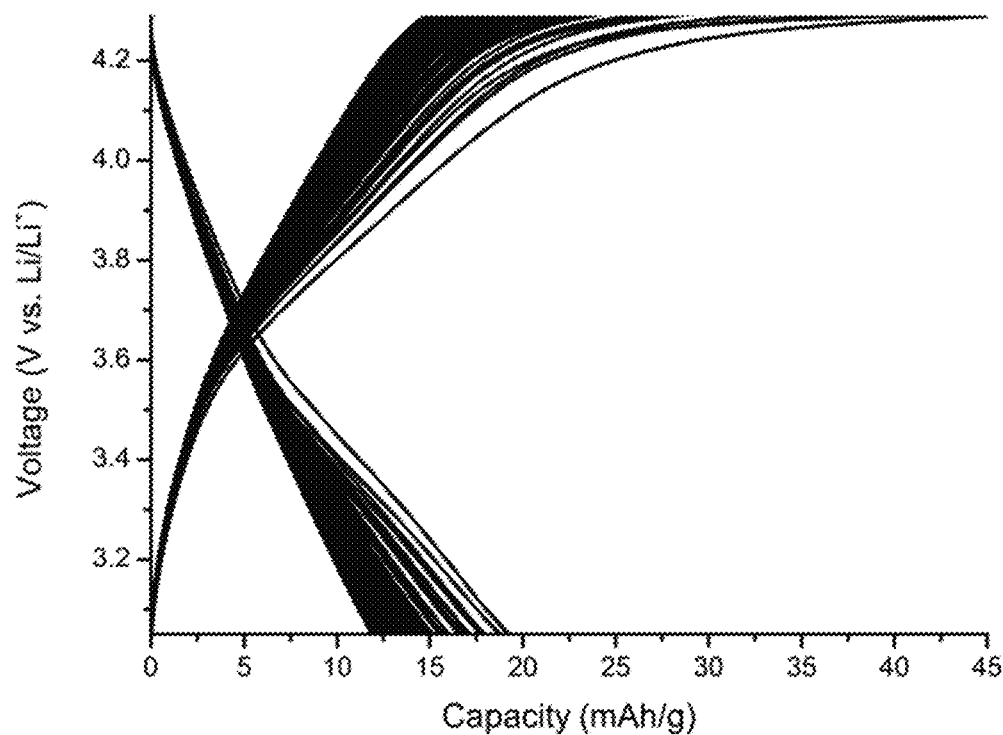

Although the dialysis procedure was effective for obtaining dispersions of well isolated nanosheets (when performed in DI water) as well as restacked LCO particles (when performed in $LiNO_3$ solution), the resulting materials did not display high electrochemical activity. As shown in FIG. 11A, cyclic voltammetry measurements prepared from nanosheets obtained after dialysis in DI water (plot 1100) only displayed small capacitances associated with double layer charging, with the $Co^{3+}/Co^{4+}$ redox peaks at 3.7 and 3.8 V vs. $Li/Li^+$ barely observable. Galvanostatic charging/discharging of the nanosheets after dialysis in DI water (FIG. 12A) and the restacked LCO particles obtained after dialysis in $LiNO_3$ (FIG. 12B) also did not result in any significant capacity. Since other Li-ion battery materials prepared in sheet morphology using synthetic methods, rather than exfoliation, demonstrate similar potential-dependent activity as the bulk materials, this inactivity is most likely due to the presence of $TEA^+$ which could hinder electrical contact of the nanosheets. The $TEA^+$ could also function as guest charge balancing ions and block $Li^+$ sites.

To investigate this issue, electrophoresis was employed to try to separate the $TEA^+$ ions adsorbed on the nanosheets using protocols known in the art. Electrophoresis was performed on LCO nanosheets in aqueous dispersions after the DI water dialysis. Only 10 V of DC voltage was applied because higher voltages resulted in water electrolysis. Afterwards, the cathode was covered with a film of dark brown materials, while the anode was clean (uncoated). This indicated that the nanosheets were positively charged in aqueous solution, confirming that their surfaces were covered with adsorbed $TEA^+$. On the other hand, when electrophoresis was performed in acetonitrile with a 30 V DC bias, the cathode was covered with a white film attributed to the $TEA^+$ and the LCO nanosheets deposited on the anode, indicating that they are negatively charged and separated from the $TEA^+$. This was also confirmed by performing cyclic voltammetry on the nanosheets after dialysis and electrophoresis, as shown in plots 1102 of FIG. 11A. The $Co^{3+}/Co^{4+}$ redox peaks were observed at ~3.8 V vs. $Li/Li^+$, indicating that the TEA must be removed to recover the electrochemical activity of the nanosheets. ICP-MS analysis of the purified nanosheets showed that the Li:Co was 0.0025 (Table 2). This means that in addition to removing the $TEA^+$, most of the $Li^+$ was removed from the nanosheets during electrophoresis. Therefore, sample VI could be considered as consisting of $[CoO_2]^-$ nanosheets.

Figure 11B:
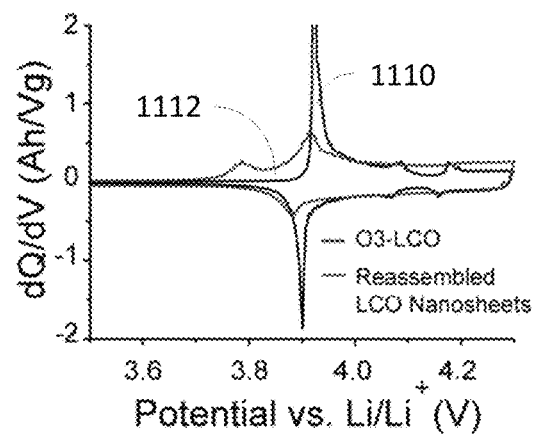
FIG. 11B shows differential capacity plots of LCO derived from reassembled nanosheets after purification by electrophoresis, microwave hydrothermal treatment, and annealing at 500° C. (2nd cycle) compared with commercial bulk O3-LCO.
Figure 11C:
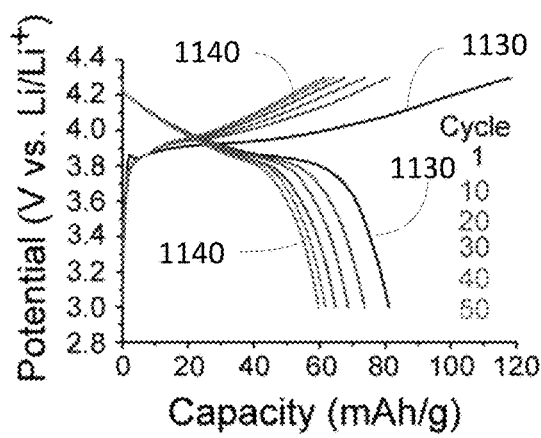
FIG. 11C shows galvanostatic voltage profiles for LCO particles coated with 3 nm $Al_2O_3$ deposited using atomic layer deposition (ALD).
Figure 11D:
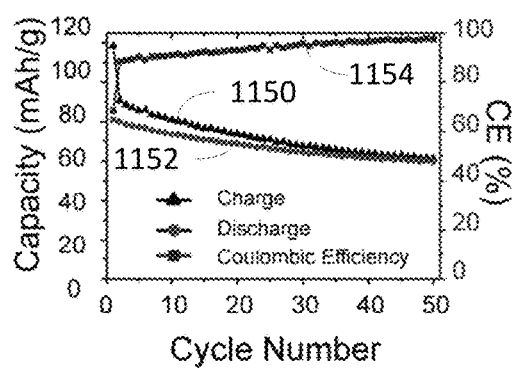
FIG. 11D shows the specific capacity and Coulombic efficiency (CE) vs. cycle number using a 0.2 C rate for LCO particles in FIG. 11B.

FIG. 11B shows differential capacity plots of LCO derived from reassembled nanosheets after purification by electrophoresis, microwave hydrothermal treatment, and annealing at 500° C. (2nd cycle) compared with commercial bulk O3-LCO. FIG. 11C shows galvanostatic voltage profiles for LCO particles coated with 3 nm $Al_2O_3$ deposited using atomic layer deposition (ALD). FIG. 11D shows the specific capacity and Coulombic efficiency (CE) vs. cycle number using a 0.2 C rate for LCO particles in FIG. 11B.

To confirm the electrochemical functionality, the nanosheets were reassembled back into LCO powders. After electrophoresis in acetonitrile, the LCO nanosheets were collected from the anode and re-dispersed in DI water. To ensure that there was sufficient Li available to promote re-formation of $LiCoO_2$, 1 M LiOH was added to the DI water. The reassembling process was conducted using microwave hydrothermal treatment at 160° C. to improve the crystallinity of the reassembled particles as well as decrease the reaction time from 5 days (for conventional hydrothermal reaction) to 15 minutes.

Figure 13A:
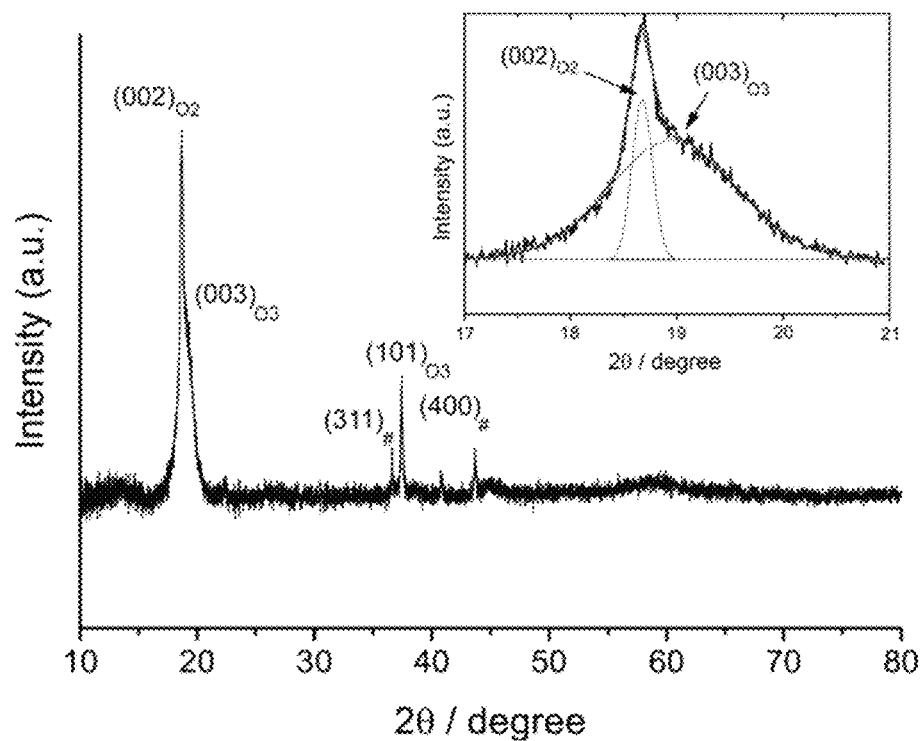
FIGS. 13A and 13B show characterization of LCO particles reassembled after electrophoresis and microwave hydrothermal treatment in LiOH without annealing.

XRD analysis of the samples after electrophoresis revealed the (003) peak for LCO, indicating the successful restacking of the nanosheets, but with a position (2θ~19.5°) suggesting a smaller c-axis spacing, due to the $Li^+$ deficiency and/or the high electric field compressing the interlayer spacing (plot VI in FIG. 6). After the microwave treatment, ICP-MS analysis on the sample showed that Li:Co was 0.99 (Table 2), confirming that lithium was successfully inserted back in between the cobalt oxide layers. The XRD pattern (plot VII in FIG. 6) of the reassembled LCO particles showed a broad peak matching the (003) reflection at 2θ~18.9° for LCO. FIG. 13A shows an XRD pattern with inset showing fitting results to the O2 and O3-LCO reflections; # indicate peaks from $Co_3O_4$. A sharp peak at 2θ~18.6° was also observed, which matched the (002) peak for the O2-polytype of LCO. Peak fitting showed that the integrated O3/O2 peak area ratio was 4.31 (FIG. 13A inset), indicating the particles consisted of mixed phases. The XRD pattern of the reassembled LCO after microwave hydrothermal treatment also contained traces of the spinel $Co_3O_4$ (FIG. 13A), which may have originated from $Li^+$ deficient domains that formed during flocculation.

The observation of the O2-polytype in these materials is particularly interesting since it is a metastable phase that transforms to the equilibrium O3-phase when sintered at temperatures higher than 270° C. O2-LCO is conventionally obtained through a $Li^+/Na^+$ ion-exchange treatment of the P2-polytype of $NaCoO_2$, during which $CoO_2$ slab gliding occurs in order to form octahedral environments for the $Li^+$, which are too small to reside in the $Na^+$ trigonal prismatic sites. Unlike O3-LCO, where every cobalt oxide layer is related by translation, in the O2 structure, every adjacent cobalt oxide layer is mirrored or rotated 60° along the c-axis. FIGS. 14A and 14B depict O2 stacking and O3 stacking, respectively. Hence, it is not possible to obtain O2-LCO directly from O3-LCO. On the other hand, when restacking the nanosheets using flocculation, the formation process is rapid due to the strong electrostatic interactions between the $Li^+$ ions and $[CoO_2]^-$ sheets. Therefore, it is likely that a large amount of stacking faults formed during the nanosheet reassembly process, which could induce the formation of metastable O2-LCO domains. Furthermore, the low temperature used in the microwave hydrothermal treatment was not sufficient to transform the O2-LCO to the thermodynamic O3-phase.

After the microwave hydrothermal treatment, the particles were annealed at 500° C. for 2 hours. Heat treatment at temperatures higher than 300° C. is typically necessary for the crystallization of hydrothermally synthesized LCO. After annealing at 500° C., the XRD pattern showed that the mixed phase O2/O3-LCO was transformed to the O3-polytype (plot I (bottom) in FIG. 6, full range in FIG. 15A). In contrast, $[CoO_2]^-$ nanosheets prepared by exfoliation of $HCoO_2$ and then reassembled with LiOH show an additional XRD reflection at 20.3° from intercalation of protons, indicating the formation of $Li_{1-x}H_xCoO_2$ rather than $LiCoO_2$. Results show that with this method, the LCO structure is successfully achieved without interference from proton adsorption.

Electrochemical Performance of Reassembled Nanosheets

Figure 13B:
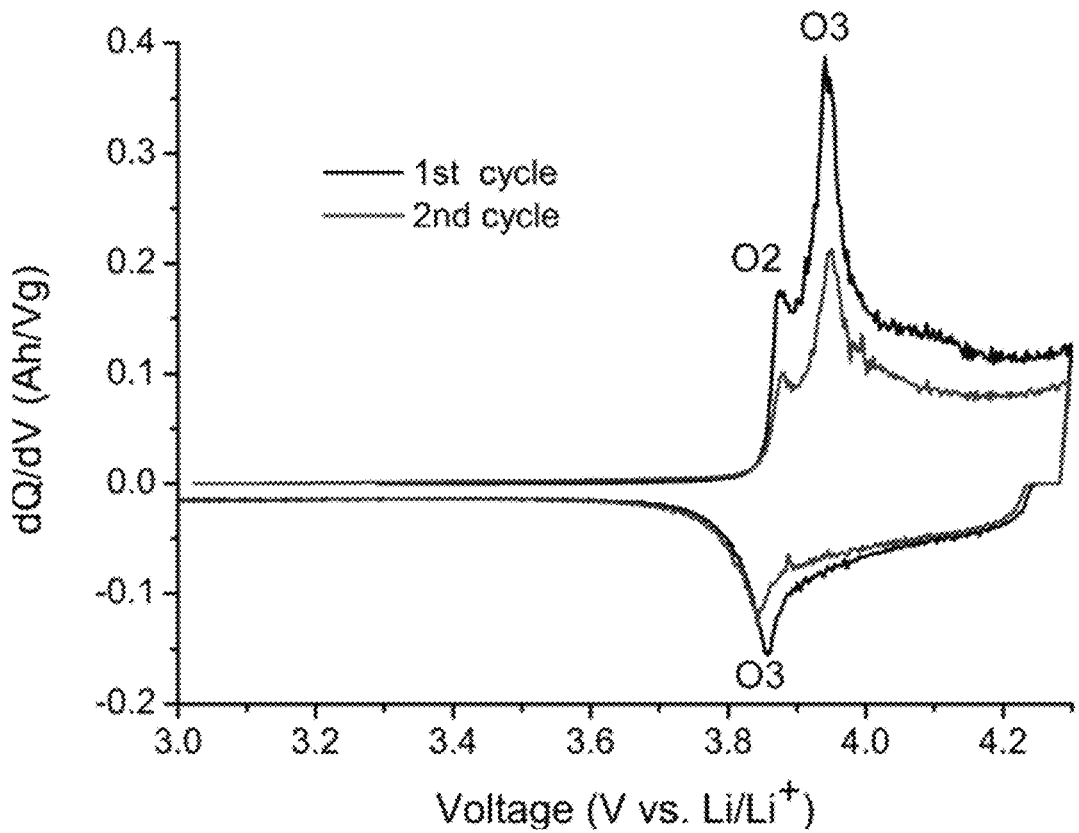

The mixed phase LCO particles obtained after electrophoresis and microwave hydrothermal treatment were evaluated using galvanostatic cycling. FIG. 13B shows differential capacity vs. potential plots obtained from galvanostatic measurements showing delithiation from O2 and O3-LCO phases within the particles. The differential capacity plots showed two oxidation peaks at 3.87 and 3.95 V vs. $Li/Li^+$, corresponding to oxidation (delithiation) of O2- and O3-LCO, respectively. This further confirms the XRD results (FIG. 13A) that the reassembled particles contain a mixture of the O2 and O3-polytypes of LCO.

Figure 15A:
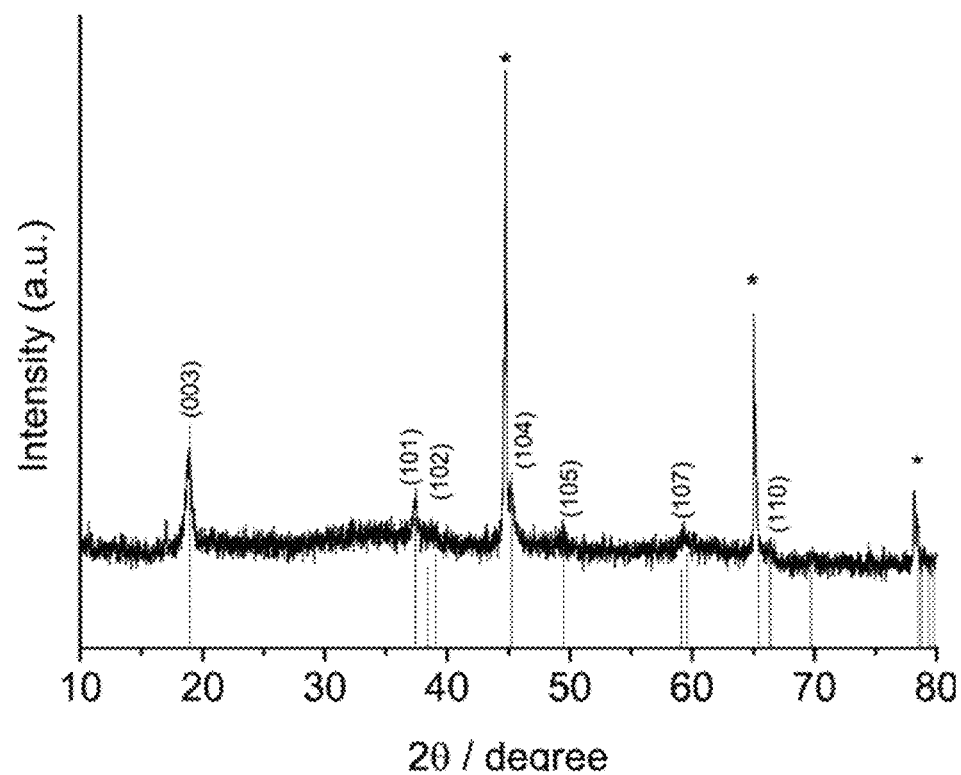
FIGS. 15A-15C show characterization of reassembled LCO particles obtained after purification by electrophoresis, microwave hydrothermal treatment, and annealing at 500° C. for 2 hours.
Figure 15B:
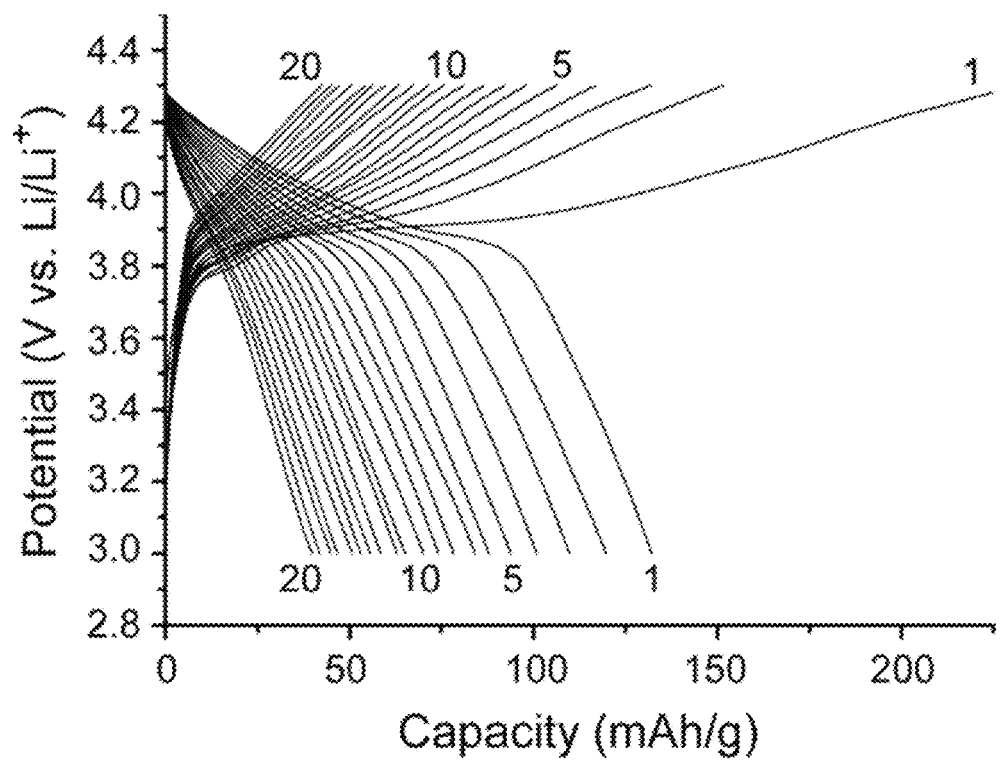
Figure 15C:
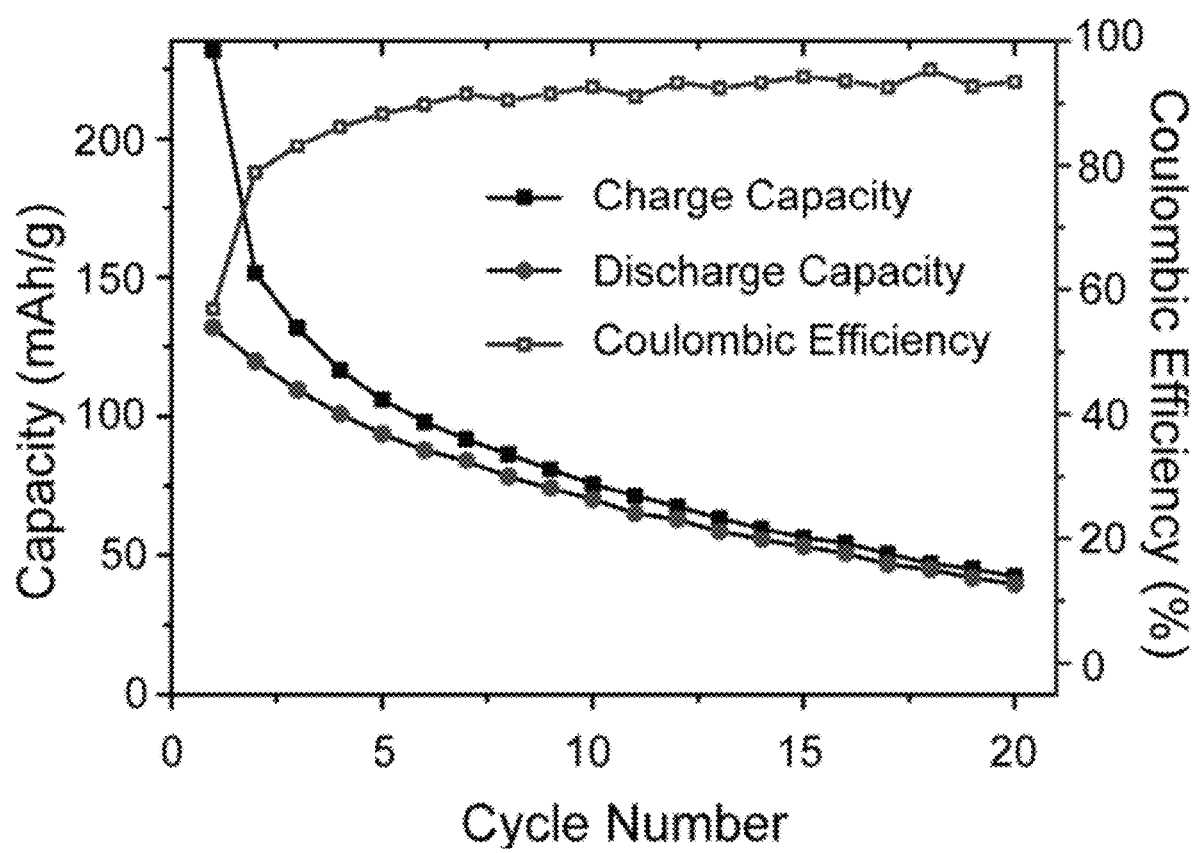
Figure 16A:
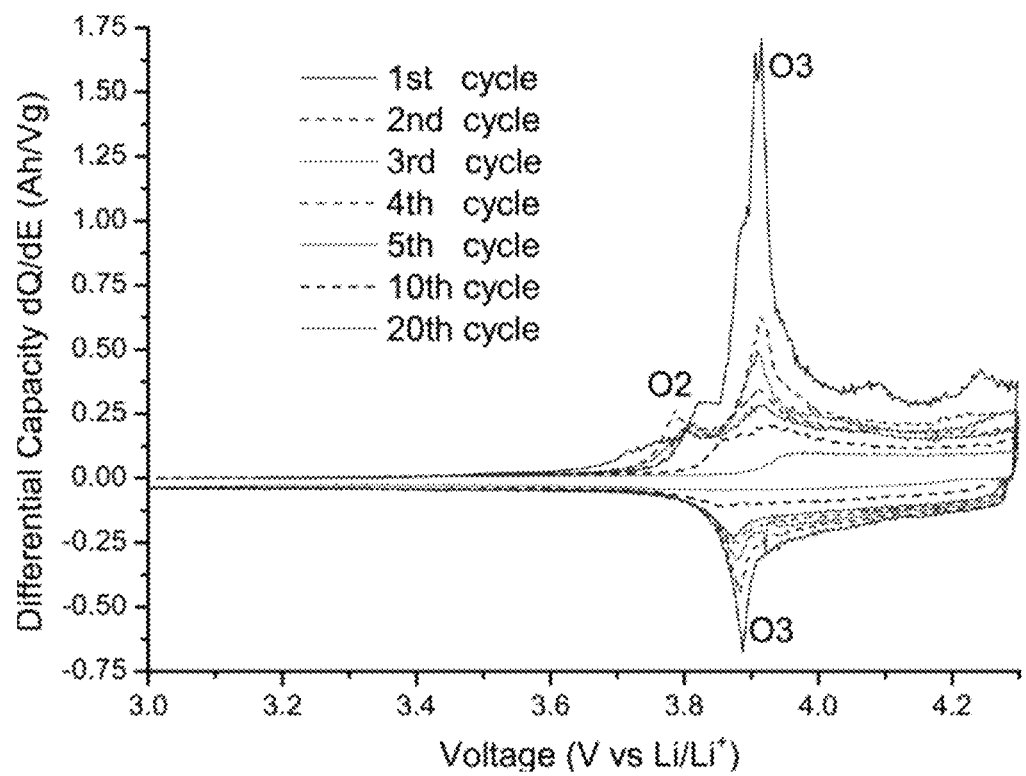
FIGS. 16A and 16B show differential capacity vs. voltage plots of LCO reassembled particles without ALD coating and with $Al_2O_3$ ALD coating, respectively.

The electrochemical properties of the mixed phase particles after annealing at 500° C. for 2 hours were also studied. FIGS. 15A-15C show characterization of reassembled LCO particles obtained after purification by electrophoresis, microwave hydrothermal treatment, and annealing at 500° C. for 2 hours. FIG. 15A shows an XRD pattern matching O3-LCO; * indicate peaks from Al foil substrate. FIG. 15B shows galvanostatic cycling data between 3.0-4.3 V vs. $Li/Li^+$. FIG. 15C shows Coulombic efficiency and charge/discharge capacity for each cycle. Under galvanostatic cycling, the reassembled particles showed a discharge capacity of 131 mAh/g in the first cycle (FIG. 15B), which is slightly lower than the 140 mAh/g typically observed in bulk LCO but much higher than the previous attempts to obtain LCO from nanosheets due to the absence of interfering protons. For instance, $Li_{1-x}H_xCoO_2$ restacked nanosheets prepared from the exfoliation of $HCoO_2$ showed first cycle discharge capacities <74 mAh/g. Analysis of the differential capacity plots in FIG. 11B, in which plot 1110 corresponds to O3-LCO and plot 1112 corresponds to reassembled LCO nanosheets, showed that oxidation features from O2-LCO were still present, despite the XRD results showing reflections only from O3-LCO (FIG. 15A). This may indicate that the O2-LCO domains are very small, since previous studies showed that only traces of O2-LCO remain after annealing at 400° C. Both O2- and O3-LCO features decreased with cycling (FIG. 16A), leading to poor capacity retention (FIG. 15C). Due to side reactions with the electrolyte and surface instability, nanostructured LCO typically demonstrates poor cycling and low Coulombic efficiency unless passivated with surface coatings. Inspection of the reassembled LCO with SEM imaging showed that they consisted of particles ranging from a few hundred nanometers to ~2 μm (with some larger agglomerates containing several particles).

Figure 16B:
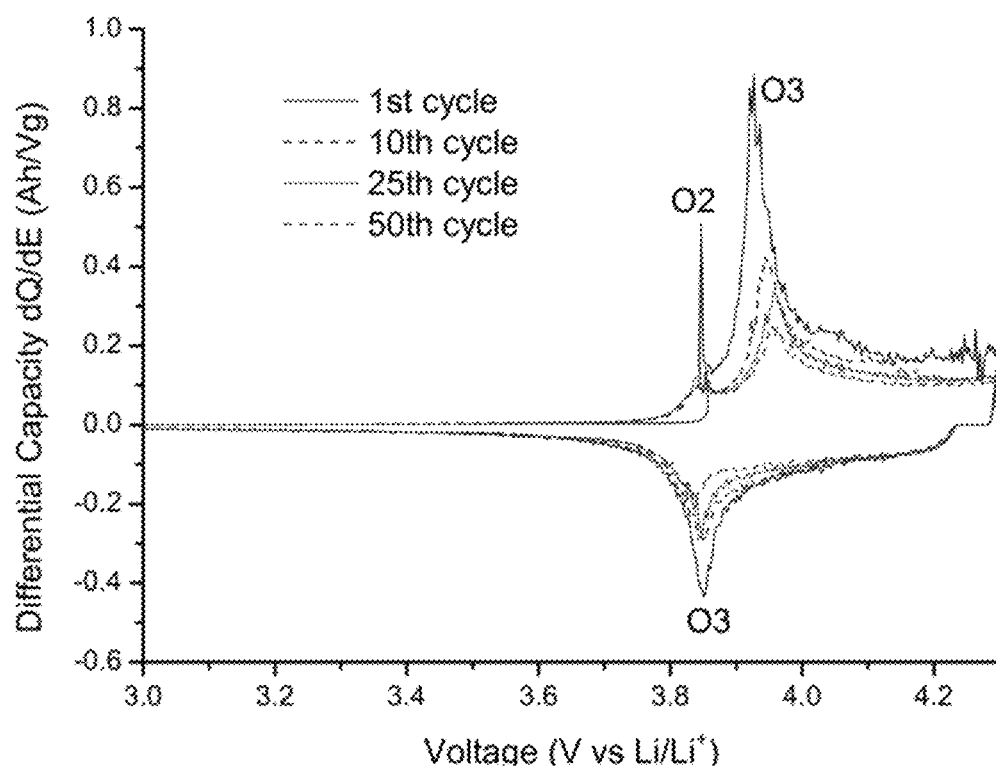

To investigate whether surface passivation can also improve the cycling performance of the reassembled LCO nanosheets, atomic layer deposition (ALD) was used to deposit 3 nm thick coatings of $Al_2O_3$. The initial capacity of the coated samples decreased to ~81 mAh/g (FIG. 11C, with plot 1130 corresponding to cycle 1 and plot 1140 corresponding to cycle 50, and intermediate plots corresponding to cycles 10, 20, 30, and 40), likely due to the un-optimized layer thickness and insulating nature of the $Al_2O_3$, but the capacity retention was greatly improved, with 74% retained after 50 cycles (FIG. 11D), compared to only 30% after 20 cycles for the uncoated materials (FIG. 15C). Plots 1150, 1152, and 1154 in FIG. 11D correspond to charge, discharge, and Coulombic efficiency, respectively. The differential capacity plots (FIG. 16B) showed that both O2- and O3-LCO redox peaks were stable with the ALD coating.

These results show that this nanosheet synthesis and restacking process can be applied to form functional LCO materials with improved electrochemical properties compared to conventional osmotic swelling methods. Furthermore, the restacking can be used to obtain non-equilibrium structures, as demonstrated by the formation of the O2-LCO, which could lead to novel electrochemical behavior. Although the morphology of the restacked nanosheets does not contain fine nanostructures, the cycling properties are similar in that poor capacity retention and Coulombic efficiencies can be remedied with surface passivation using ALD coatings. Future efforts will be focused on the improvement of cycling by obtaining better control over the structure of the reassembled particles, as well as exploring hybrid structures.

Example 2: $LiNi_{1/3}Mn_{1/3}Co_{1/3}O_2$ (NMC) Nanosheets

Figure 17:
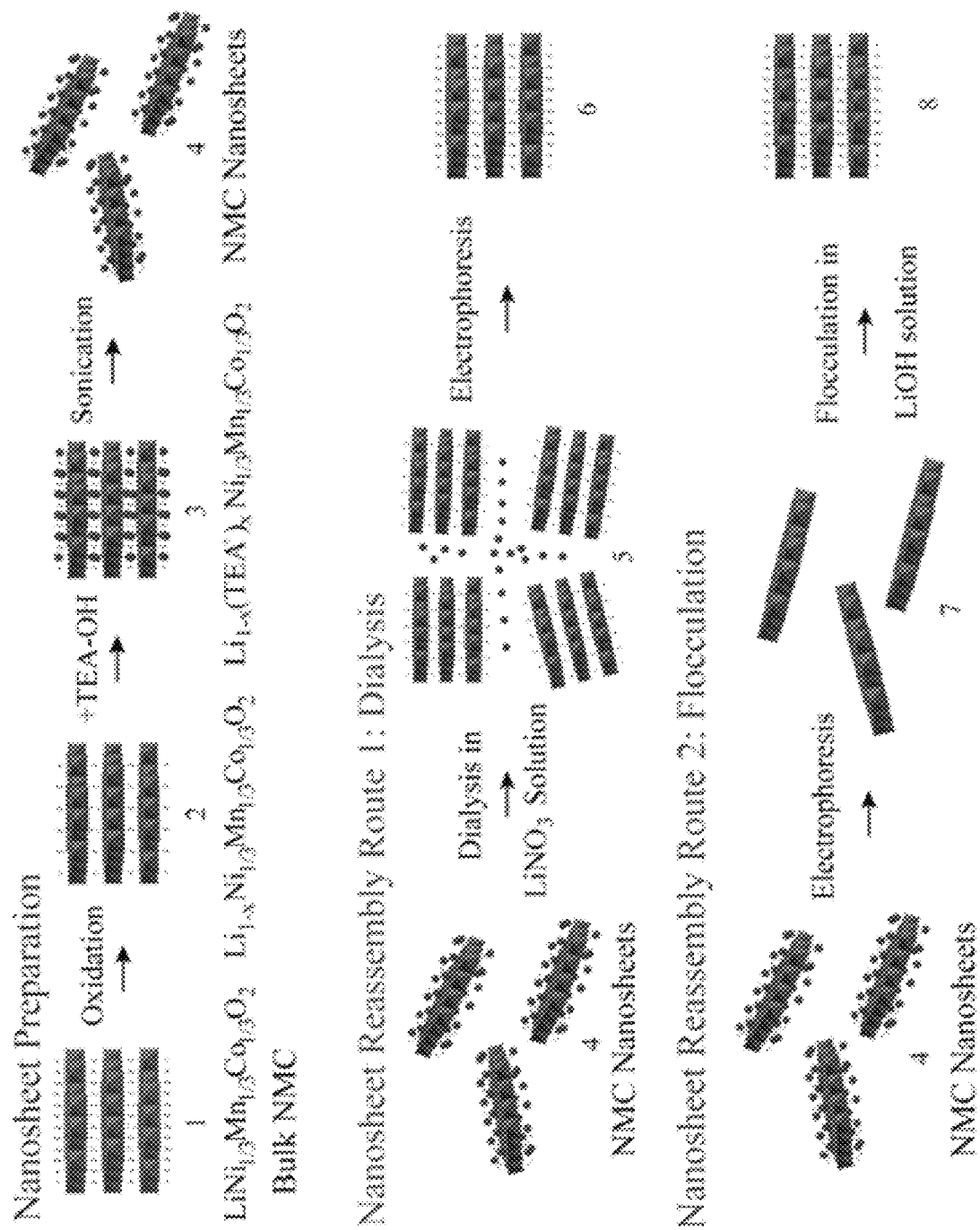
FIG. 17 depicts a process for exfoliation of $LiNi_{1/3}Mn_{1/3}Co_{1/3}O_2$ (NMC) into nanosheets, followed by purification and reassembly either through dialysis or flocculation.
Figure 18:
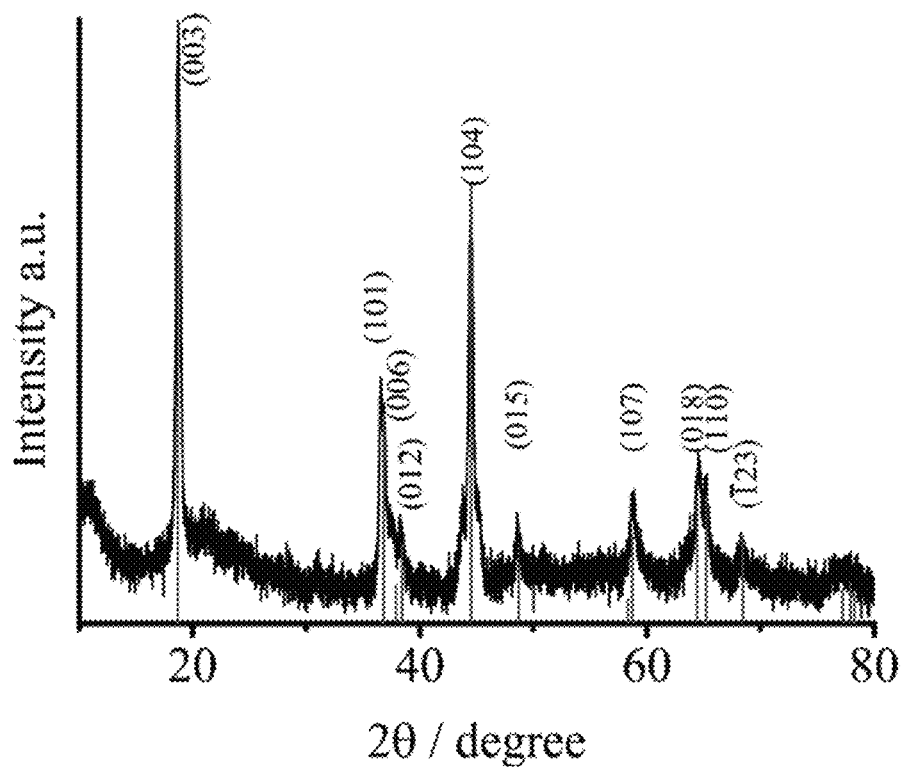
FIG. 18 shows an XRD pattern of pristine NMC particles.

Exfoliation of $LiNi_{1/3}Mn_{1/3}Co_{1/3\ 2}$ into Nanosheets Using Electrochemical Oxidation and Reassembly with Dialysis or Flocculation
Electrochemical Oxidation of NMC $LiNi_{1/3}Mn_{1/3}Co_{1/3}O_2$ (NMC) powder (Sample 1 in FIG. 17) was obtained from Sigma-Aldrich (part no. 761001, <0.5 μm particle size). The XRD pattern of pristine $LiNi_{1/3}Mn_{1/3}Co_{1/3}O_2$ (NMC) is shown in FIG. 18. The NMC was mixed into deionized (DI) water with 5 wt % carboxymethyl cellulose (CMC, $M_w$~250K, Sigma-Aldrich) serving as a binder. A conducting carbon additive was not used in preparing the NMC electrodes to avoid the introduction of impure products. The slurry was subsequently coated onto aluminum foil current collectors, and the dried electrodes were assembled with lithium metal counter electrodes into pouch cells. The half cells were potentiostatically charged to 4.3 V vs $Li/Li^+$ in 2 hour intervals, separated by 15 minute relaxation periods at open circuit. This was repeated until the open circuit voltage after the rest period was higher than 4.29 V vs $Li/Li^+$. After electrochemical oxidation, the charged NMC (Sample 2 in FIG. 17) electrodes were washed with DI water several times to thoroughly remove the electrolyte and CMC binder.

Exfoliation of NMC

The washed NMC (0.14 g) obtained from electrochemical oxidation was immersed in a tetraethylammonium hydroxide (TEA, ~40% in water, Sigma-Aldrich) solution with a volume of 45 mL. The amount of TEA was varied with respect to the number of lithium vacancies ($V_{Li^-}$) in the oxidized NMC. After immersing the charged NMC particles into the TEA solutions, the mixture was sonicated using a tip probe ultrasonicator (CPX 600,660 W) for 15 minutes to assist with the intercalation of $TEA^+$ into the interlayer space of NMC to form Sample 3 in FIG. 17. Afterward, the mixture was sonicated using a bath sonicator (CPX 1800H, 70 W) at 60° C. for 2 days. The solution was then centrifuged at 5000 rpm for 15 minutes to remove any unexfoliated particles to obtain a suspension of NMC nanosheets (Sample 4 in FIG. 17). The unexfoliated particles found in the pellet after centrifugation were used for XRD characterization, and the nanosheet dispersions were taken from the decanted phase for all other (e.g., ICP-OES, TEM, SEM, AFM) characterization, dialysis, and electrophoresis.

Dialysis of the NMC Nanosheet Dispersion

To remove the excess TEA from the nanosheet dispersions, dialysis was employed using a Slide-A-Lyzer Dialysis Cassette (30 mL capacity, Thermo Scientific) with pores that allow molecules with a molecular weight of 20K or below to pass through. The nanosheet dispersions (Sample 4 in FIG. 17) were placed inside the dialysis cassette, which was then placed in 1 L of DI water and allowed to sit with slow stirring until the pH of the water decreased to 7. To reassemble the NMC nanosheets using dialysis, the DI water in the 1 L beaker was replaced with a 1 M $LiNO_3$ solution. As the $Li^+$ from the $LiNO_3$ solution diffused into the nanosheet dispersion inside the dialysis cassette, the nanosheets would slowly flocculate to form particles (Sample 5 in FIG. 17) from the electrostatic interactions between the $Li^+$ and the negatively charged nanosheets.

Electrophoresis of NMC Nanosheets and Reassembled NMC Particles

Both NMC nanosheets (Sample 4 in FIG. 17) and reassembled NMC particles (obtained through dialysis in $LiNO_3$ solution, Sample 5 in FIG. 17) were treated with electrophoresis for further purification. NMC nanosheets were collected from the TEA solution using centrifugation at 8500 rpm. The NMC nanosheets were not fully dried so that they could be easily redispersed in acetonitrile. The reassembled NMC particles were also collected using centrifugation and washed with DI water multiple times to remove any residual salts. Then, the washed particles were dispersed in acetonitrile using bath sonication for 15 minutes. Once the NMC materials were dispersed in acetonitrile, electrophoresis was performed using a 30 V applied voltage with a dc regulated power supply (Circuit Specialists, CSI 3003×5) to remove adsorbed $TEA^+$ from the NMC surface. Stainless steel electrodes (cleaned sequentially in DI water, ethanol, and acetone) were used for both the cathode and anode during electrophoresis.

Microwave Hydrothermal Treatment of NMC Particles

After electrophoresis, the reassembled NMC particles (Sample 6 in FIG. 17) or NMC nanosheets were collected from the acetonitrile and redispersed by sonication in DI water containing 1 M LiOH to replenish the $Li^+$ removed during electrophoresis. The suspension was then treated in a microwave hydrothermal reactor (CEM Corp., Discover-SP, 300 W 160° C., 300 psi) for 30 minutes to improve the crystallinity of the reassembled particles.

Calcination of NMC Particles

Figure 19:
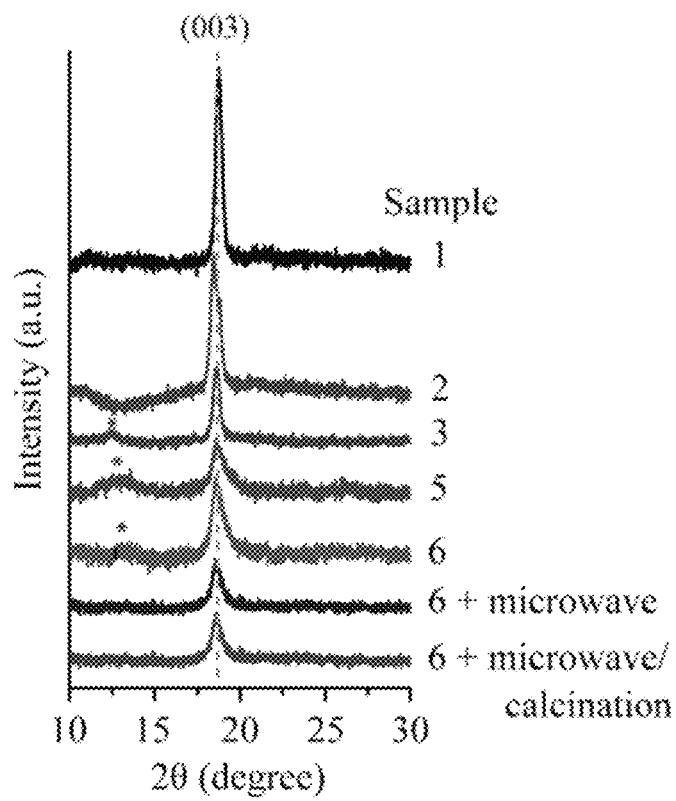
FIG. 19 shows the XRD patterns for $10°<2\theta<30°$ of different NMC samples during the exfoliation and reassembly process, labelled according to FIG. 17.

The NMC reassembled particles obtained after the microwave treatment were recovered using vacuum filtration and then annealed at 500° C. for 6 hours in air using an oven (Lindberg M, Thermal Scientific) to remove solvent and any residual organics or carbon as well as to improve the crystallinity of the sample.
Materials Characterization X-ray diffraction (XRD) characterization was performed with monochromatic Cu Kα radiation (λ=1.5405 Å, Panalytical X'pert Pro). Field emission scanning electron microscopy (SEM) was used to examine the morphology of reassembled NMC particles (FEI XL30). The XRD patterns for 10°<2θ<30° of different NMC samples during the exfoliation and reassembly process are shown in FIG. 19 (the samples are named as shown in FIG. 17). Multiple-collector inductively coupled plasma optical emission spectrometry (ICP-OES, Thermo iCAP 6300) was used to analyze the composition of the NMC during the different steps in the exfoliation and reassembly. ICP-OES measurements of samples 1, 2, 4, 5, 6, 7, and 8 were obtained and the results are shown in Table 3. Table 3 lists a-d for Samples 1-8, where a-d are the subscripts in $Li_aNi_bMn_cCo_dO_2$. The composition is as $Li_aNi_bMn_cCo_dO_2$. Sample 1 is pristine NMC, with a nominal composition of $LiNi_{1/3}Mn_{1/3}Co_{1/3}O_2$, Sample 2 is electrochemically oxidized $LiNi_{1/3}Mn_{1/3}Co_{1/3}O_2$, Sample 4 is NMC nanosheets after centrifugation from the TEA solutions, Sample 5 contains NMC particles reassembled using dialysis, Sample 6 contains NMC particles reassembled after dialysis and electrophoresis and NMC particles after microwave treatment and calcination, Sample 7 is NMC nanosheets after electrophoresis, Sample 8 contains NMC particles after electrophoresis and flocculation, followed by microwave treatment and calcination.

TABLE 3

Composition of NMC samples in different steps from ICP-OES results

| Materials | Li/a | Mn/b | Ni/c | Co/d |
|---|---|---|---|---|
| Sample 1 | 0.80 | 0.37 | 0.30 | 0.33 |
| Sample 2 | 0.43 | 0.36 | 0.30 | 0.33 |
| Sample 4 | 0.41 | 0.21 | 0.33 | 0.46 |
| Sample 5 | 0.95 | 0.21 | 0.36 | 0.43 |
| Sample 6 | 0.71 | 0.24 | 0.33 | 0.43 |
|  | 0.85 | 0.24 | 0.34 | 0.42 |
| Sample 7 | 0 | 0.23 | 0.35 | 0.42 |
| Sample 8 | 0.82 | 0.22 | 0.35 | 0.43 |

To perform ICP-OES, the solution containing NMC suspended in TEA was centrifuged at 5000 rpm to remove the unexfoliated NMC particles, followed by vacuum filtration through a μm PVDF filter membrane (Sigma-Aldrich, Durapore) to obtain only the exfoliated nanosheets. All samples were digested with 70% nitric acid (trace metal grade) at 160° C. and 300 psi using a microwave hydrothermal reactor (Discover-SP, 909150).

To prepare samples for transmission electron microscopy (TEM) characterization, the NMC nanosheets (Sample 3 in Table 4) were separated from the TEA solution using centrifugation at 14,000 rpm (Microfuge, 18) and collected from the decanted phase. The recovered NMC nanosheets were redispersed in isopropanol by sonicating with a tip probe sonicator (CPX 600, 660 W) for 10 minutes and dropped onto a Cu grid for TEM characterization (JEOL 2010F, 200 kV).

For atomic force microscopy (AFM) characterization the NMC nanosheet dispersion in isopropanol was drop cast onto clean silicon substrates using spin coating at 600 rpm. The silicon substrate was sonicated in DI water, ethanol, and acetone for 30 minutes separately to clean the surface. AFM measurements were performed using an Asylum Research (MFP 3D, classic) microscope in tapping mode.

Electrochemical Characterization

The NMC materials were dispersed in N-methyl-2-pyrrolidone (NMP) by sonication and then mixed with graphite conducting additive and poly(vinylidene fluoride) (PVDF) binder in a weight ratio of 8:1:1. The particles were drop cast onto Al foil and dried at 120° C. overnight to be assembled in coin cells for electrochemical characterization. Galvanostatic cycling was performed using a 0.2° C. rate (25 mA/g) from 3 to 4.2 V vs Li/Li$^+$ (MPG2, Biologic). Differential capacity analysis was performed using the EC-lab software from Biologic.

Preparation of NMC Nanosheets by Exfoliation

Using oxidation-reduction assisted exfoliation to prepare nanosheets avoids the introduction of protons, which can adsorb onto the nanosheets surfaces and occupy Li$^+$ sites, which would inhibit the charge storage capacities. Also, the oxidation-reduction process simulates a charging-discharging process of a battery; therefore, it lowers the risk of a possible phase change brought by proton intercalation. The intercalation of TEA$^+$ into NMC can be written as:

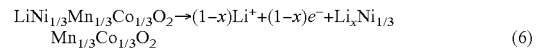

$$LiNi_{1/3}Mn_{1/3}Co_{1/3}O_2 \rightarrow (1-x)Li^+ + (1-x)e^- + Li_xNi_{1/3}Mn_{1/3}Co_{1/3}O_2 \quad (6)$$

$$TEA\text{-}OH \rightarrow TEA^+ + OH^- \quad (7)$$

$$4OH^- \rightarrow 2H_2O + O_2 + 4e^- \quad (8)$$

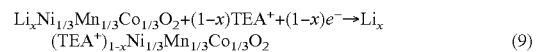

$$Li_xNi_{1/3}Mn_{1/3}Co_{1/3}O_2 + (1-x)TEA^+ + (1-x)e^- \rightarrow Li_x(TEA^+)_{1-x}Ni_{1/3}Mn_{1/3}Co_{1/3}O_2 \quad (9)$$

Overall Reaction

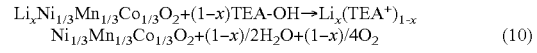

$$Li_xNi_{1/3}Mn_{1/3}Co_{1/3}O_2 + (1-x)TEA\text{-}OH \rightarrow Li_x(TEA^+)_{1-x}Ni_{1/3}Mn_{1/3}Co_{1/3}O_2 + (1-x)/2H_2O + (1-x)/4O_2 \quad (10)$$

To obtain nanosheets using the oxidation-assisted exfoliation method, the NMC particles were electrochemically oxidized. During oxidation, the NMC is delithiated and the $Ni^{2+}/Ni^{3+}$, $Ni^{3+}/Ni^{4+}$, and $Co^{3+}/Co^{4+}$ redox couples are activated at approximately 3.8, 4.0, and 4.6 V vs Li/Li$^+$, respectively, whereas the Mn$^{4+}$ cations play a stabilizing role and do not react.

Figure 20:
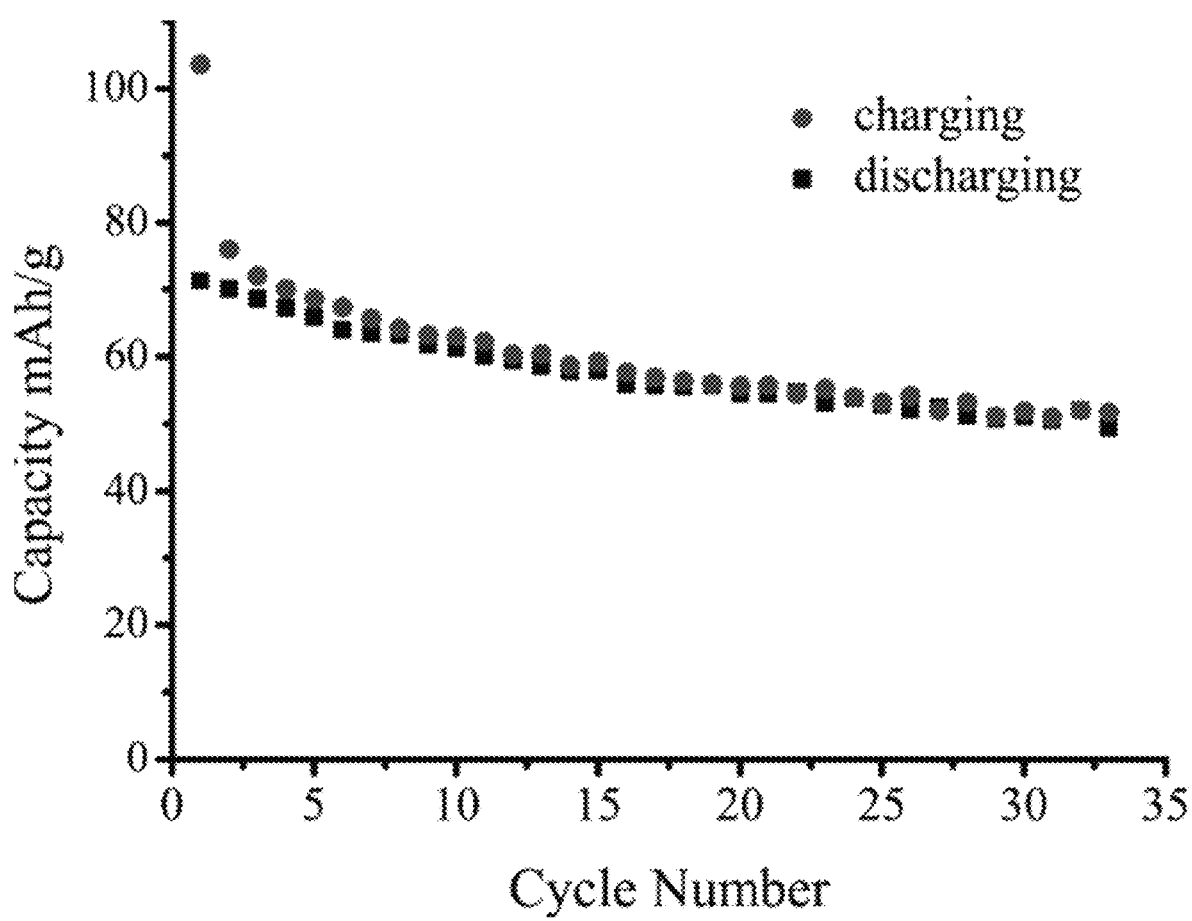
FIG. 20 show cycling data of pristine NMC particles.
Figure 21:
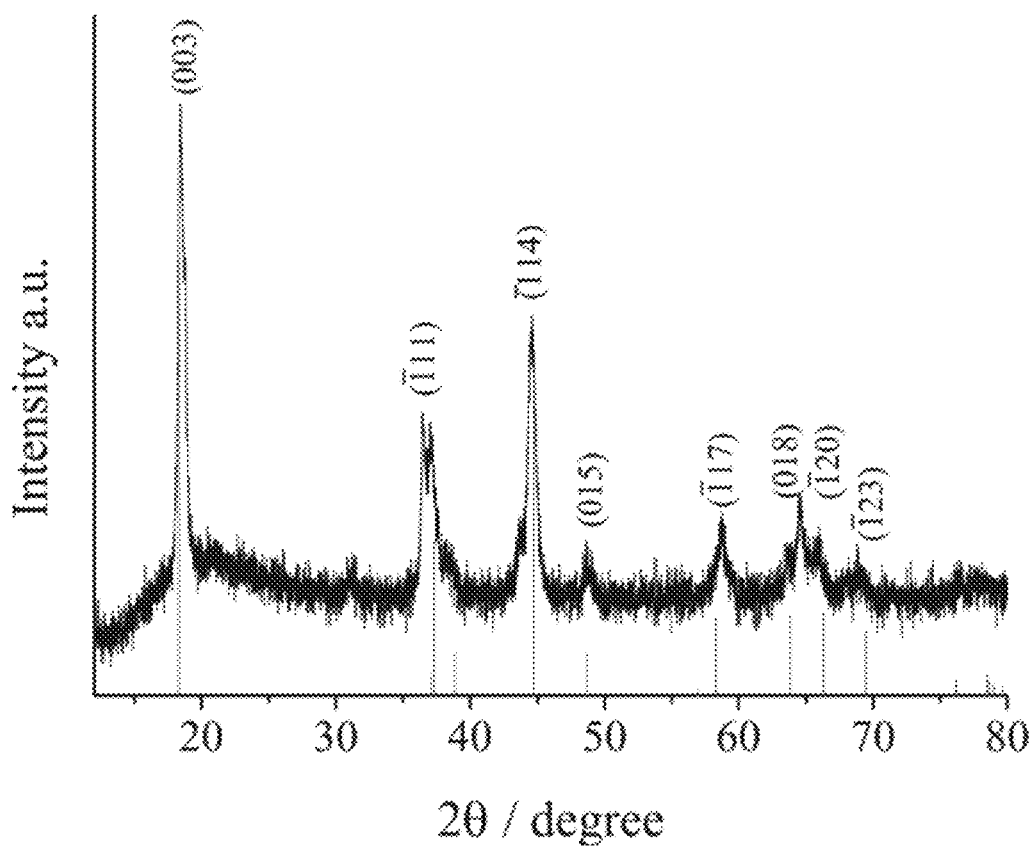
FIG. 21 shows an XRD pattern of NMC particles after electrochemical oxidation.

Equation 6 shows the process that occurs when NMC is charged. In $LiNi_{1/3}Co_{1/3}Mn_{1/3}O_2$, the valence states of Ni, Co and Mn are +2, +3 and +4 respectively. Since Ni$^{2+}$ can be oxidized to Ni$^{4+}$, the $Ni^{2+}/Ni^{4+}$ redox is the major capacity source in NMC. For $Li_xNi_{1/3}Co_{1/3}Mn_{1/3}O_2$, when $\frac{2}{3} < x < 1$, the $Ni^{2+}/Ni^{3+}$ reaction can also be accessed. The redox position of the pristine $LiNi_{1/3}Co_{1/3}Mn_{1/3}O_2$ used in this experiment was observed at 3.9 V vs Li/Li$^+$, high enough to oxidize the OH$^-$ species in the TEA solution (Equation 8). From the XRD pattern in FIG. 18, it is worth noticing that these NMC particles have very high Li/Ni disorder from its XRD pattern. FIG. 20 shows the galvanostatic cycling data obtained for the pristine NMC. Plots 1810 and 1812 in FIG. 20 correspond to the capacities obtained during charging and discharging, respectively. FIG. 21 shows an XRD pattern of NMC particles after electrochemical oxidation.

After $Li_{0.43}Ni_{1/3}Co_{1/3}Mn_{1/3}O_2$ was obtained by electrochemical oxidation of the pristine NMC (Sample 2 in FIG. 17), it was also examined using XRD and ICP-OES. Results are shown in FIG. 19 and Table 3. After electrochemical oxidation, the NMC particles were dispersed into solutions containing different concentrations of tetraethylammonium hydroxide (TEA-OH). TEA is strongly alkaline and the solutions contain free hydroxide ions (equation 7), which can function as electron donors to reduce the charged NMC. During this reaction, the $Ni^{3+}/Ni^{4+}$ and Co$^{4+}$ are reduced back to Ni$^{2+}$ and Co$^{3+}$, respectively while the OH$^-$ is oxidized to O$_2$. To maintain electroneutrality, the TEA$^+$ is inserted into the interlayer space of NMC and causes its exfoliation.

To verify the exfoliation behavior, the ratio of TEA$^+$ to V$_{Li}^+$ in the oxidized NMC (assuming a composition of $Li_{1/3}Ni_{1/3}Mn_{1/3}Co_{1/3}O_2$ was obtained after potentiostatic charging) was varied from 0.5 to 1, 1.5, 2, 5, and 10. After sonication and centrifugation to remove the unexfoliated NMC particles, a dark reddish solution was observed. The solution exhibited the Tyndall effect in the range of TEA$^+$/V$_{Li}^+$=0.5-2, which is an indication of the successful exfoliation and dispersion of the NMC nanosheets. When the as-obtained NMC powder was exposed to the same sonication protocol without first performing the oxidation step, very little exfoliation was observed and most of the powder was collected in the pellet after centrifugation, indicating very little nanosheets formation. This confirms that the exfoliation mechanism is not solely caused by the mechanical agitation imparted by the sonication.

For oxidized NMC immersed in solutions with TEA/$V_{Li}^+$>5, exfoliation was barely observed. When the concentration of TEA is too high, the higher pH increases the hydroxide oxidation rate by decreasing the OH$^-$ oxidation redox potential, which in turn also increases the NMC reduction rate. However, the solid-state diffusion of the TEA$^+$ ions in between the NMC layers is not affected by pH. As a consequence, in the solutions with high TEA concentrations, the NMC reduction could be faster than the intercalation rate of TEA$^+$ into the NMC interlayer space, increasing the possibility of the Ni$^{4+}$ cations in NMC becoming reduced to Ni$^{2+}$. The Ni$^{2+}$ ions can migrate to the Li$^+$ sites because of similarities in the ionic radii (0.69 Å for Ni$^{2+}$ and 0.76 Å for Li$^+$ compared to 0.6 Å for Ni$^{3+}$), which could impede the TEA$^+$ intercalation.

Figure 22:
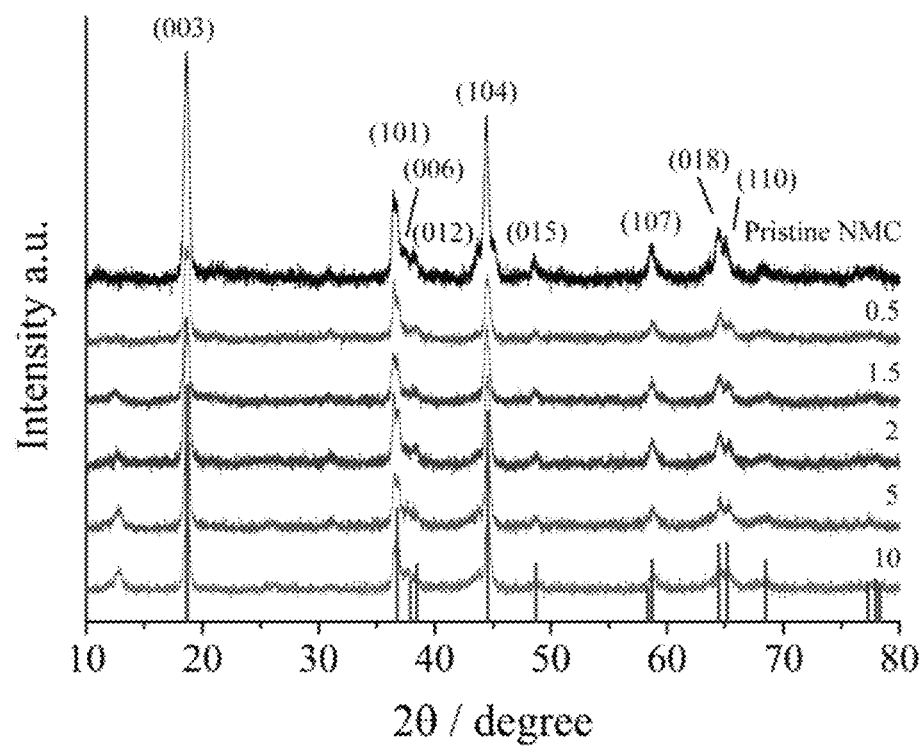
FIG. 22 shows the XRD patterns of unreacted NMC particles in TEA solutions of various concentrations.

To investigate this, XRD was used to examine the particles that were not successfully exfoliated, which were collected from the nanosheet dispersions using centrifugation. Plot 2000 in FIG. 22 shows the XRD spectrum of pristine NMC, and plots 2002, 2004, 2006, 2008, and 2010 show XRD spectra of unreacted NMC particles in different concentrations of TEA, where the ratio of TEA:$V_{Li}^+$ is 0.5, 1, 1.5, 2, 5, and 10, respectively. The XRD patterns of the unexfoliated particles were very similar to that for the pristine NMC particles. A new reflection at approximately 2θ=12.5° was observed for TEA/$V_{Li}^+$>5. These results suggest that there was unsuccessful or incomplete exfoliation of NMC, either from insufficient TEA$^+$ insertion into the structure or the formation of TEA$^+$ intercalated phases that could not be exfoliated. It was also observed that the (006)/(012) and (108)/(110) reflections in the XRD patterns were not well separated in either the unexfoliated particles or the pristine NMC. This is usually observed when the NMC has a poorly developed layered structure or a lithium deficiency. Additionally, the relative intensity of the (003) to (104) reflections was close to 1 as TEA/$V_{Li}^+$ increased, compared to 1.3 for pristine NMC. Therefore, although the small reflection from the intercalated NMC phase indicated that some TEA$^+$ insertion was occurring, the lack of a well-formed layered structure and increased potential for Ni$^{2+}$ to be blocking the pathways may be the reason for the limited exfoliation of NMC as the TEA concentration increased.

ICP-OES analysis was performed to further understand the exfoliation process and composition of the obtained NMC nanosheets. The analysis showed that pristine NMC (Sample 1 in Table 3) had a composition of $Li_{0.8}Ni_{0.3}Mn_{0.37}Co_{0.33}O_2$, which indicates that the as-received sample was lithium-deficient. Nonetheless, the charged NMC particles prior to exfoliation (Sample 2 in Table 3) had a composition of $Li_{0.43}Ni_{0.3}Mn_{0.36}Co_{0.33}O_2$, confirming that Li$^+$ vacancies ($V_{Li}^+$) were formed during electrochemical oxidation. The composition of the exfoliated NMC nanosheets (Sample 4 in Table 3) was determined to be $Li_{0.41}Ni_{0.33}Mn_{0.21}Co_{0.46}O_2$. This composition indicates that whereas Li$^+$ ions are still adsorbed on the surface of nanosheets, some of the Mn ions are lost from the nanosheets. It is known that Mn is susceptible to the Jahn-Teller effect and Mn is not completely soluble in Li rich materials, which can enhance the dissolution of Mn into the electrolyte. During the exfoliation, the large contact area between the Mn octahedra with the solution may have facilitated the dissolution of Mn from the nanosheets to the aqueous solution.

Figure 23A:
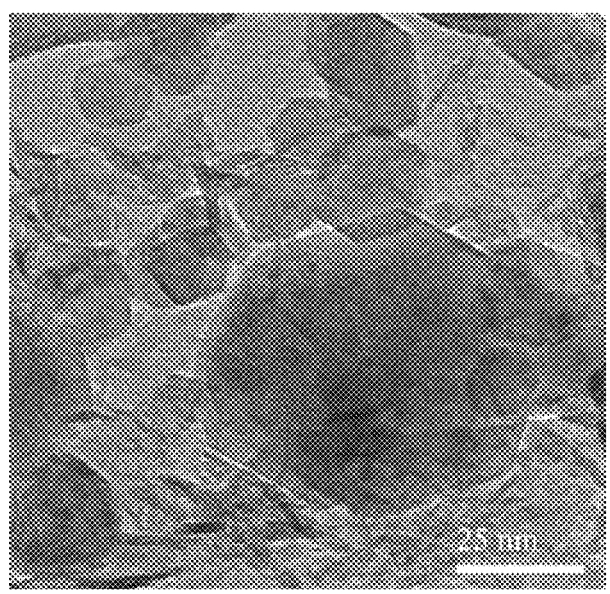
FIG. 23A shows a TEM image of exfoliated NMC nanosheets.

Nanosheet samples were prepared for transmission electron microscopy (TEM) and atomic force microscopy (AFM) imaging by dropping the dispersion onto the respective substrates. FIG. 23A shows the transmission electron microscopy (TEM) image of the exfoliated nanosheets. From the picture it can be clearly seen that NMC was exfoliated to form thin nanosheets. The hexagonal crystal lattice was verified by diffraction pattern. The integrity of the basal plane indicates the exfoliation occurs along the layer stacking direction in the c-axis. The AFM and TEM shows that the size of NMC nanosheets was around 50 nm, which is slightly smaller than the LCO nanosheets prepared using the similar method. This is due to the small radius of the pristine NMC particles used as starting materials (<500 nm) compared with the large size of LCO starting materials (2-5 μm). NMC particles are typically prepared through co-precipitation methods rather than solid state synthesis, therefore the NMC usually comprises aggregates of small NMC particles. Thus, the sizes of exfoliated NMC nanosheets are usually small. The high Li/Ni disorder is also the reason for the limited size of the nanosheets, since the exfoliation cannot continue once the Ni occupies the position of Li.

Figure 23B:
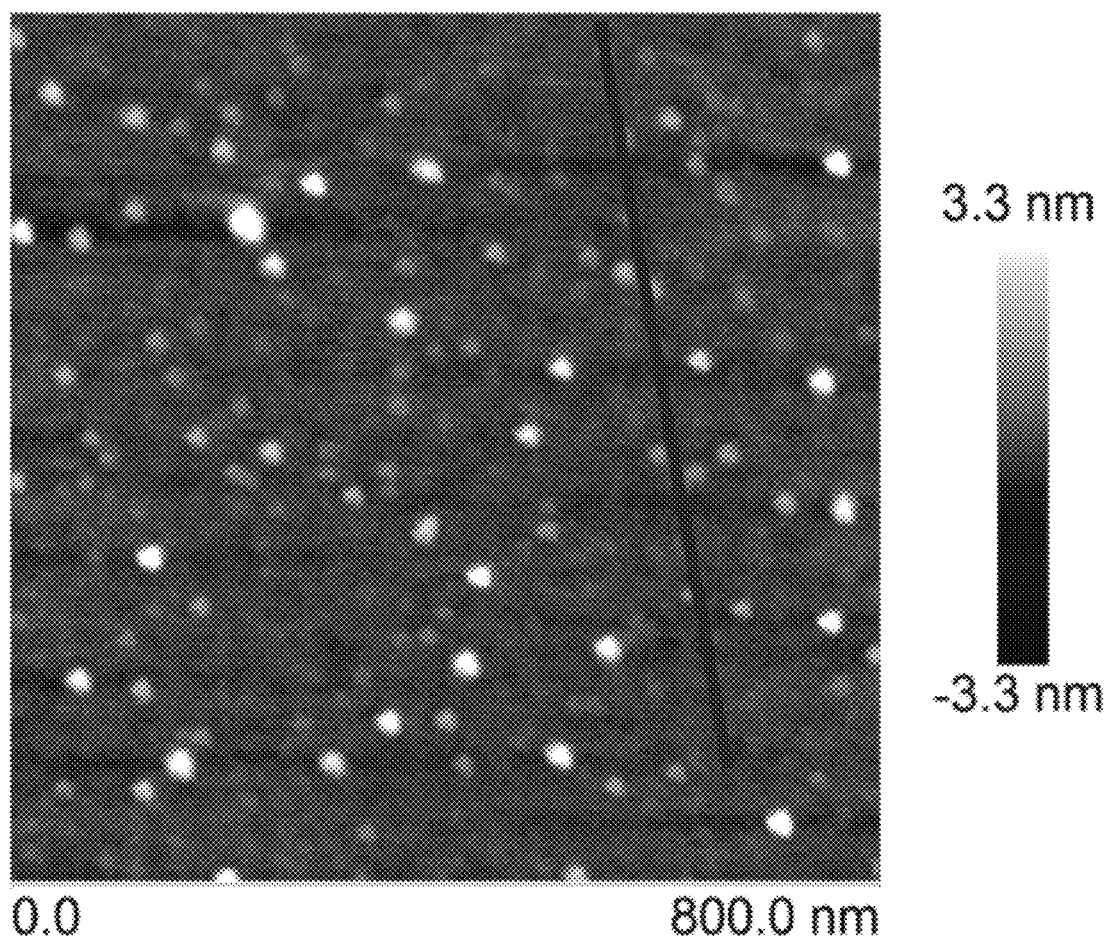
FIGS. 23B and 23C show an AFM image and a height profile, respectively, of exfoliated NMC nanosheets.
Figure 23C:
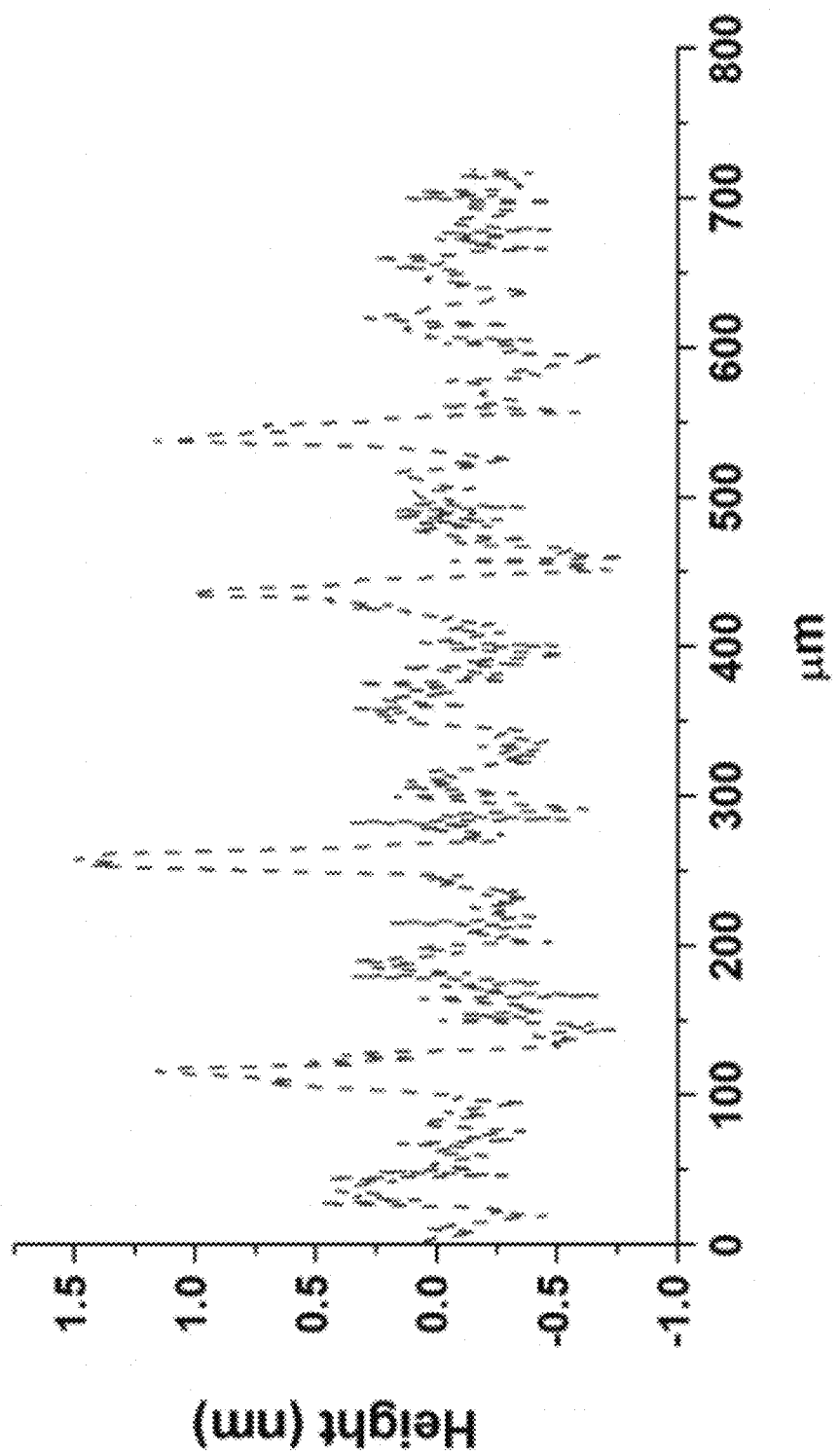

The thickness of the nanosheets was determined using AFM. FIG. 23B-C show the AFM images and a height profile of exfoliated NMC nanosheets. The nanosheets were collected from the decant solution after centrifugation at 13000 rpm. Then the nanosheets were dispersed in isopropyl alcohol and dropped onto a clean polished Si substrate that had been cleaned using bath sonication in DI water, acetone and isopropyl alcohol. The results showed that the height dimensions of NMC nanosheets were from 0.7 to 2 nm. Thus, NMC was successfully exfoliated into monolayer or dual-layer nanosheets.

Nanosheet Reassembly Route 1: Dialysis

In this reassembly route, the NMC nanosheets dispersed in the TEA solutions (Sample 4 in FIG. 17) were first subjected to dialysis in DI water using a semipermeable membrane to allow TEA$^+$ ions to slowly diffuse out of the nanosheet dispersion. Although the excess TEA$^+$ in the solution could be removed using dialysis, galvanostatic cycling results of these samples showed that the nanosheets did not display Faradaic activity. Rather, only a small double layer capacitance was observed due to the insulating TEA$^+$ adsorbates blocking the charge transfer.

Because of the negative surface charge of the NMC nanosheets, the introduction of Li$^+$ into the dispersion by performing dialysis in a solution of LiNO$_3$ (rather than just DI water) will cause the charges to neutralize and decrease the repulsion between the nanosheets. As a result of the slow diffusion of Li$^+$ into the nanosheet dispersion as the excess TEA$^+$ diffuses out through the membrane, the nanosheets can restack and grow into particles at a slow rate. Compared with direct flocculation, particles reassembled by dialysis are expected to have a better crystal match between different nanosheets. The nanosheet reassembly process is supported by the ICP-OES results in Table 3. The lithium content increased from 0.41 per formula unit (f.u.) in the as-exfoliated nanosheets (Sample 4 in Table 3) to 0.95 in the particles reassembled with dialysis in LiNO$_3$ (Sample 5 in Table 3). The increased lithium content indicates that the reassembly process was driven by the electrostatic interactions between the negatively charged NMC nanosheets and Li$^+$ ions in the solution.

The sample recovered after dialysis (Sample 5 in Table 3) contained residual TEA$^+$, as confirmed by the presence of the reflection associated with the TEA$^+$-intercalated phase of NMC in the XRD pattern. This sample also did not display Faradaic activity under galvanostatic cycling. This is attributed to the inability of dialysis to remove TEA$^+$ ions that are strongly adsorbed to the surfaces of the NMC nanosheets. Electrophoresis was used to remove the TEA$^+$ ions adsorbed to the surfaces of the NMC nanosheets. The decrease in lithium content to 0.71 per f.u. after electrophoresis (Sample 6 in Table 3) indicates that some Li$^+$ was removed during electrophoresis along with the TEA$^+$.

Figure 24:
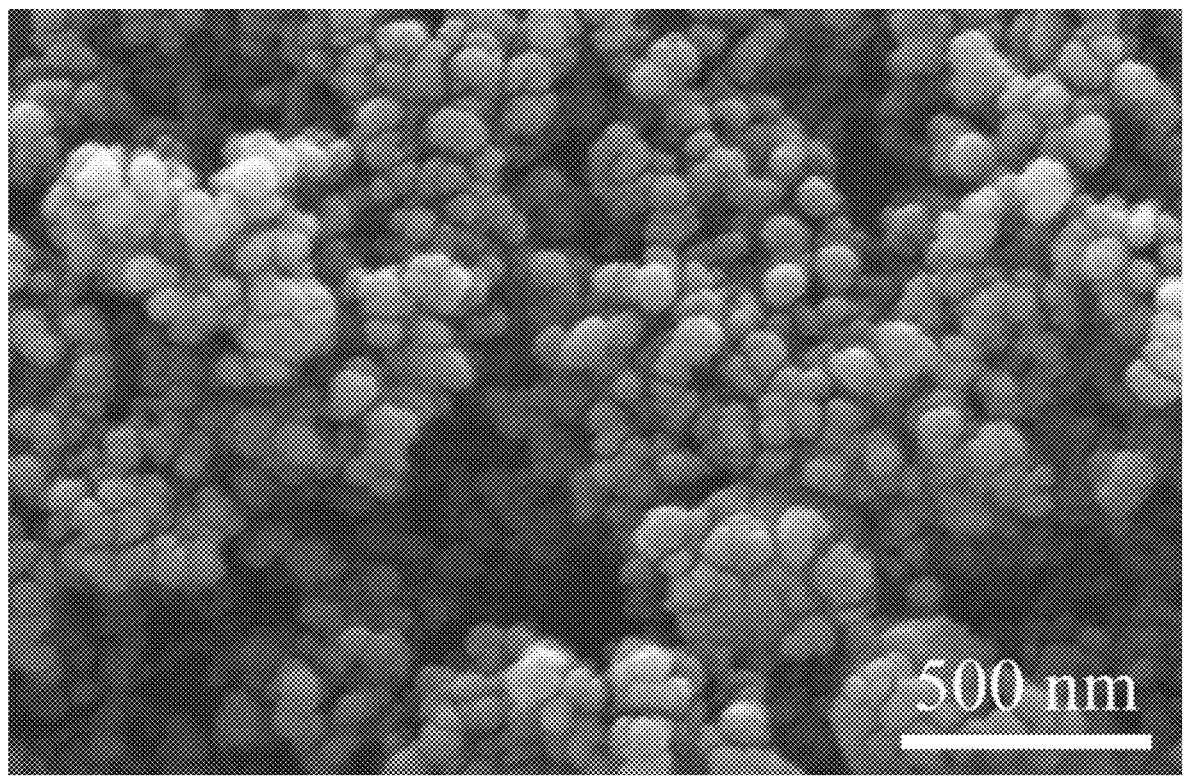
FIG. 24 shows an SEM image of the pristine, as-received NMC powder.
Figure 25A:
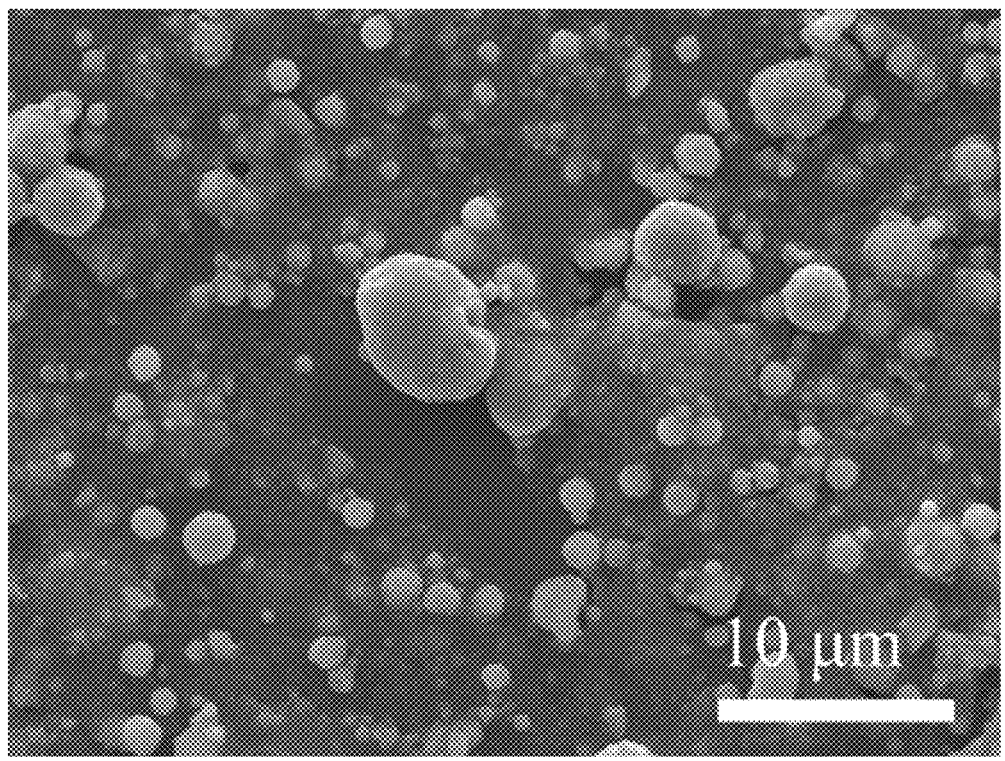
FIGS. 25A and 25B show SEM images of NMC particles obtained after reassembly of nanosheets using dialysis.
Figure 25B:
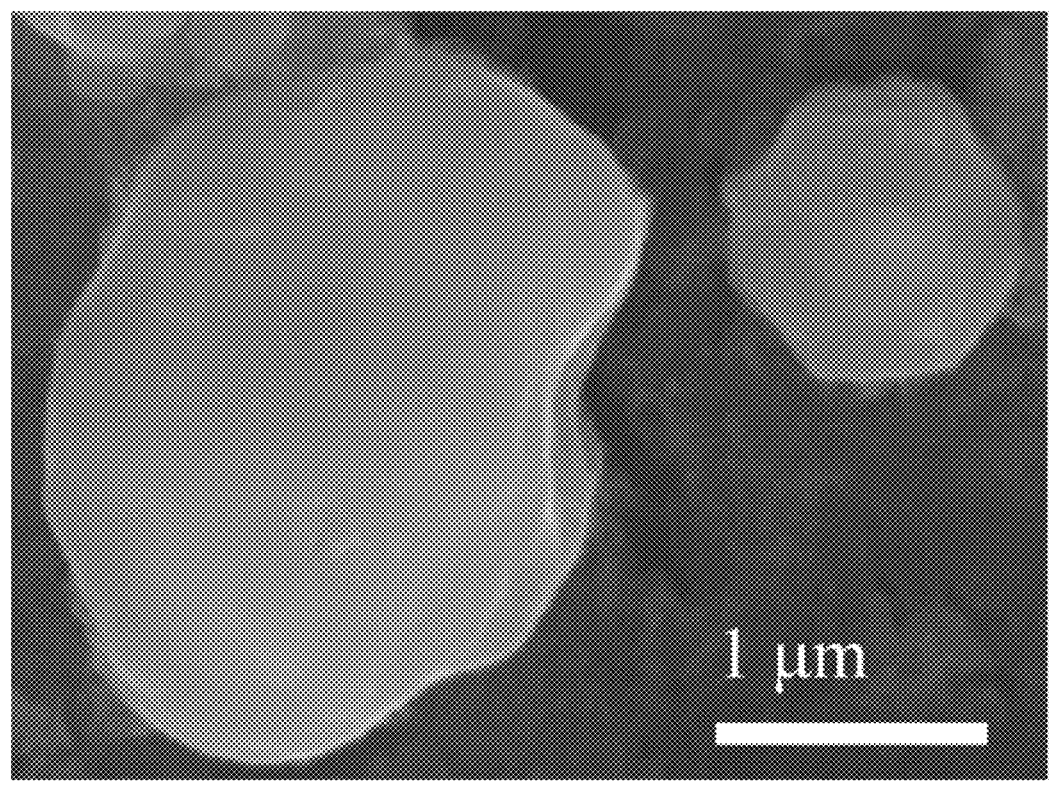
Figure 26A:
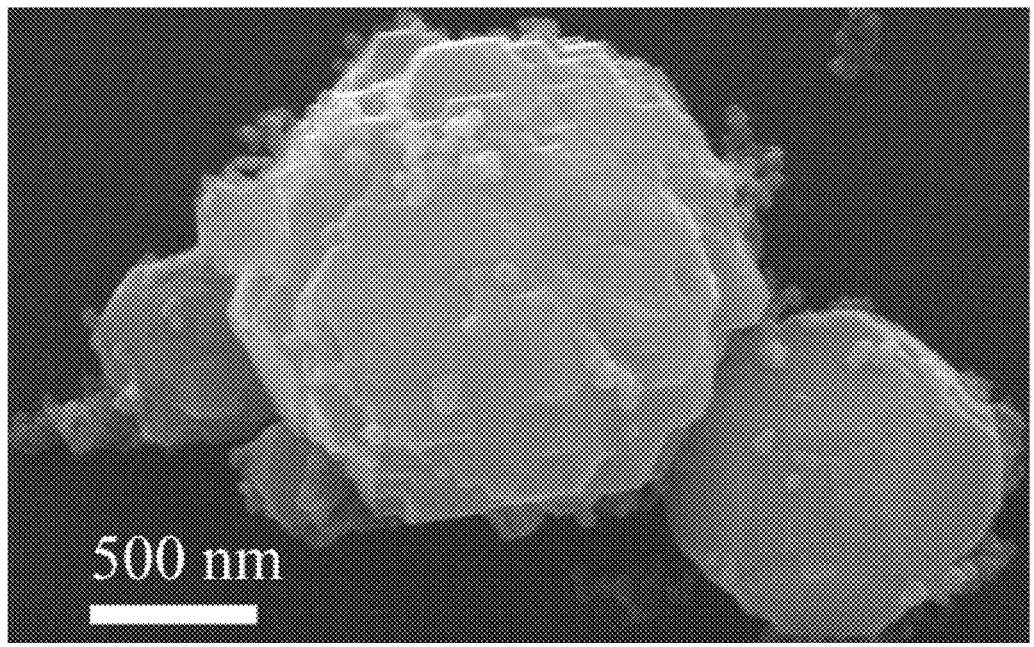
FIGS. 26A and 26B show SEM images of NMC particles obtained by reassembling nanosheets using dialysis followed by electrophoresis.
Figure 26B:
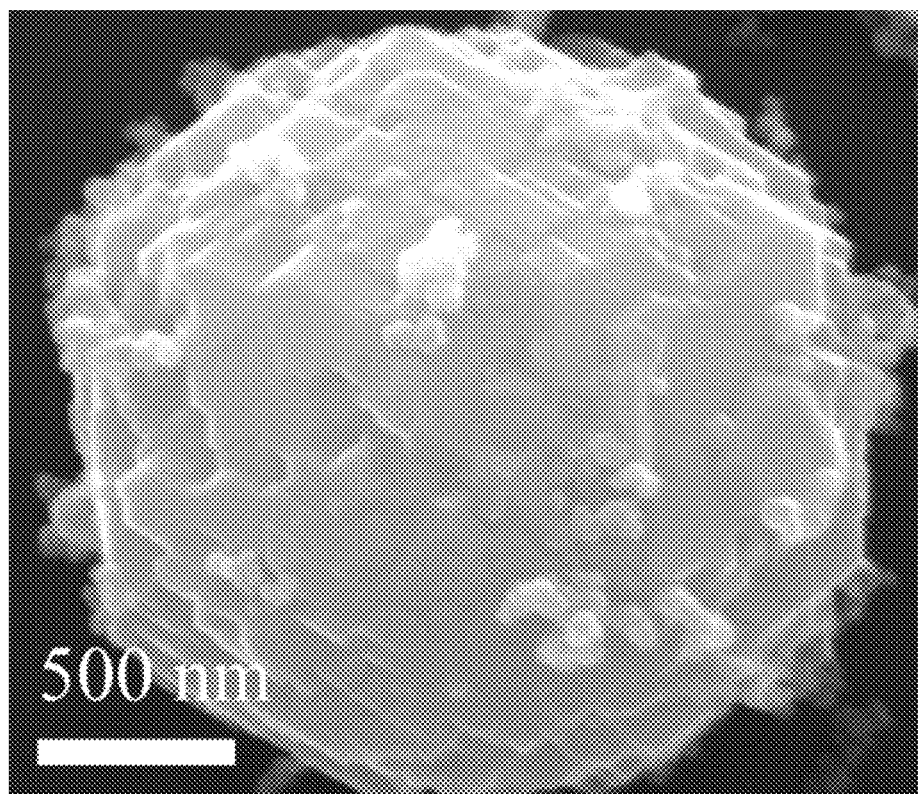

To better understand the role of the dialysis and electrophoresis processes in the morphologies of the reassembled NMC particles, SEM imaging was performed. The as-obtained, pristine NMC consisted of aggregates of particles, with a secondary particle size of as large as 15 μm, but primary particle size of roughly ~200 nm in diameter. FIG. 24 shows the SEM image of the pristine NMC particles. The SEM images of reassembled NMC particles obtained after dialysis but prior to electrophoresis (Sample 5 in FIG. 17) are shown in FIGS. 25A and 25B. Some of the reassembled NMC particles obtained after dialysis but prior to electrophoresis (Sample 5) showed hexagonal morphologies, but others, particularly the larger ones, did not have well-defined shapes. In contrast, the reassembled NMC particles obtained after dialysis and electrophoresis (Sample 6) were smaller and displayed sharp, faceted edges, as shown by the SEM images in FIGS. 26A and 26B.

Figure 27A:
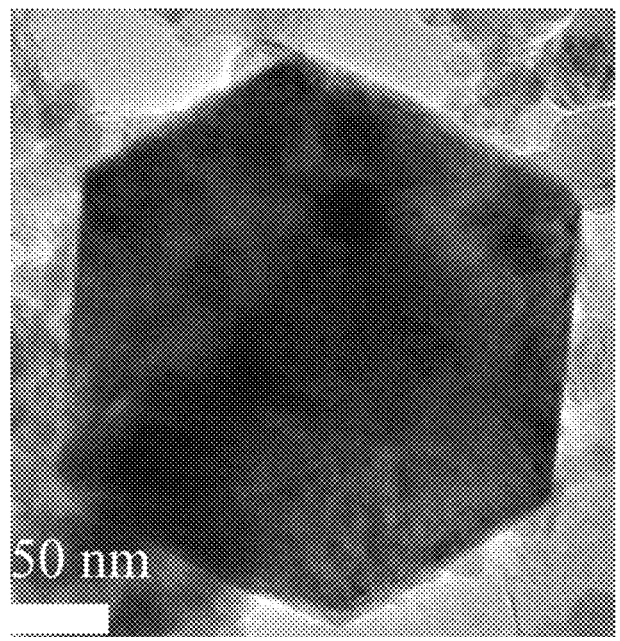
FIGS. 27A and 27B show TEM images of small NMC hexagonal particles found after electrophoresis.
Figure 27B:
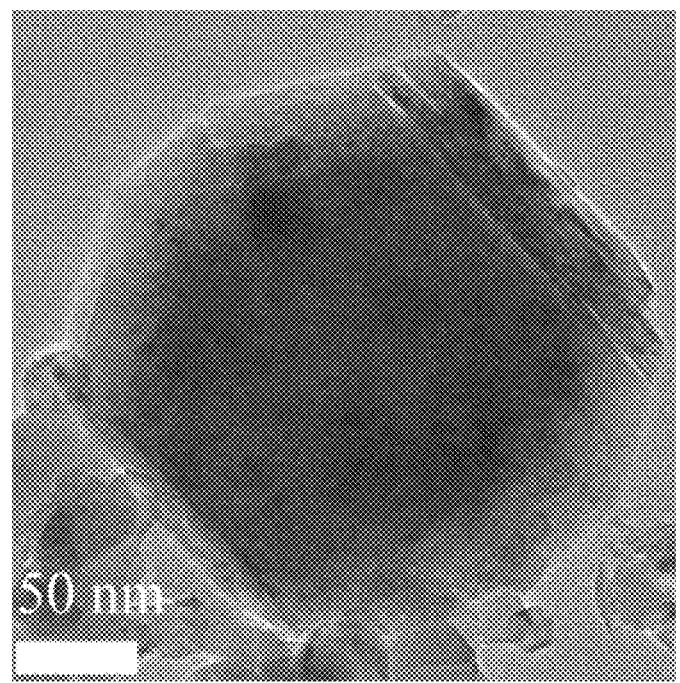

The TEM images of some small hexagonal NMC nanoplates observed in Sample 6 are shown in FIGS. 27A and 27B. The diffraction patterns of the reassembled particles show good crystallinity indicating that the nanosheets were highly oriented and reassembled in the same direction. The electron diffraction pattern reveals a lattice spacing of 4.76 Å, which corresponds to the (003) spacing for NMC. The contrast in the TEM images is not homogeneous, but the electron diffraction patterns show fairly well ordered structures. It appears that the nanosheets first reassemble into smaller, nanoplatelet-like particles with hexagonal morphologies.

As-prepared Sample 6 (Table 3) was further treated in a 1 M LiOH solution using a microwave hydrothermal reactor to place Li$^+$ back into the structure. The particles were then calcined to increase the crystallinity of particles. The XRD pattern of Sample 6 obtained after electrophoresis, microwave hydrothermal treatment, and calcination is shown in FIG. 19. The pattern showed that the position of the (003) reflection at 18.6° remained unchanged, but the intensity of the TEA$^+$-intercalate peak decreased, indicating that TEA$^+$ ions could be removed without causing damage to the restacked NMC nanosheets. The ICP-OES results also confirmed that the Li content was increased in the final product to 0.85 per fu. (Table 3).

Nanosheet Reassembly Route 2: Flocculation

Figure 28A:
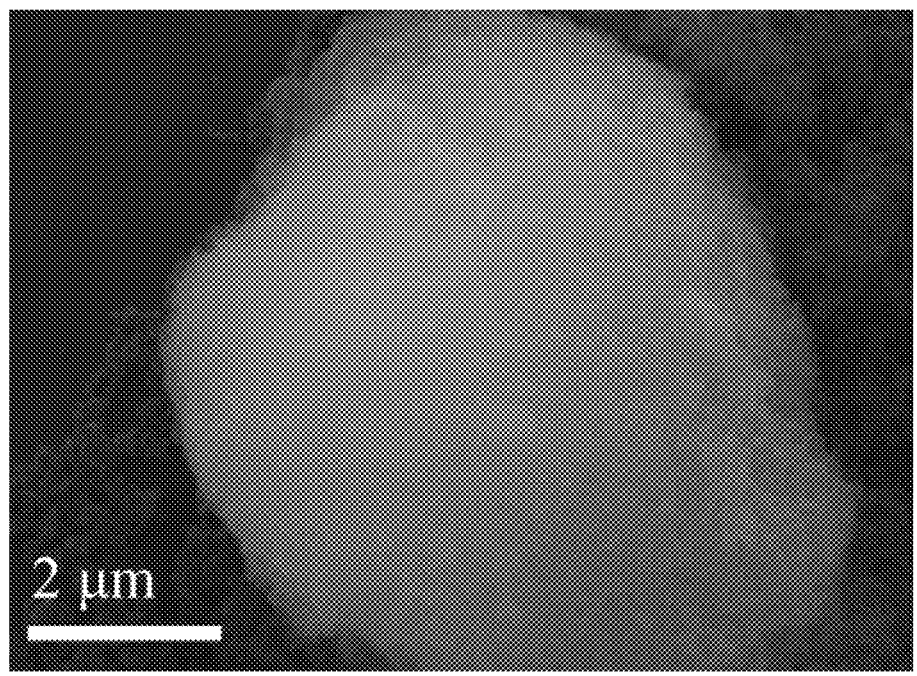
FIGS. 28A and 28B show SEM images of NMC particles obtained by direct flocculation, after treatment in microwave hydrothermal reactor.
Figure 28B:
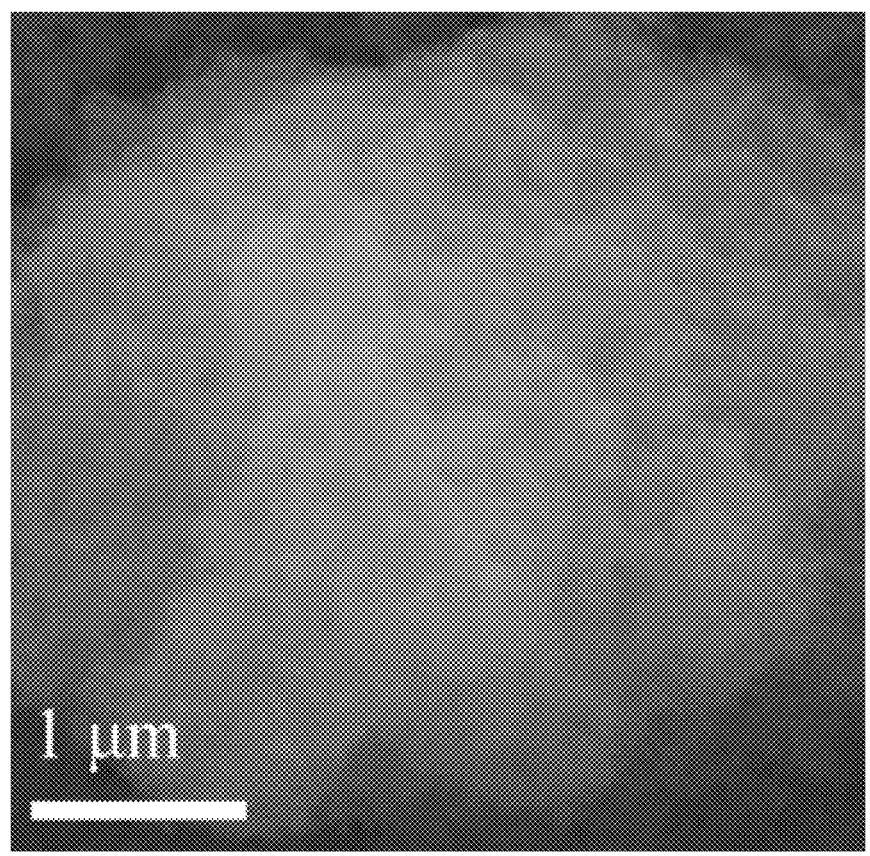

Flocculation was also used to reassemble the NMC nanosheets. The NMC nanosheet dispersion was purified with electrophoresis to remove the adsorbed TEA$^+$. The ICP-OES results of this sample (Sample 7 in Table 4) showed that the lithium content was negligible, indicating that performing electrophoresis on the NMC nanosheets from the TEA dispersion caused all of the Li$^+$ to be removed from the surfaces of the nanosheets. The nanosheets were then dispersed in a LiOH solution and allowed to flocculate. Following flocculation, the nanosheets were treated using microwave hydrothermal reaction at 160° C. for 30 minutes and then calcined to increase the crystallinity of the particles. The ICP-OES results showed that the lithium content of the final product (Sample 8 in Table 3) increased to 0.82 per fu. The SEM images of the obtained particles are shown in FIGS. 28A and 28B. The SEM imaging showed that the NMC particles that were reassembled by the direct flocculation method displayed ill-defined shapes lacking facets, with roughly textured surfaces and particle sizes in the micrometer range.

Electrochemical Properties

Figure 29A:
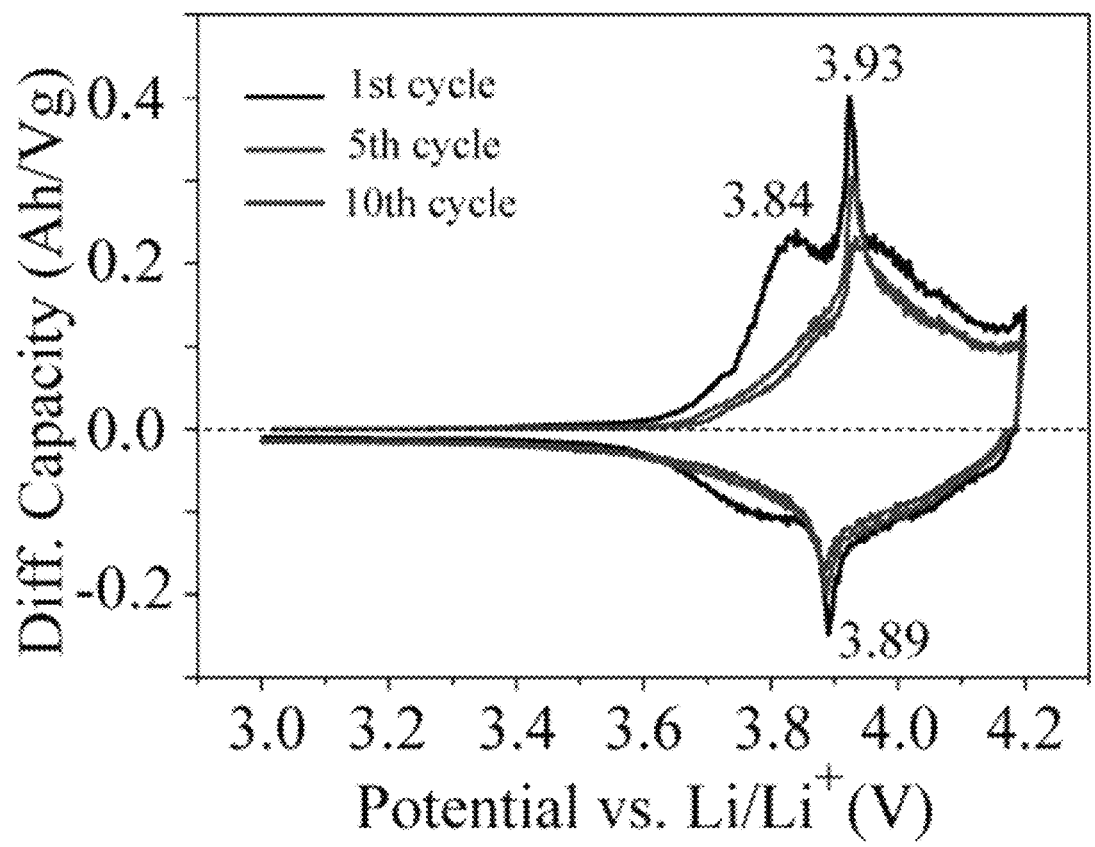
FIGS. 29A-29C show differential capacity plots of pristine NMC, NMC particles reassembled from nanosheets using dialysis, and NMC particles reassembled using flocculation.

The differential capacity plots of the as-obtained NMC (FIG. 29A) show two redox pairs: one with a sharp anodic peak at 3.93 and a sharp cathodic peak at 3.89 V vs Li/Li$^+$ that was present in all of the cycles and a broader one with an oxidation peak at 3.84 and a less-defined reduction peak at around 3.8 V.

Figure 29B:
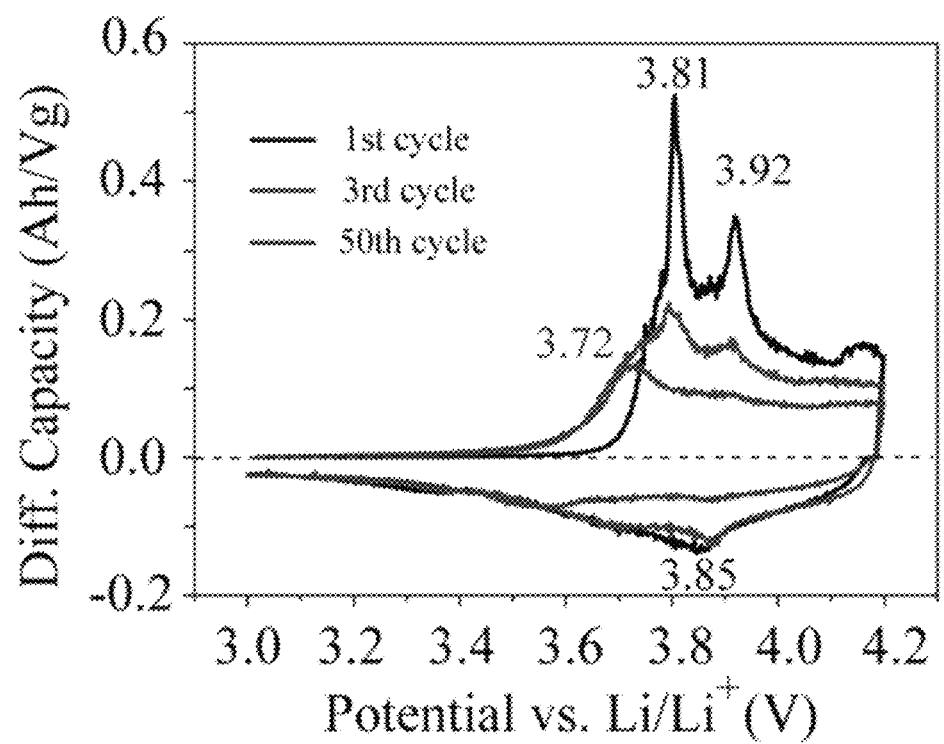
Figure 29C:
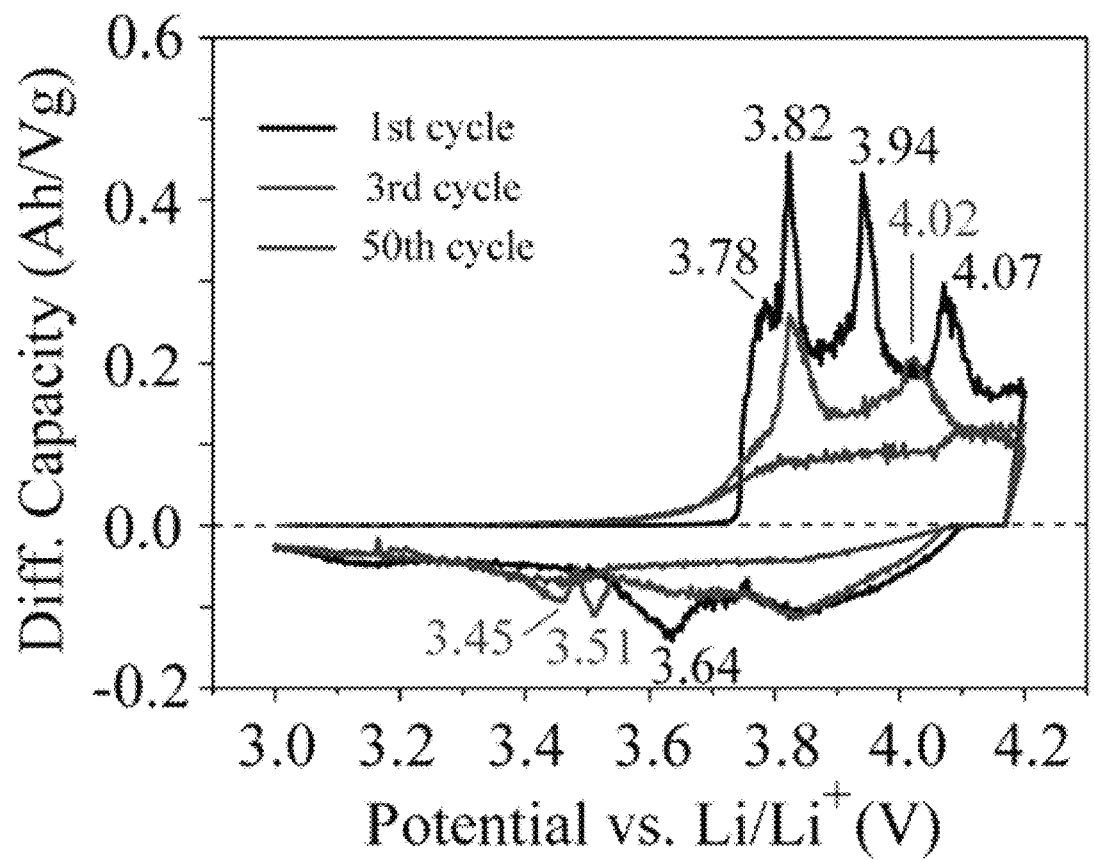

The differential capacity plots of the NMC particles reassembled from the nanosheets also exhibited multiple redox peaks that are atypical for NMC. The particles prepared through the dialysis reassembly route had fewer redox couples with smaller peak separation (i.e., overpotential) (FIG. 29B) compared to the ones prepared through flocculation (FIG. 29C). For particles prepared through the dialysis reassembly route, the redox peak of Ni$^{2+}$/Ni$^{4+}$ at 3.81 V in the first cycle can still be clearly observed even after 50 cycles, though it shifted to 3.72 V (FIG. 29B).

Figure 29D:
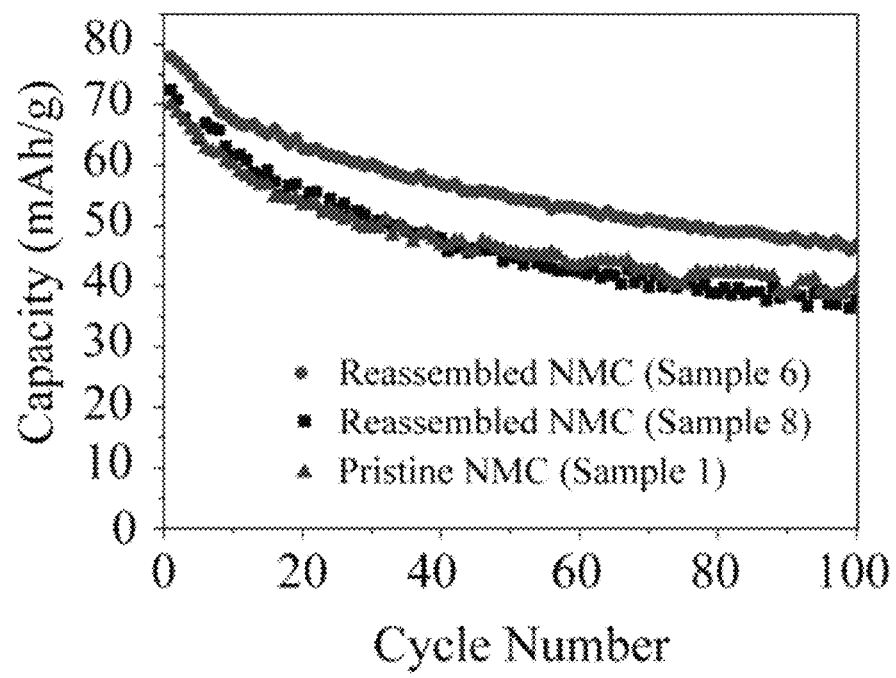
FIG. 29D shows the discharge capacity versus cycle results for the samples using galvanostatic cycling.

As shown in FIG. 29D, the capacities of the as-obtained NMC and both types of NMC reassembled particles (dialysis and flocculation) were lower than expected and also showed poor capacity retention. This is likely due to the poorly formed layered structures and phase segregation. It can be seen from these results that the NMC reassembled from nanosheets using dialysis and electrophoresis had the best performance, with better capacity retention compared to that of pristine NMC and NMC particles obtained by direct flocculation of the nanosheets.

Only a few implementations are described and illustrated. Variations, enhancements and improvements of the described implementations and other implementations can be made based on what is described and illustrated in this document.

What is claimed is:
1. A method of exfoliating transition metal oxide lithium intercalation particles comprising lithium ions intercalated between transition metal oxide nanosheets, the method comprising:
electrochemically oxidizing a transition metal in first transition metal oxide lithium intercalation particles from a first oxidation state to a second oxidation state, thereby liberating lithium ions from the first transition metal oxide lithium intercalation particles and forming vacancies between the transition metal oxide nanosheets;
inserting first cations having a radius exceeding the radius of a lithium ion into the vacancies;
reducing the transition metal from the second oxidation state to the first oxidation state, thereby yielding second transition metal oxide lithium intercalation particles comprising lithium ions and the first cations interca- lated between the transition metal oxide nanosheets, wherein the transition metal is in the second oxidation state; and exfoliating the transition metal oxide nanosheets from the second transition metal oxide lithium intercalation particles to yield dispersed transition metal oxide nanosheets comprising the transition metal in the first oxidation state and oxygen.

2. The method of claim 1, wherein the transition metal oxide comprises one or more transition metals.

3. The method of claim 2, wherein the transition metal oxide comprises one or more of nickel, manganese, and cobalt.

4. The method of claim 1, wherein the first cations comprise a quaternary amine.

5. The method of claim 4, wherein the quaternary amine comprises triethylammonium.

6. The method of claim 1, wherein the second transition metal oxide lithium intercalation particles are free from protons.

7. The method of claim 1, wherein reducing the transition metal from the second oxidation state to the first oxidation state comprises oxidizing hydroxide ions to yield oxygen.

8. The method of claim 1, wherein exfoliating the transition metal oxide nanosheets from the second transition metal lithium intercalation particles comprises agitating a liquid mixture comprising the second transition metal oxide lithium intercalation particles.

9. The method of claim 1, further comprising purifying the dispersed transition metal oxide nanosheets by removing first cations coupled to the dispersed transition metal oxide nanosheets.

10. The method of claim 1, wherein purifying the dispersed transition metal oxide nanosheets comprises dialysis or electrophoresis.

11. The method of claim 1, wherein the dispersed transition metal oxide nanosheets are single and double layer nanosheets.

12. The method of claim 11, further comprising reassembling the dispersed transition metal oxide nanosheets to yield a material.

13. The method of claim 12, wherein reassembling the dispersed transition metal oxide nanosheets comprises contacting second cations with the dispersed transition metal oxide nanosheets.

14. The method of claim 13, wherein the material is a nanosheet homostructure comprising the transition metal oxide nanosheets and the second cations, wherein the second cations comprise a single type of cation.

15. The method of claim 13, wherein the material is a nanosheet homostructure comprising the transition metal oxide nanosheets and the second cations, wherein the second cations comprise two or more types of cations.

16. The method of claim 13, wherein the transition metal oxide nanosheets are first transition metal oxide nanosheets and the material is a nanosheet heterostructure comprising the first transition metal oxide nanosheets, second transition metal oxide nanosheets, and the second cations, wherein the second transition metal oxide nanosheets differ from the first transition metal oxide nanosheets.

17. The method of claim 13, wherein the second cations comprise lithium ions, sodium ions, calcium ions, potassium ions, or a combination thereof.

* * * * *